S. E. CARLIN.
CALCULATING MACHINE.
APPLICATION FILED SEPT. 8, 1911.
1,208,288.
Patented Dec. 12, 1916.
27 SHEETS—SHEET 8.
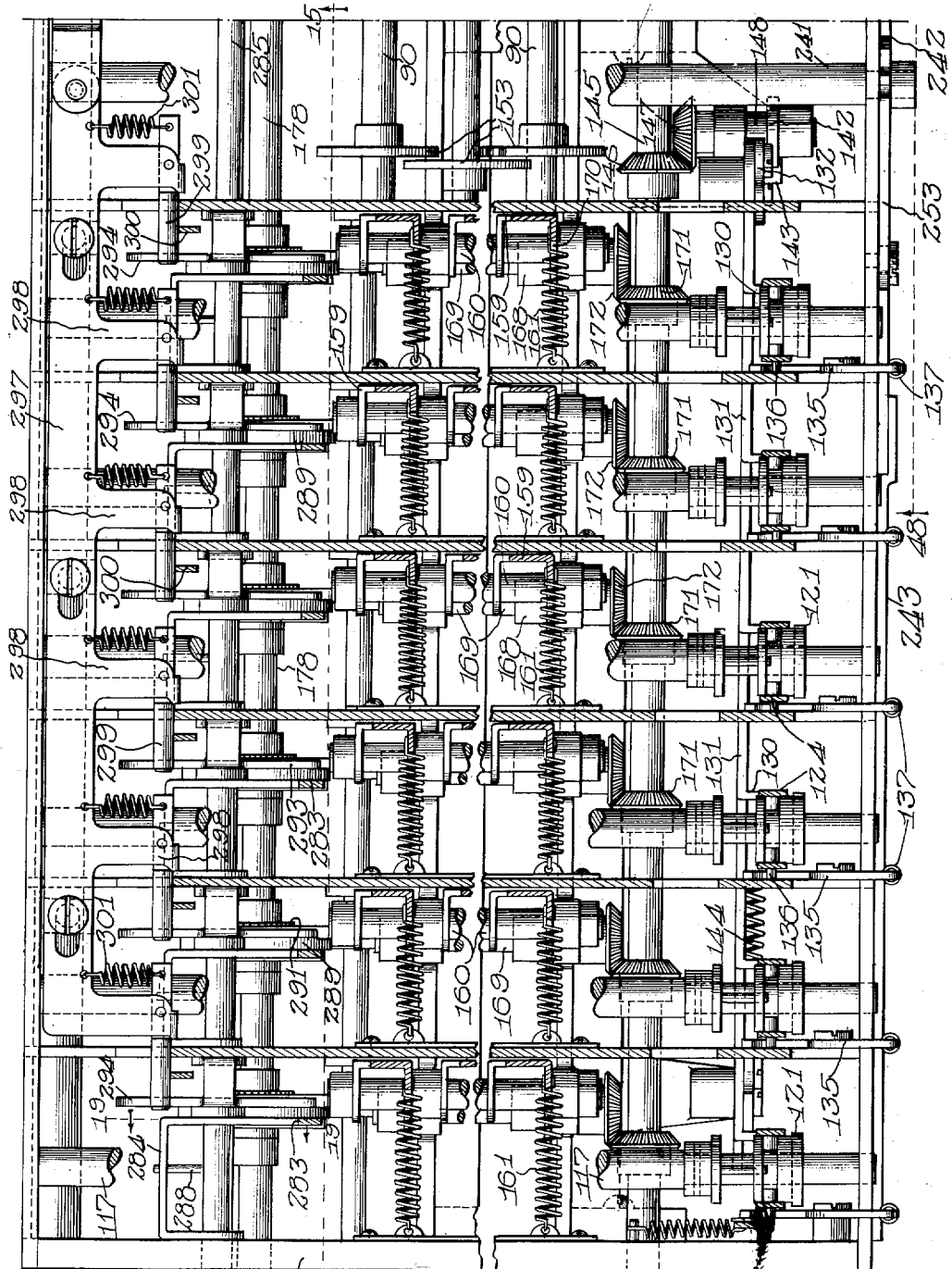

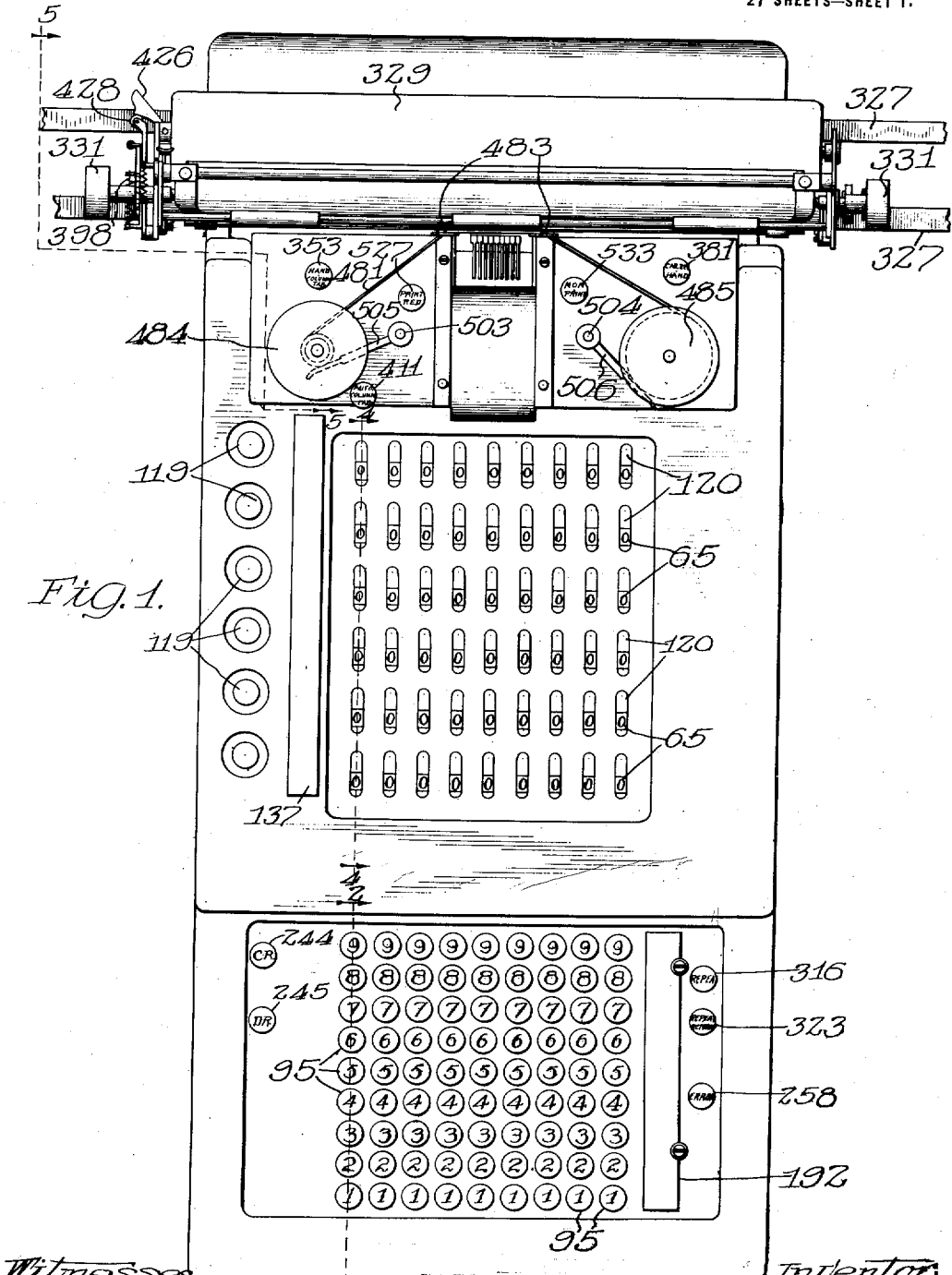

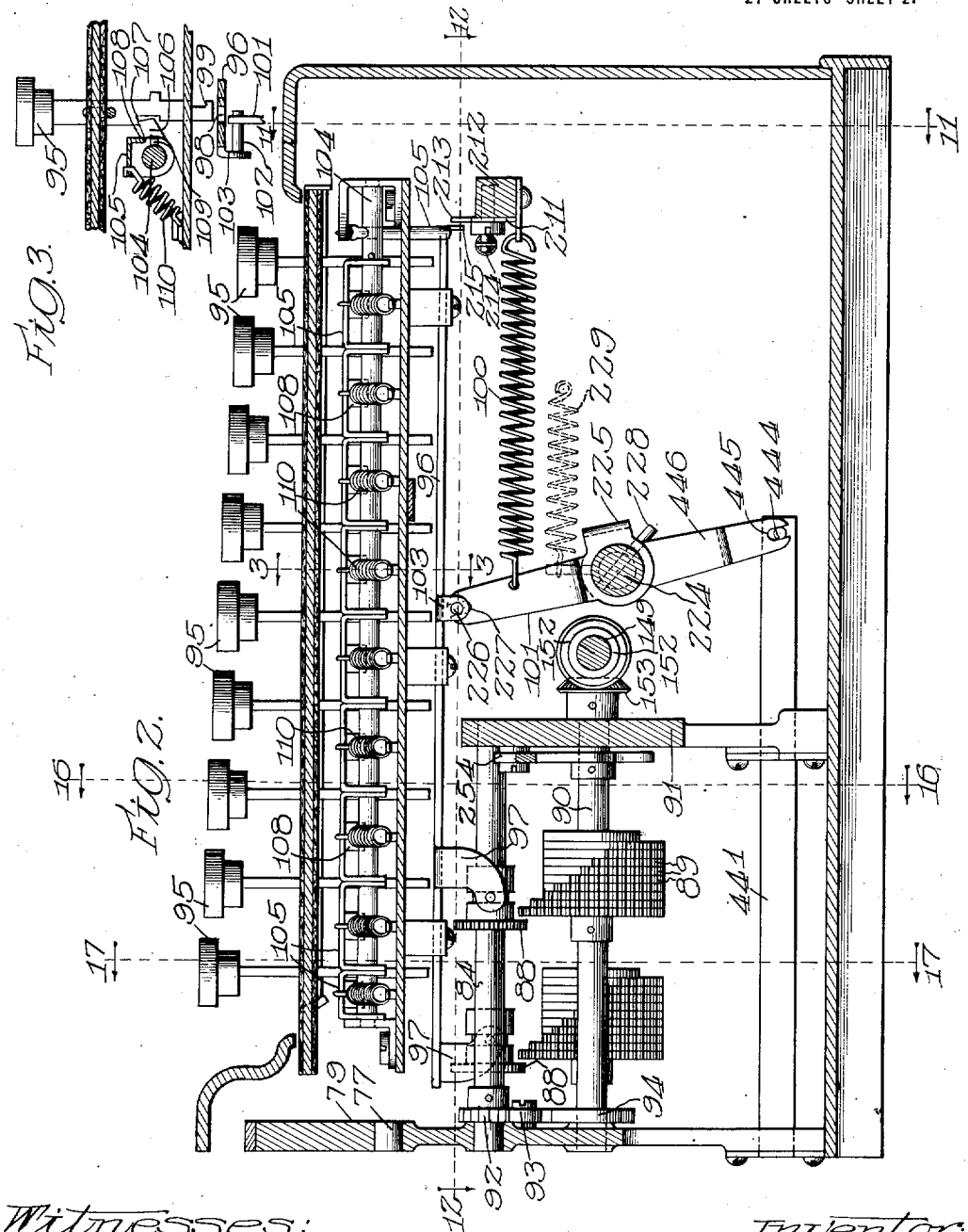

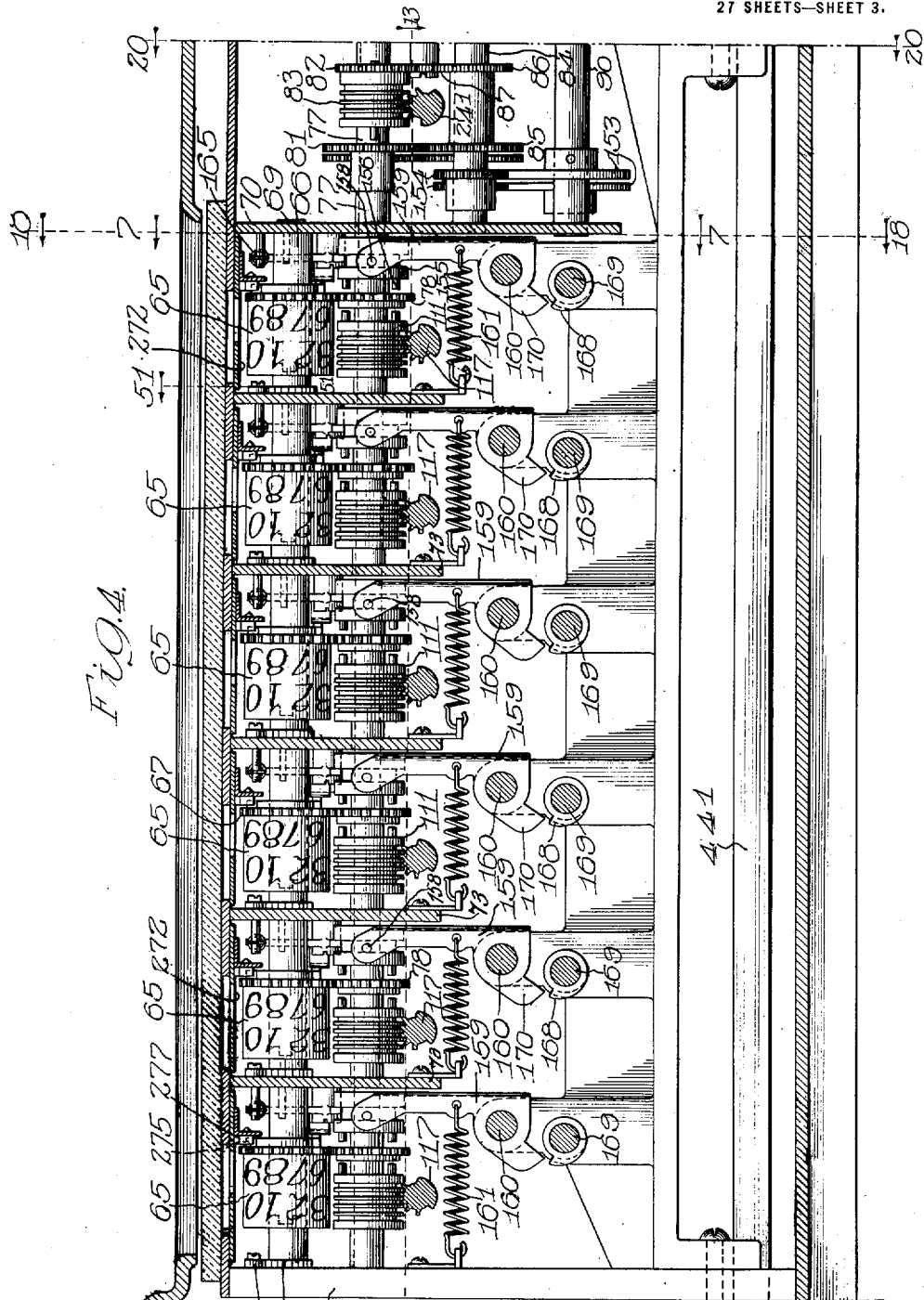

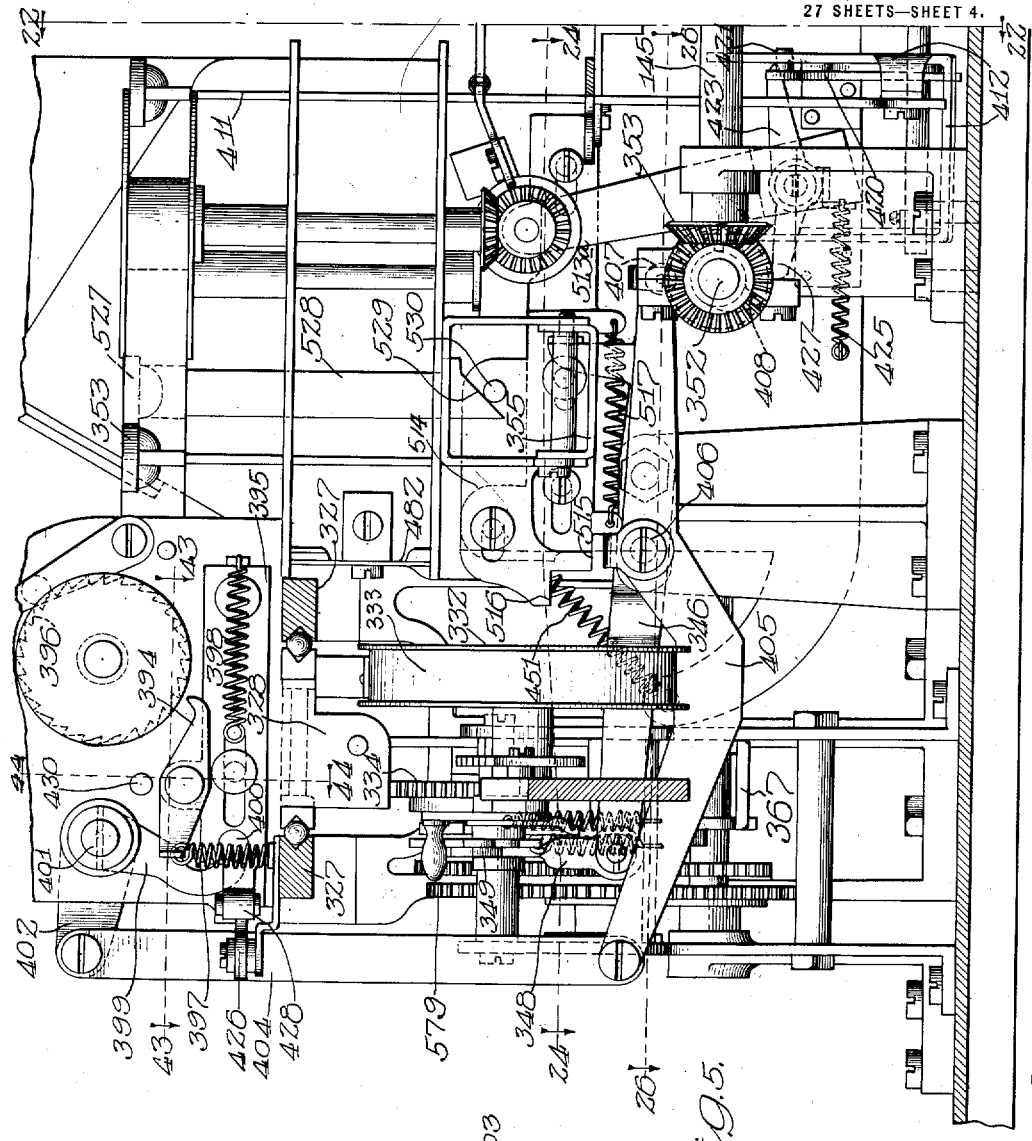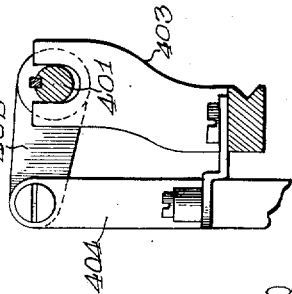

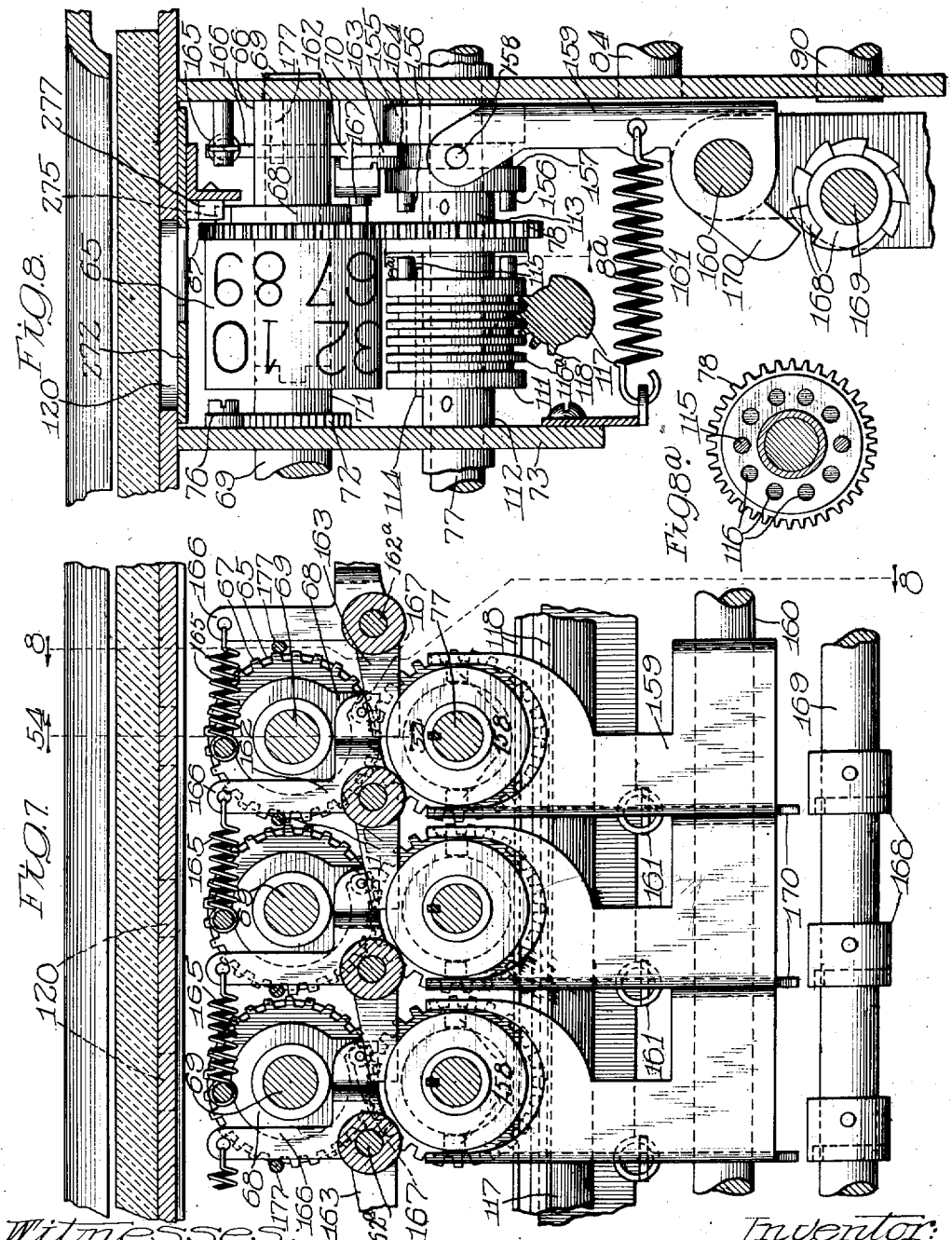

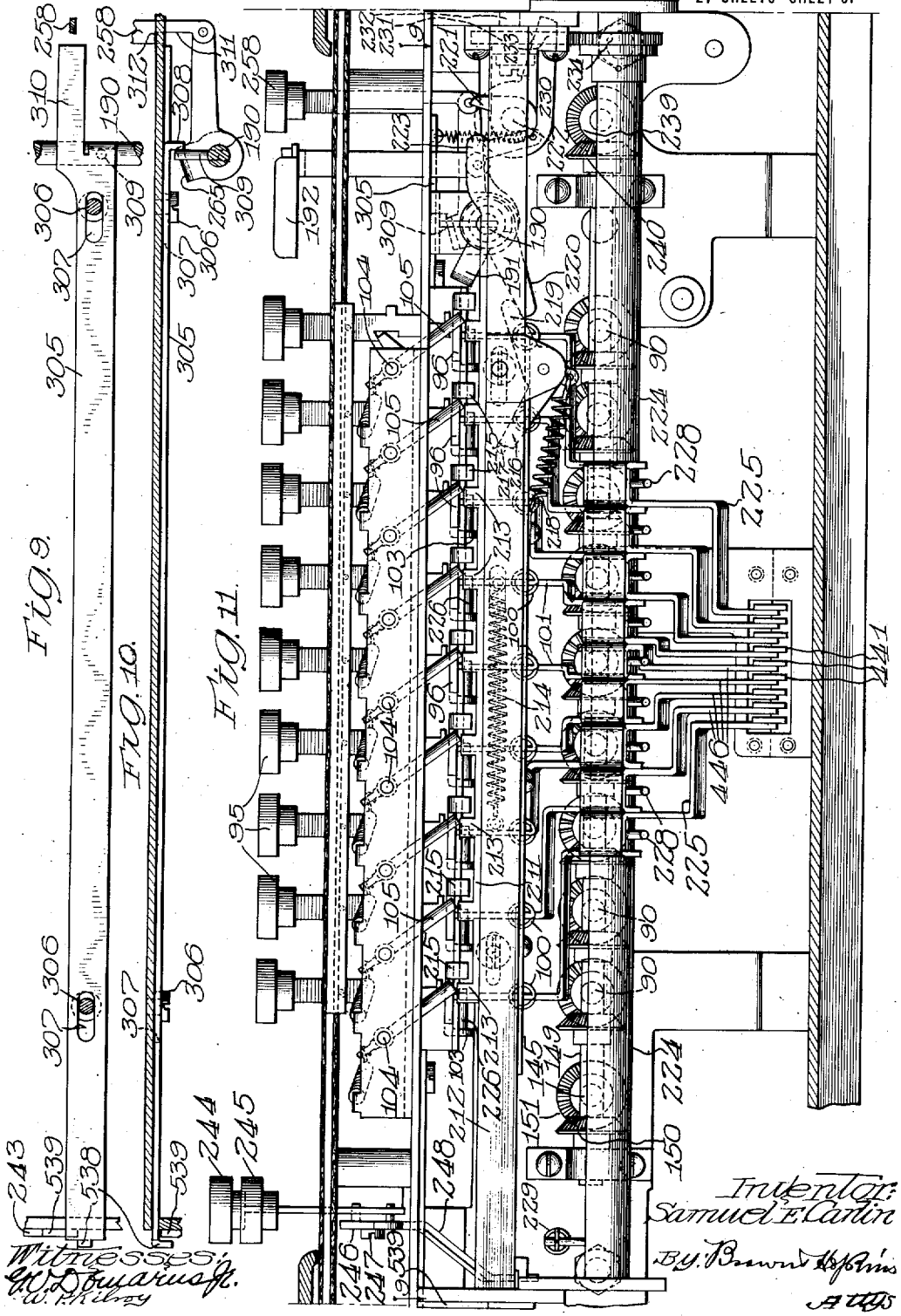

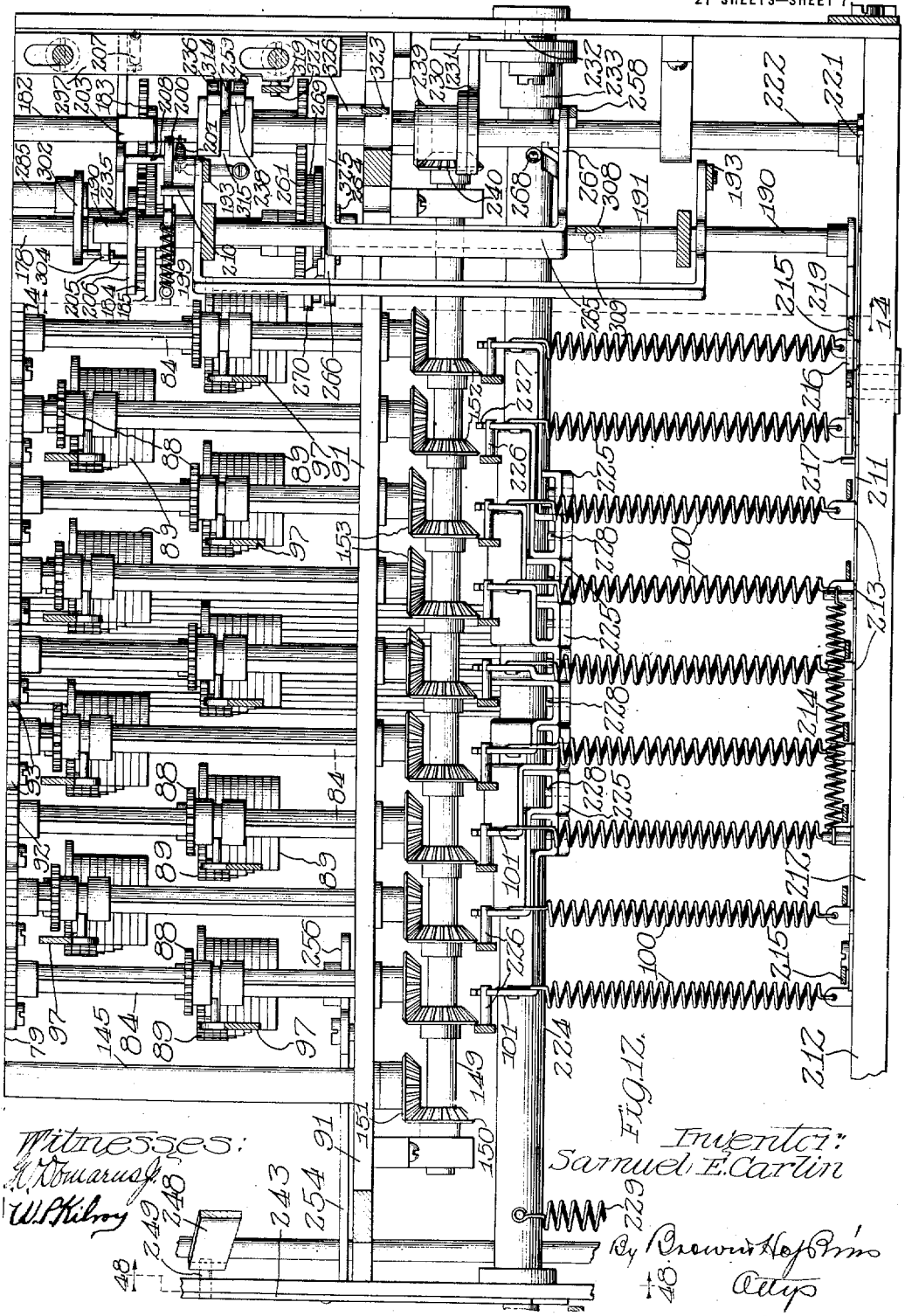

S. E. CARLIN.
CALCULATING MACHINE.
APPLICATION FILED SEPT. 8, 1911.

1,208,288.

Patented Dec. 12, 1916.
27 SHEETS—SHEET 9.

Witnesses:
G. W. Tomarus Jr.
W. P. Kilroy

Inventor:
Samuel E. Carlin
By Brown & Hopkins
Attys.

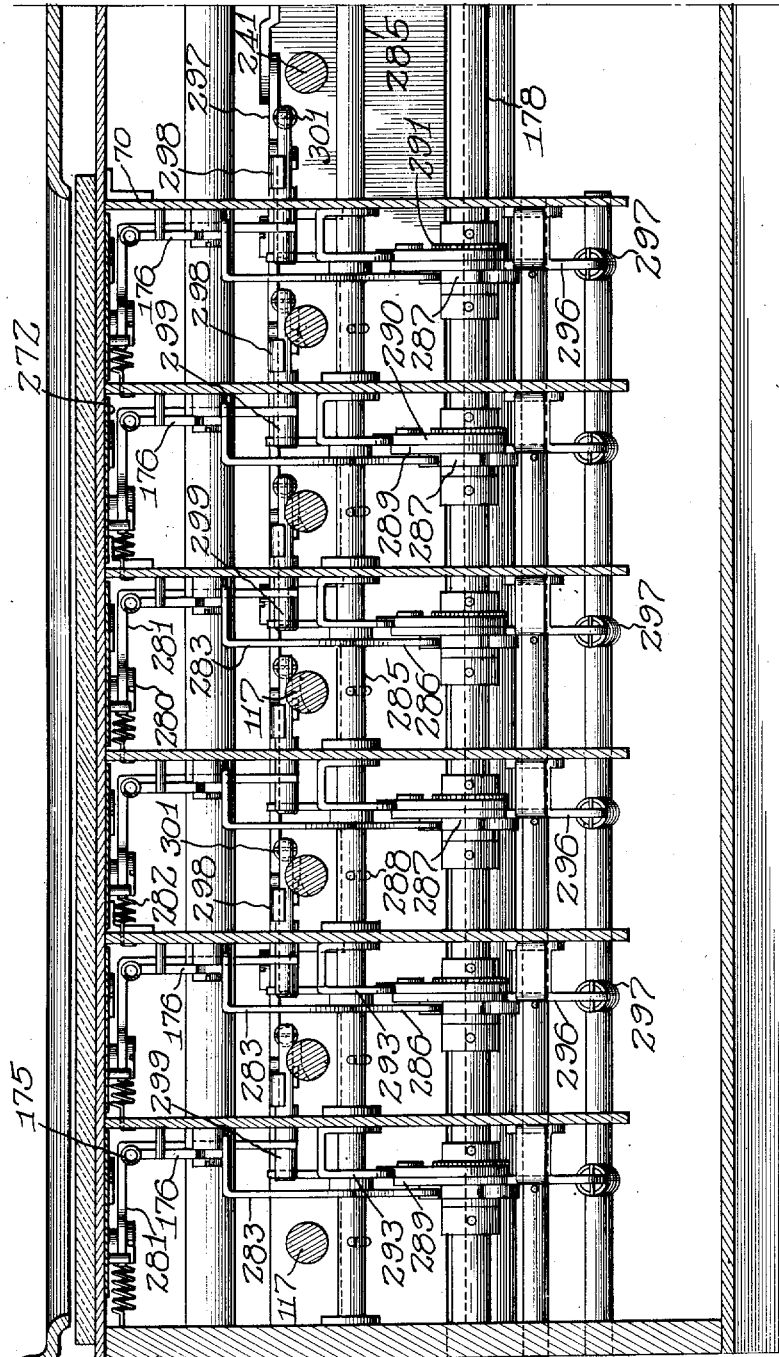

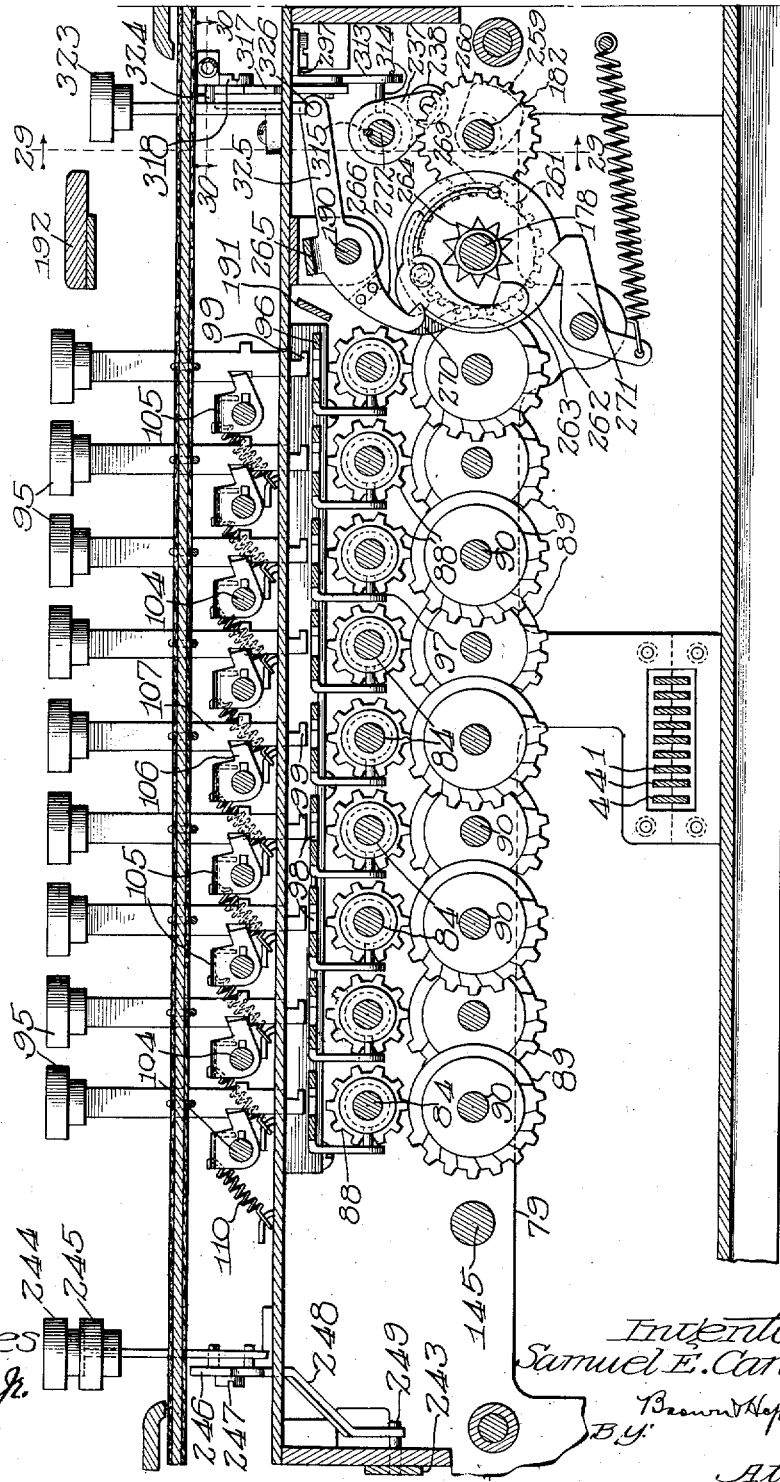

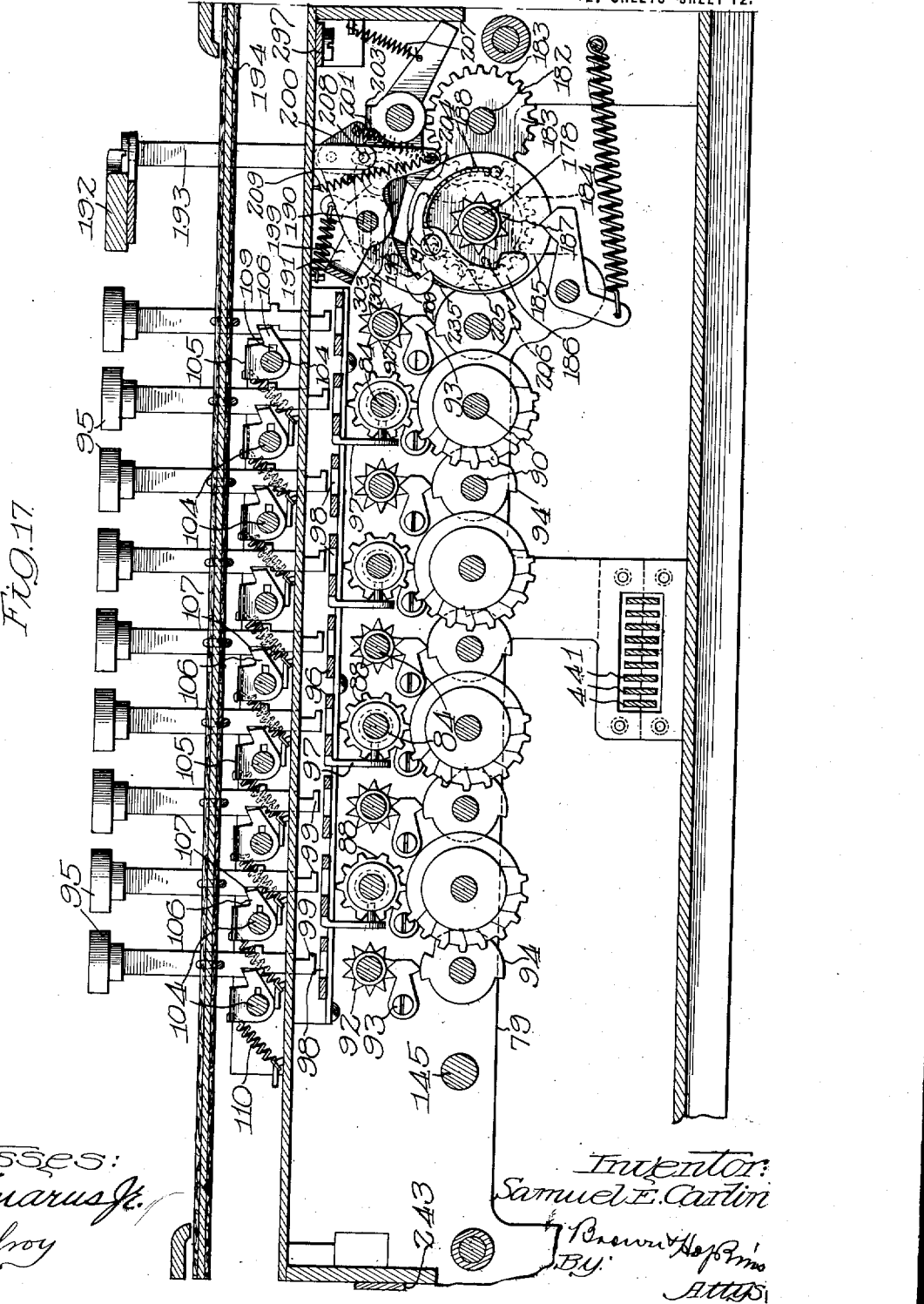

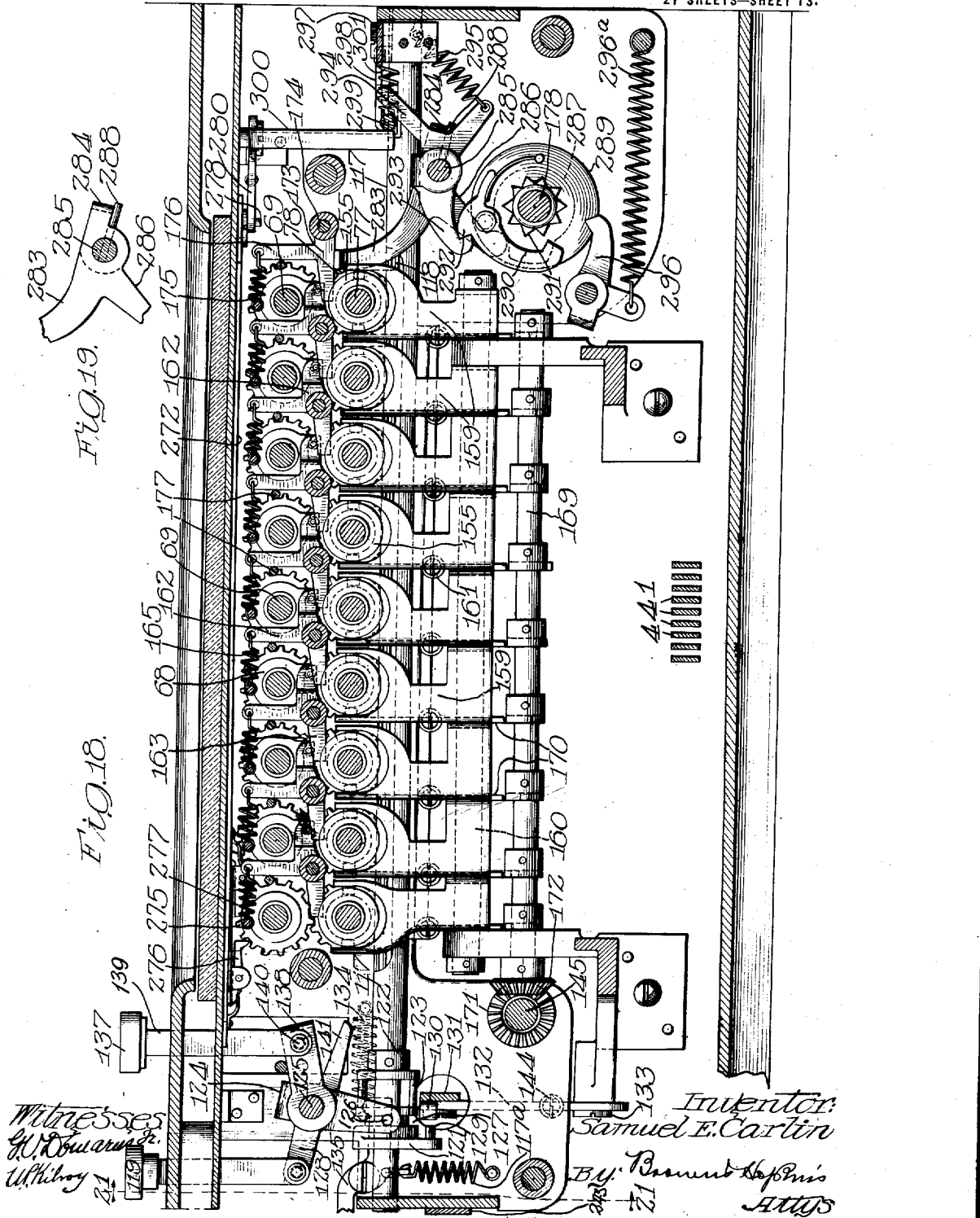

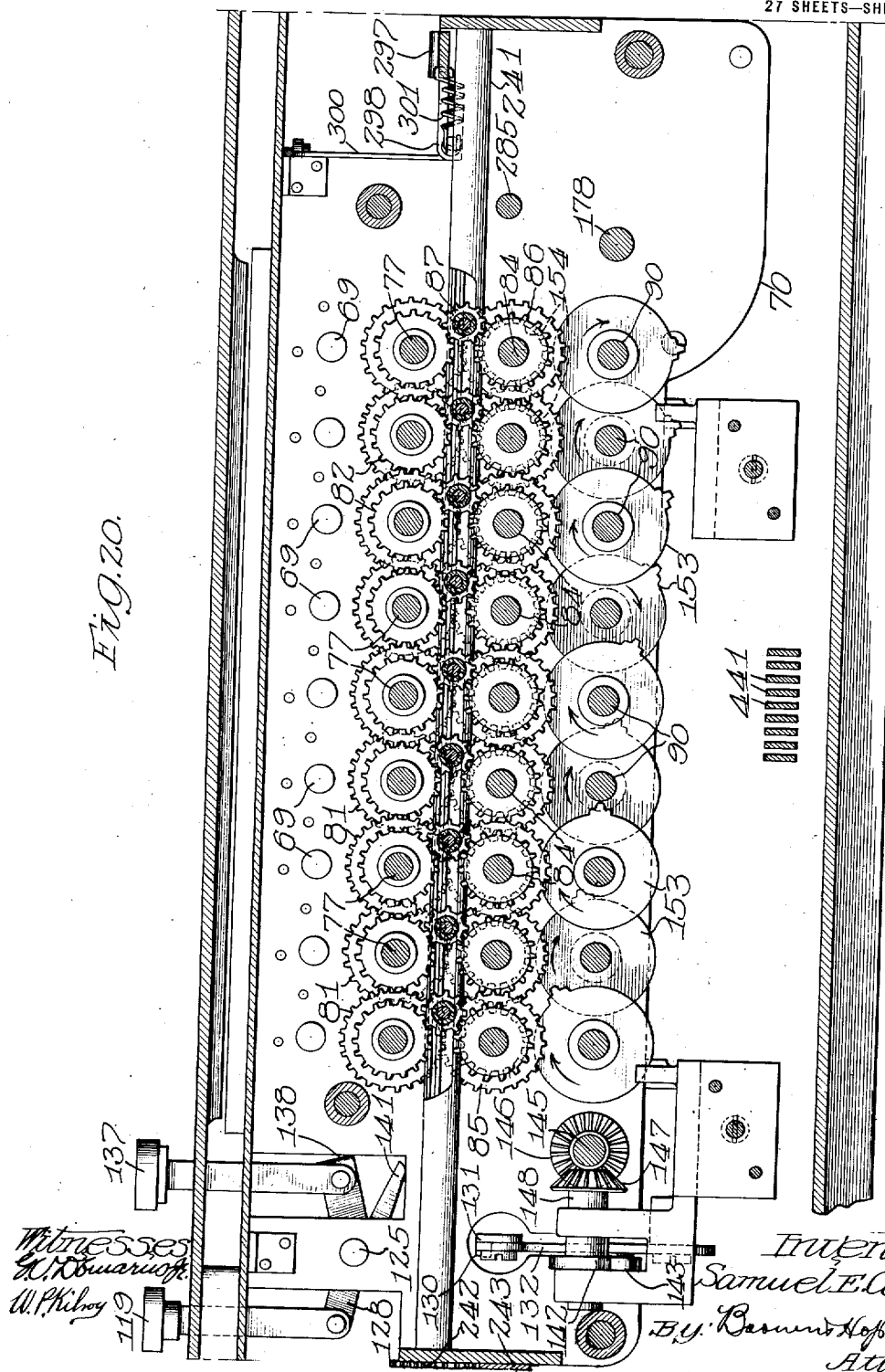

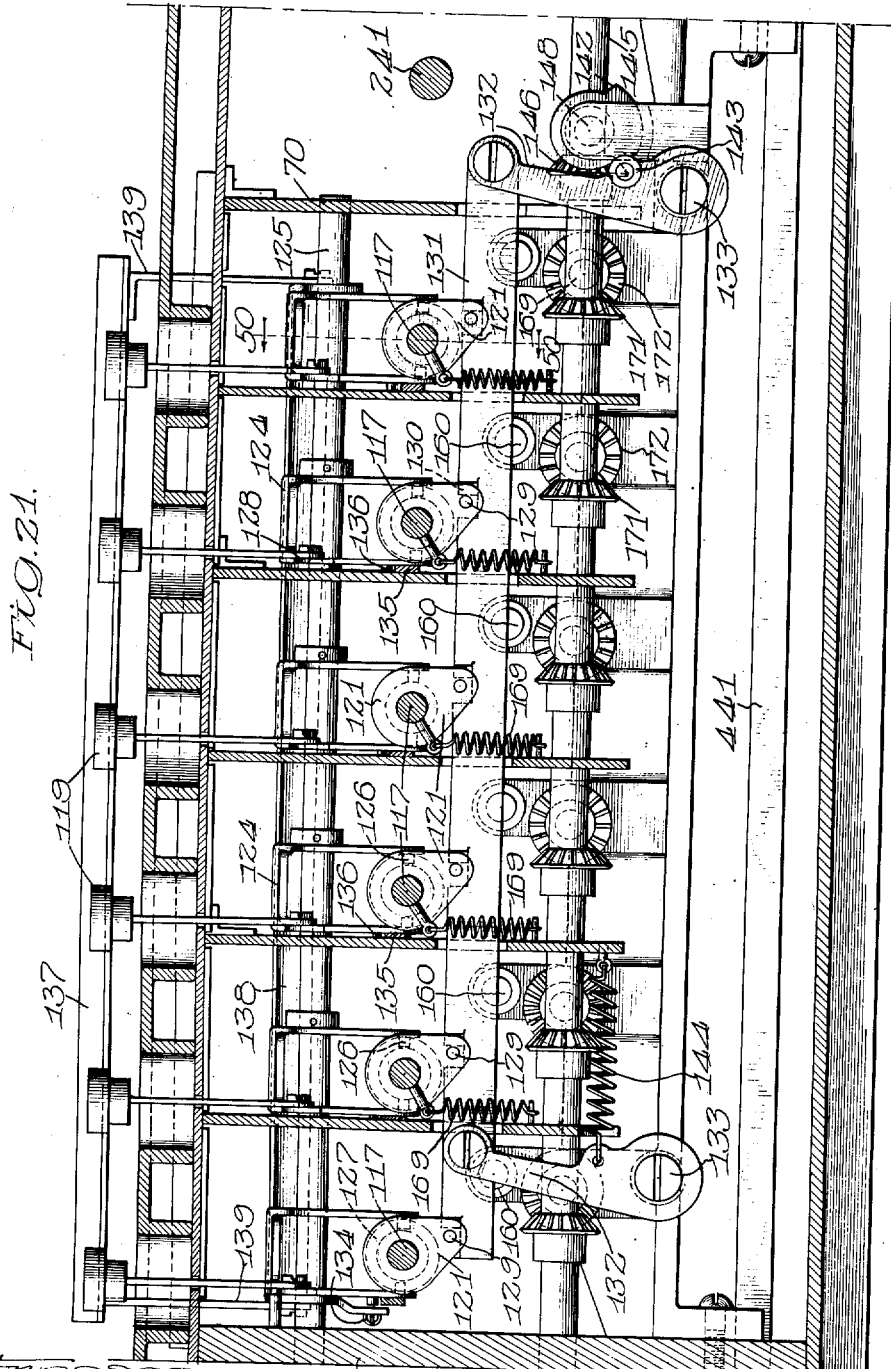

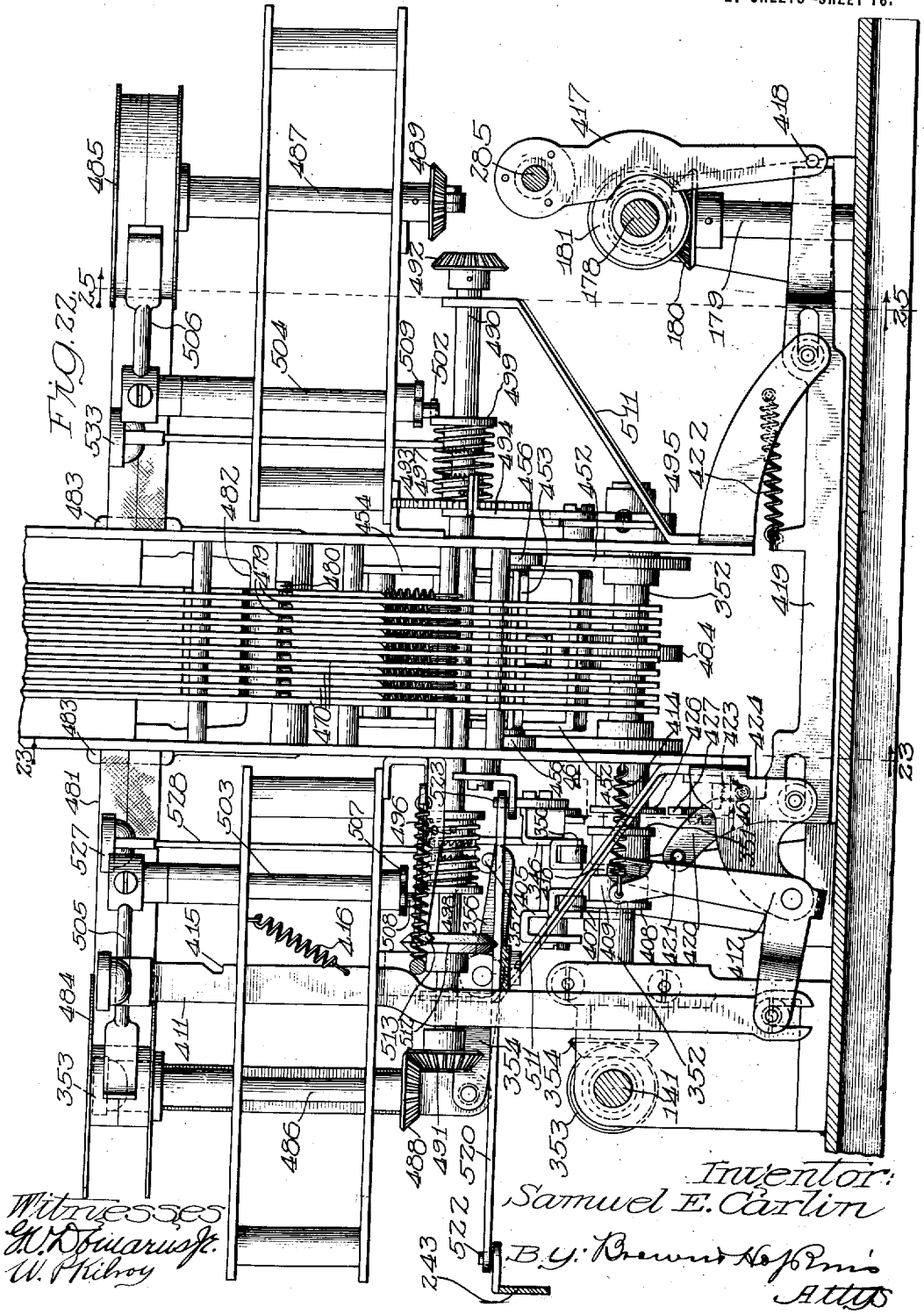

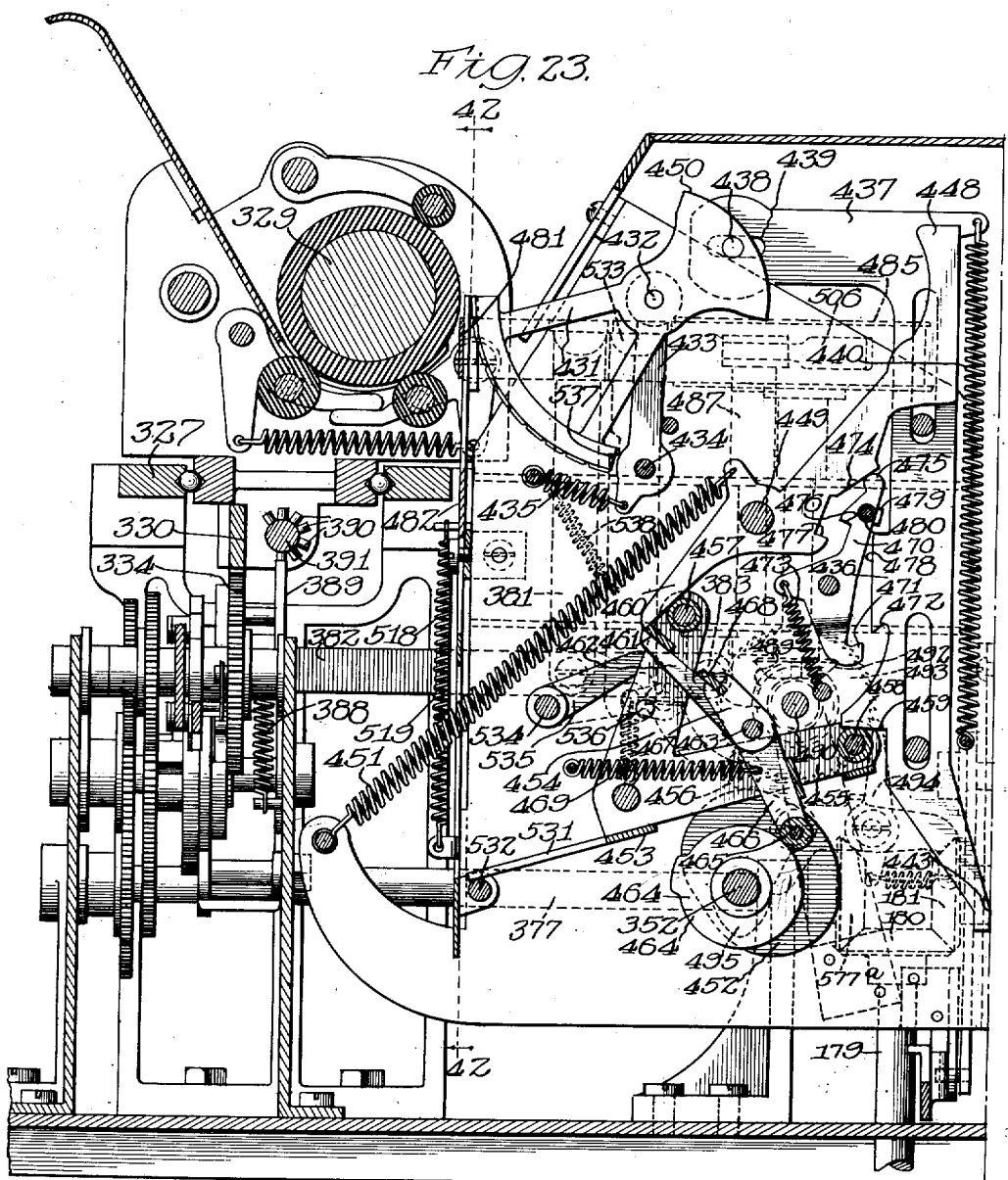

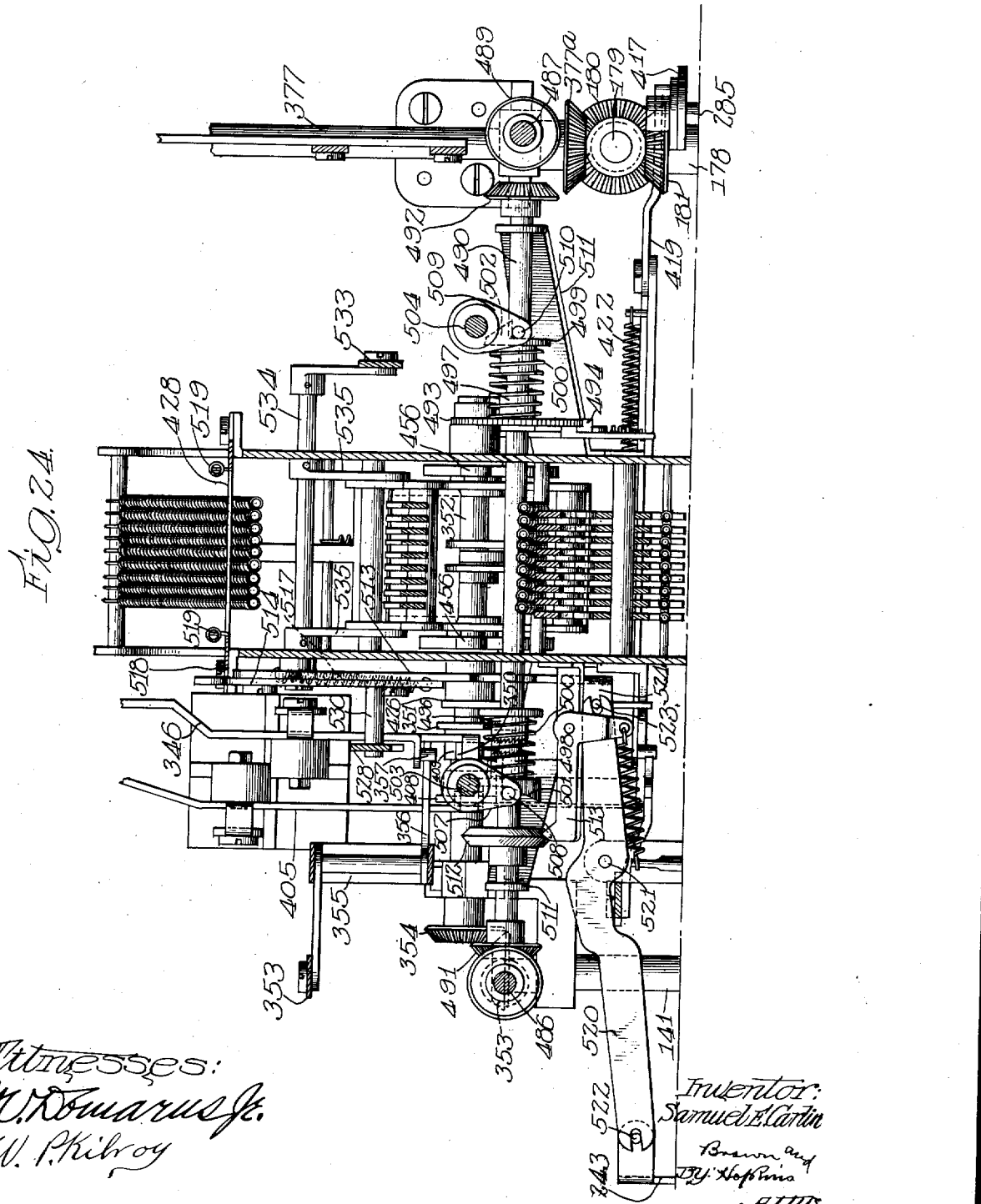

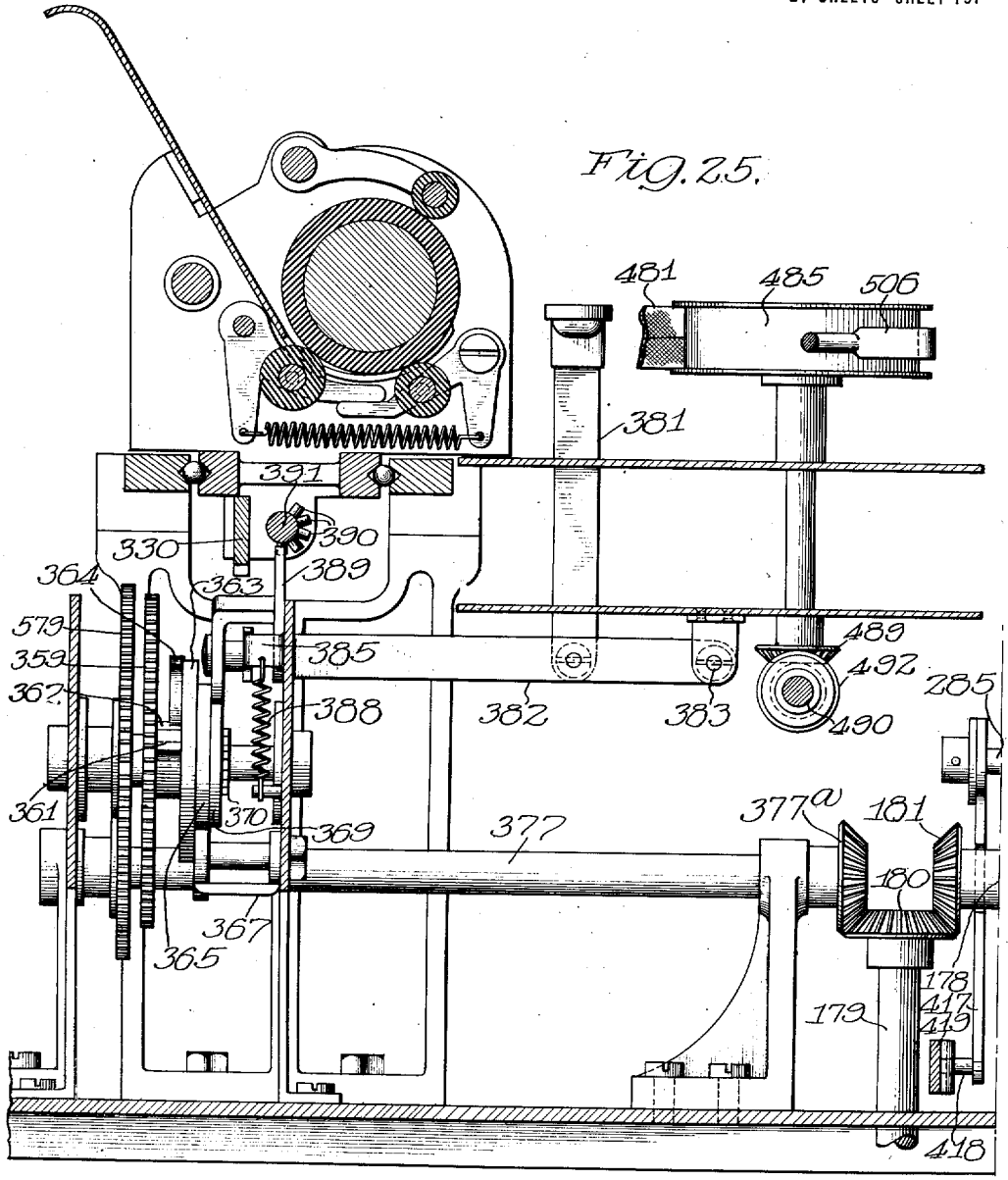

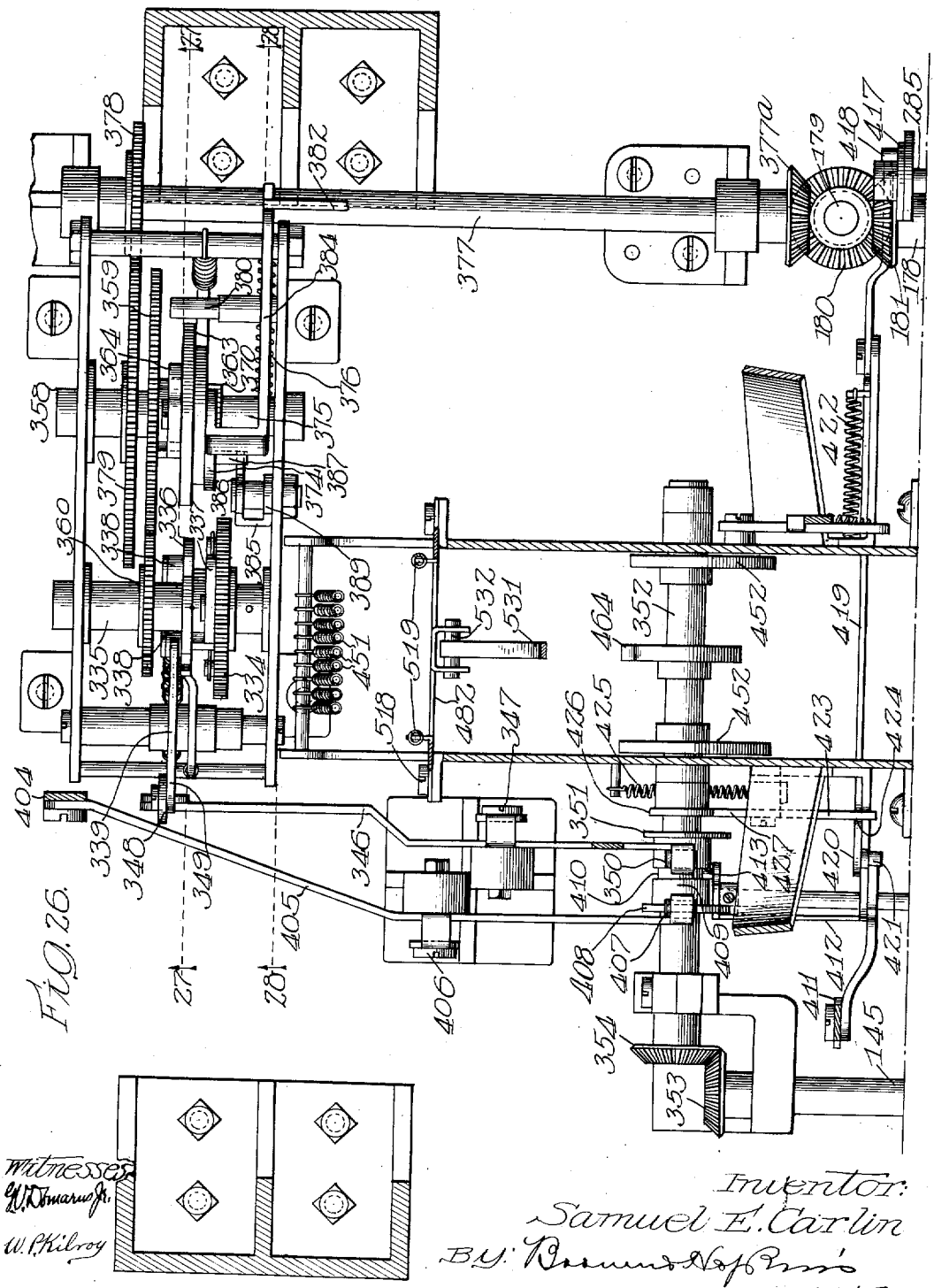

S. E. CARLIN.
CALCULATING MACHINE.
APPLICATION FILED SEPT. 8, 1911.

1,208,288.

Patented Dec. 12, 1916.
27 SHEETS—SHEET 21.

Witnesses:
G. W. Kmarus Jr.
W. P. Kilroy

Inventor:
Samuel E. Carlin
By Brown & Hopkins
Attys.

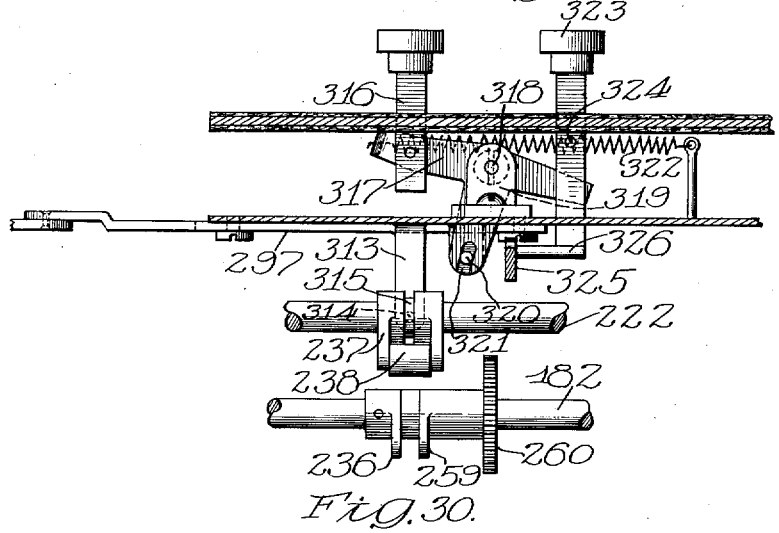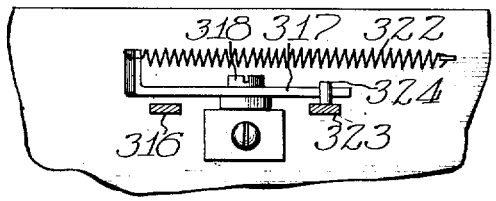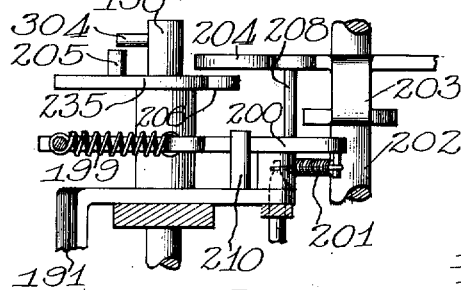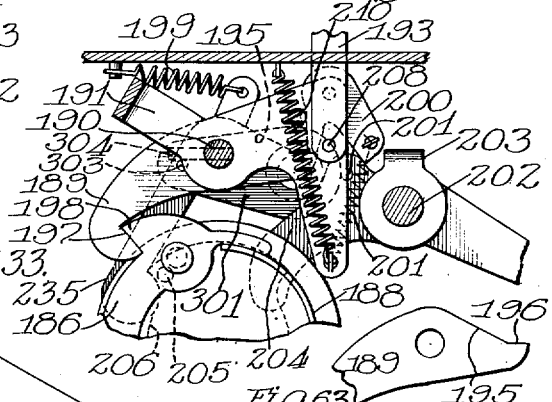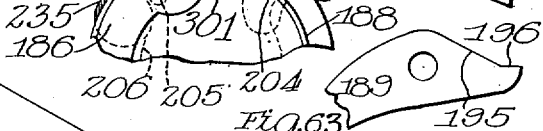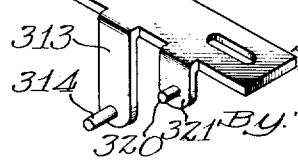

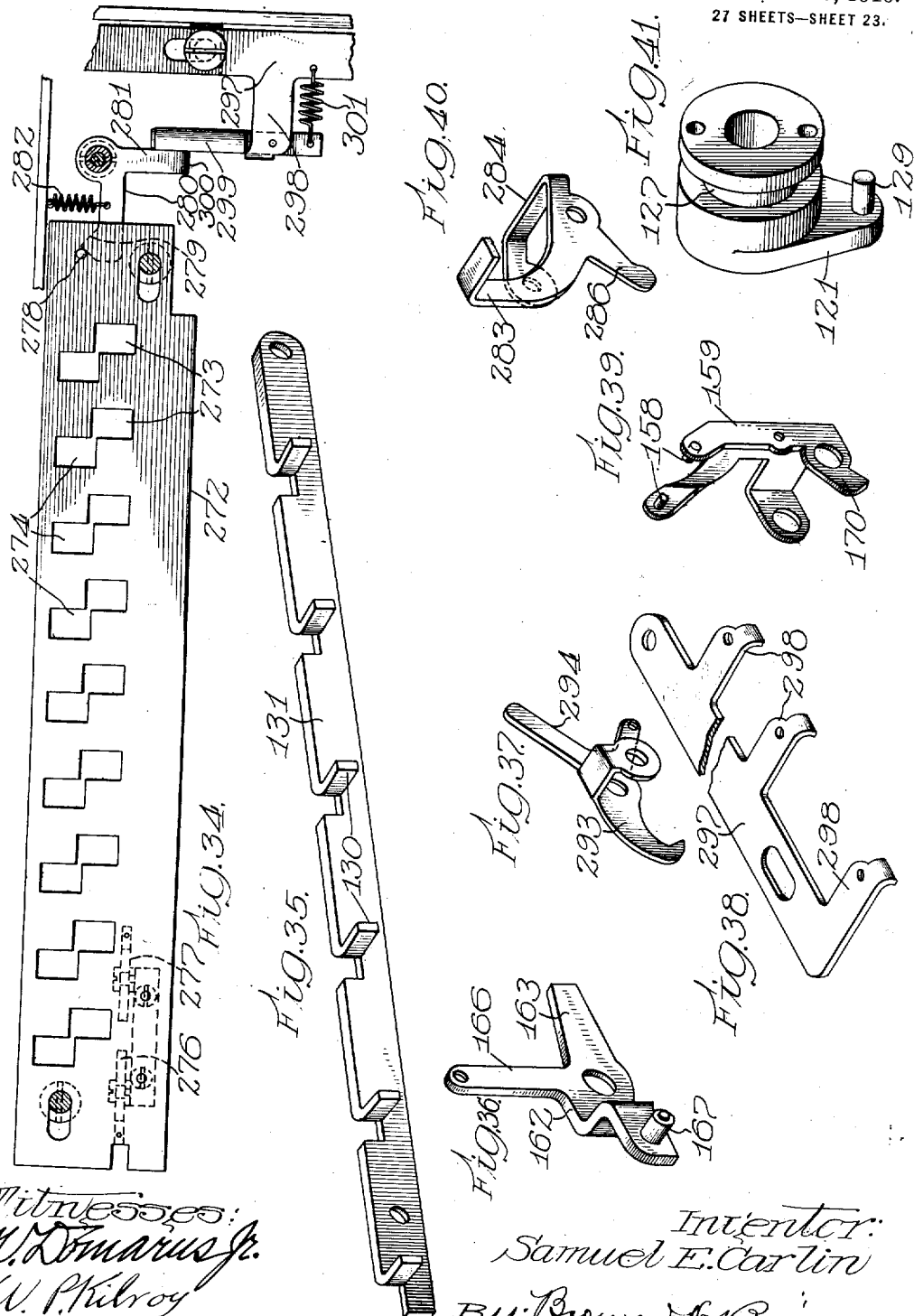

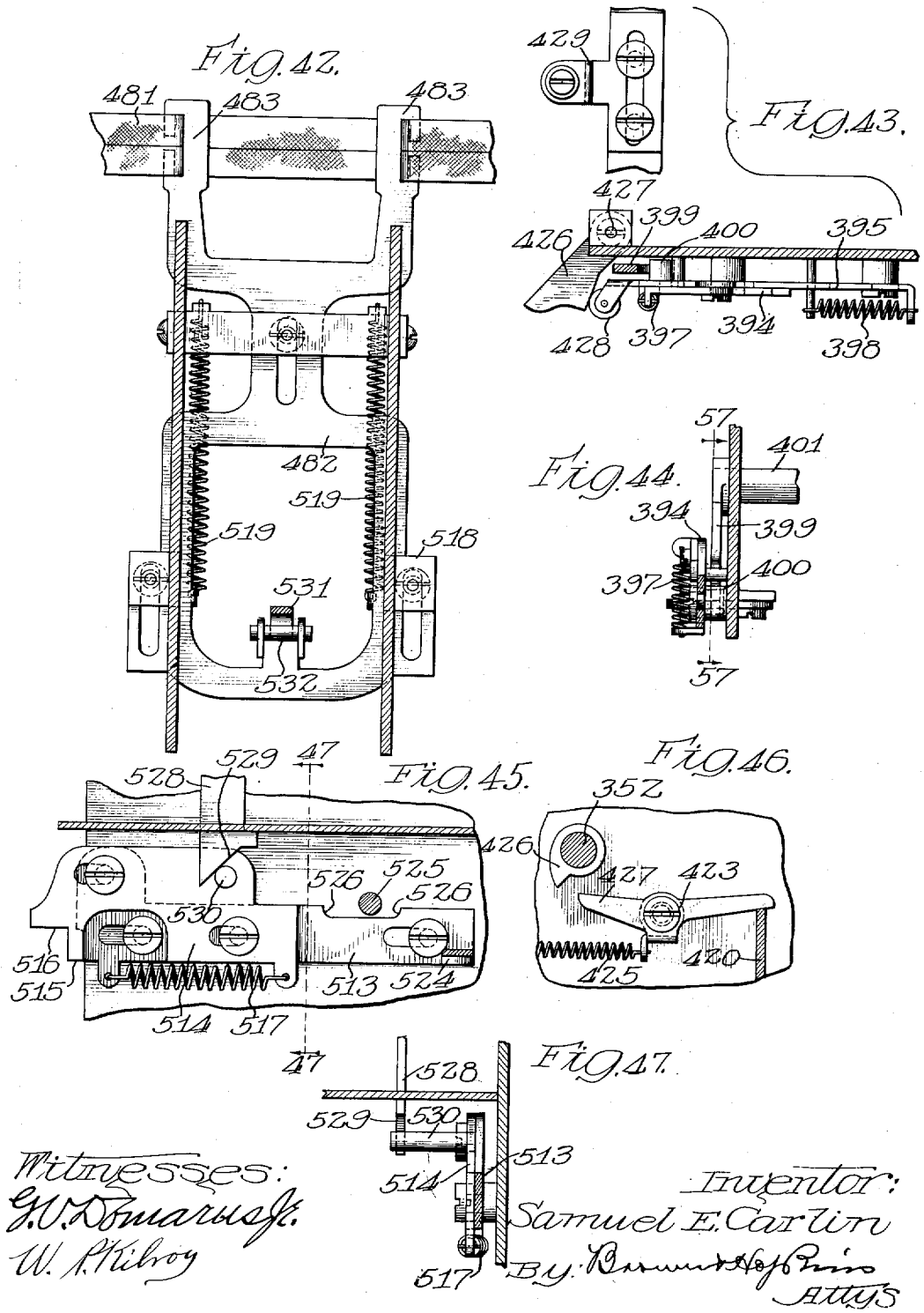

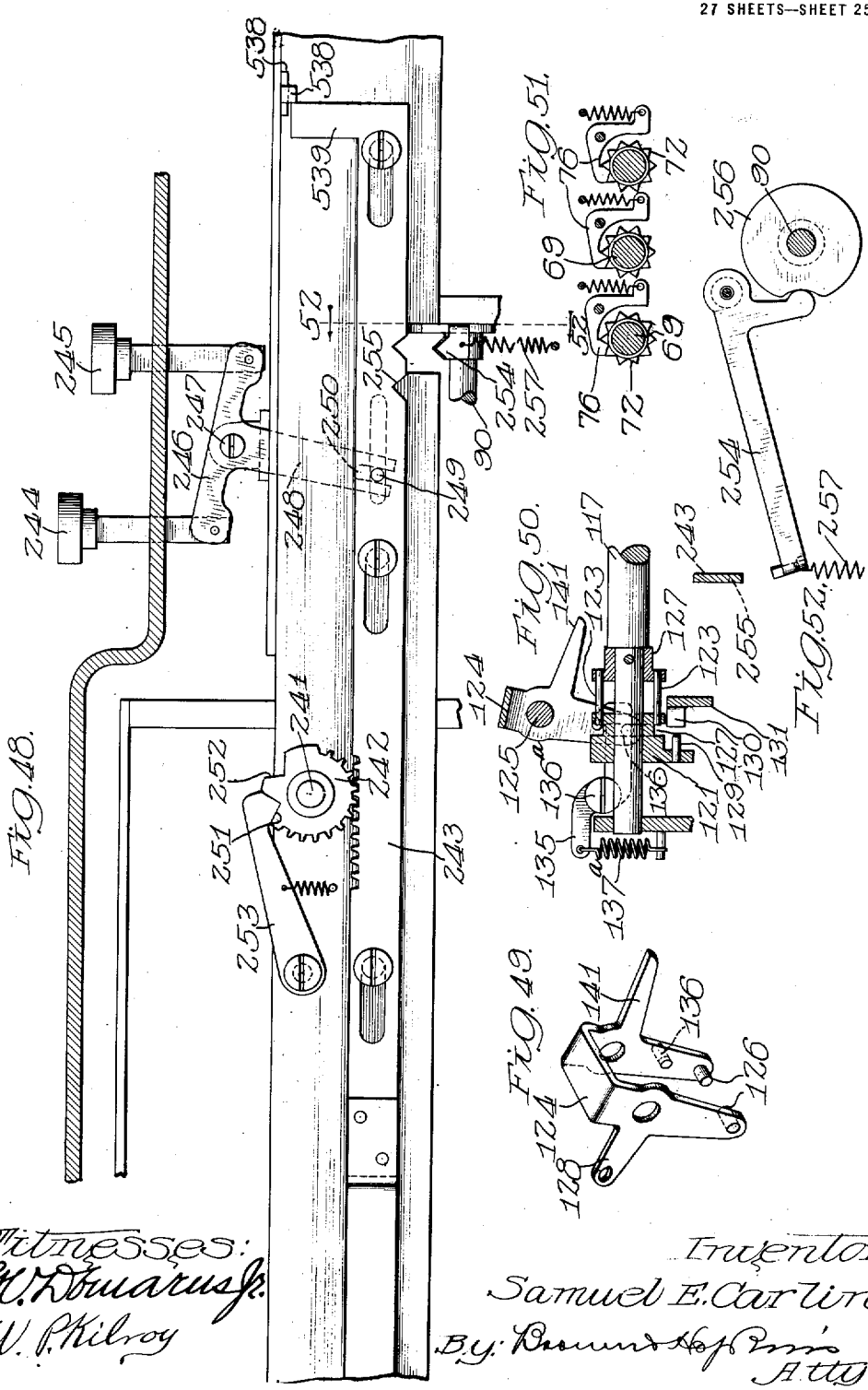

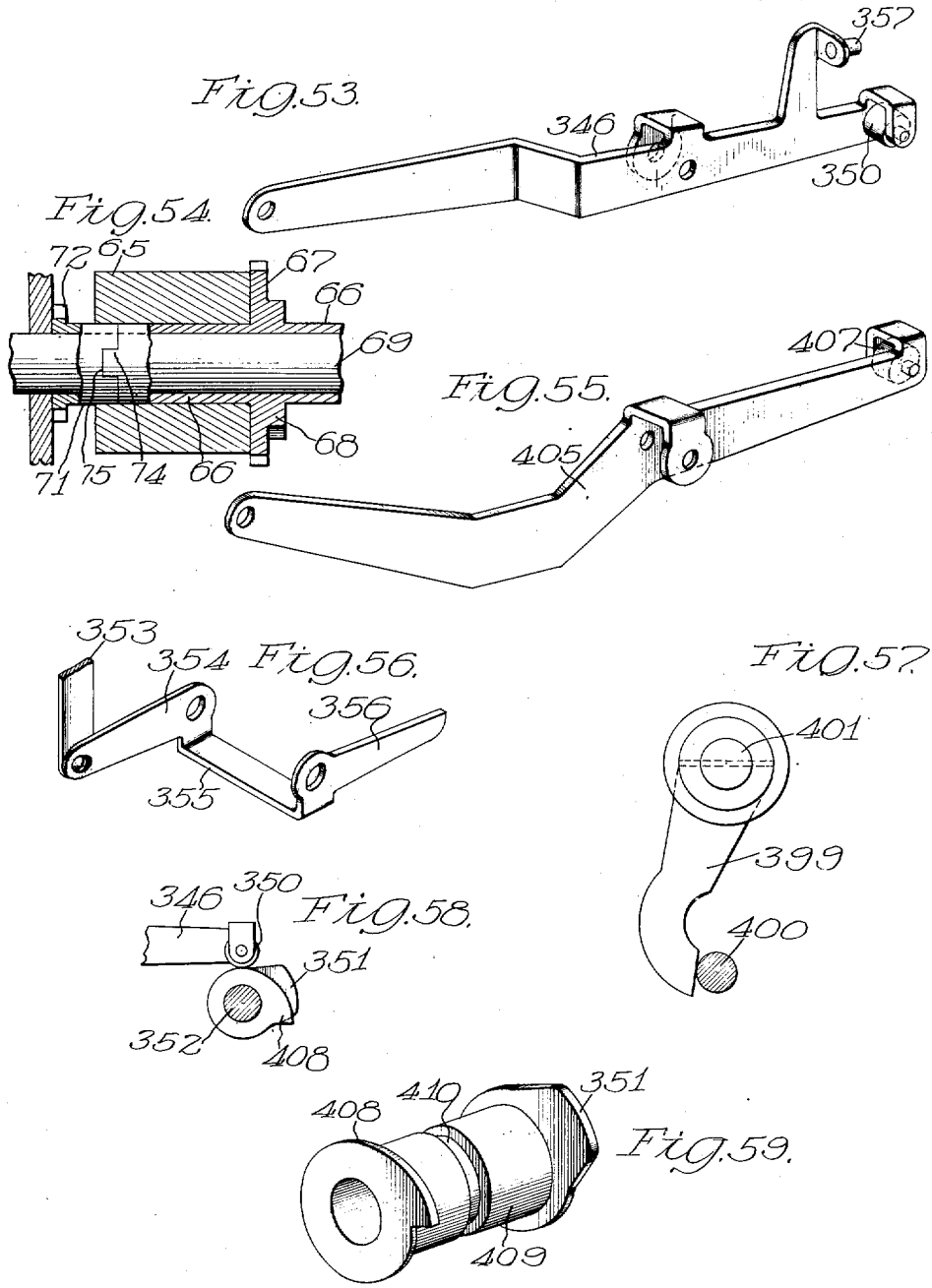

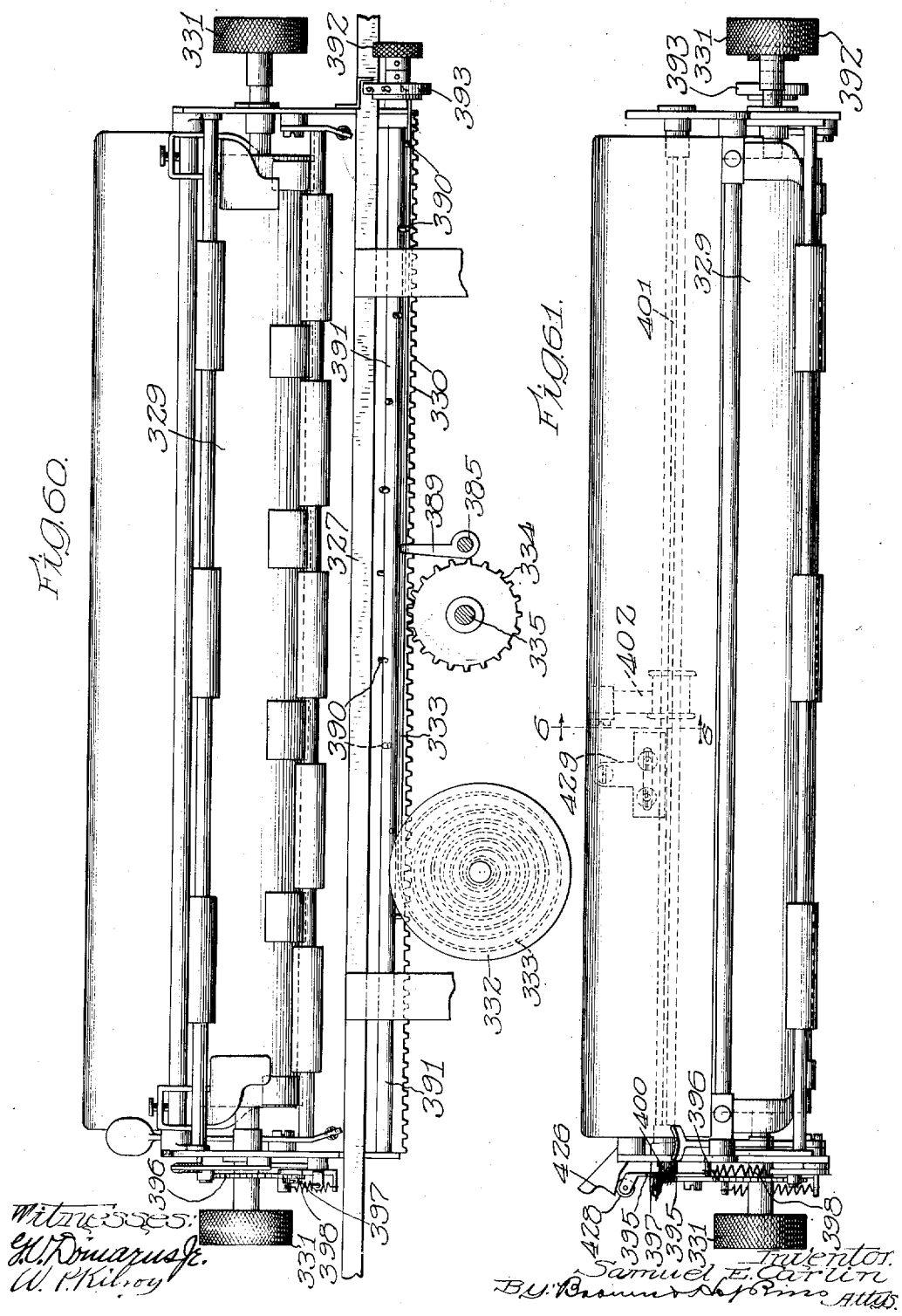

UNITED STATES PATENT OFFICE.

SAMUEL E. CARLIN, OF CHICAGO, ILLINOIS, ASSIGNOR TO CARLIN CALCULATOR COMPANY, OF CHICAGO, ILLINOIS, A CORPORATION OF ILLINOIS.

CALCULATING-MACHINE.

1,208,288.     Specification of Letters Patent.     Patented Dec. 12, 1916.

Application filed September 8, 1911. Serial No. 648,381.

*To all whom it may concern:*

Be it known that I, SAMUEL E. CARLIN, a citizen of the United States, residing at Chicago, in the county of Cook and State of Illinois, have invented certain new and useful Improvements in Calculating-Machines, of which the following is a specification.

This invention relates to calculating machines of the eight-one (81) key multiple totalizers, listing type; and consists in substantially the construction and combinations embraced in the appended claims.

With the above and other objects in view, as will be hereinafter apparent, this invention consists in the construction, combination and arrangement of parts all as hereinafter more fully described, claimed and illustrated in the accompanying drawings, wherein—

Figure 14:
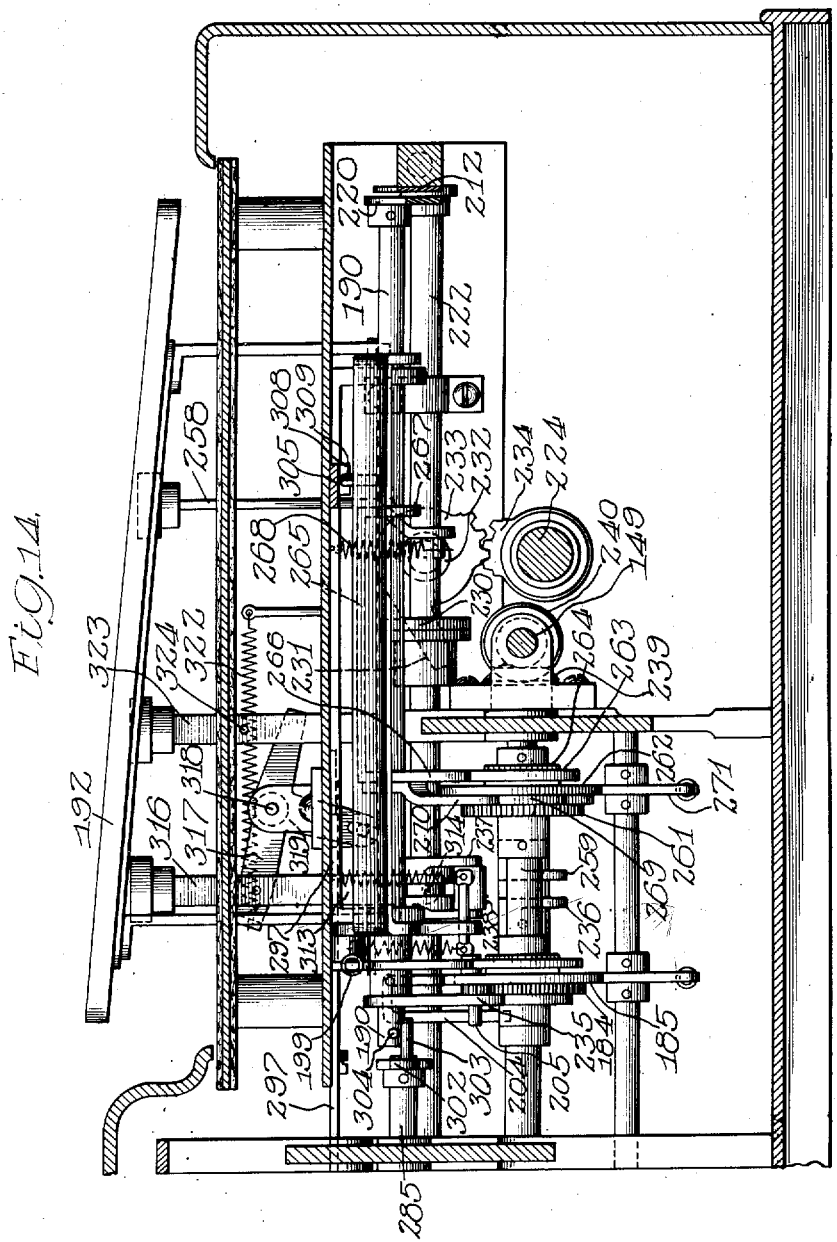
Figure 27:
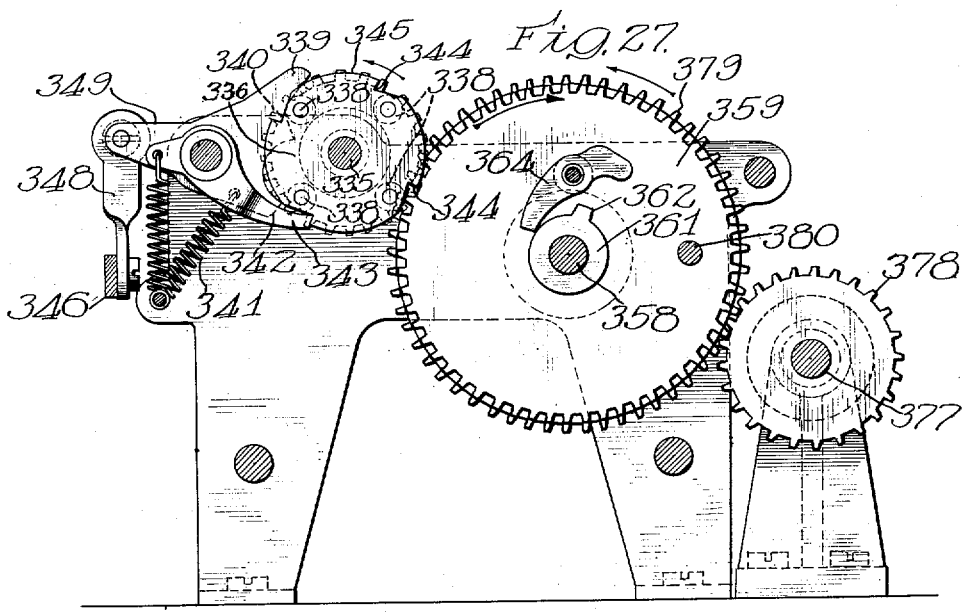
Figure 28:
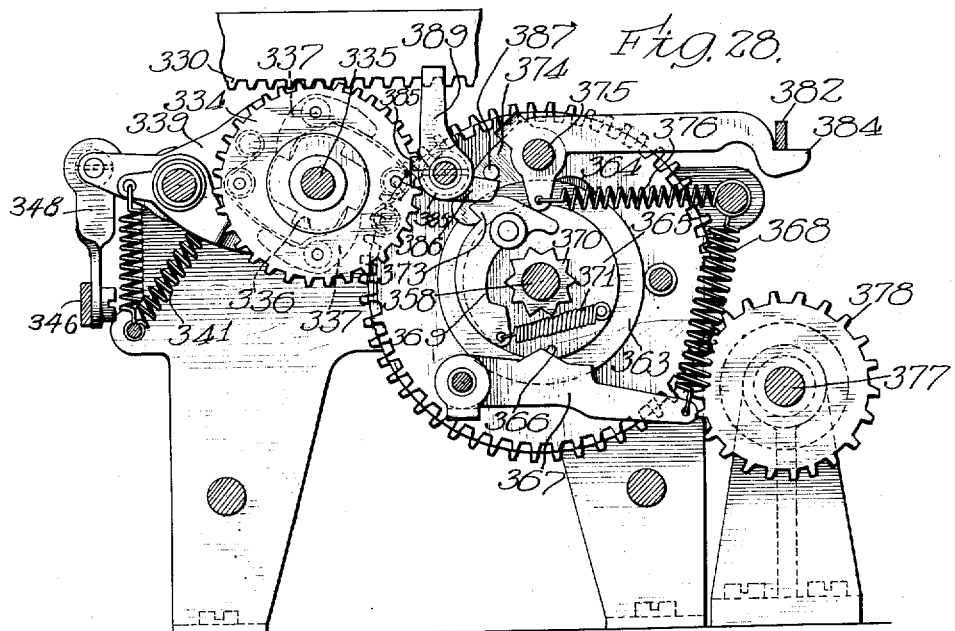

Figure 1 is a top plan view of a machine constructed in accordance with the present invention, illustrating the same adapted for use in connection with six totalizers; Fig. 2 is a detail longitudinal section taken along line 2—2 of Fig. 1, and illustrates the keyboard and the selective mechanism for imparting a varied movement to the totalizer; Fig. 3 is a detail sectional view along the line 3—3 of Fig. 2, illustrating the coöperation of a denominational key with its selective slide and the operating mechanism for the slide lock and release; Fig. 4 is a sectional view along the line 4—4 of Fig. 1, and illustrates the totalizers and the mechanism for setting the same for operation; Fig. 5 is a vertical section taken along the line 5—5 of Fig. 1, and illustrates the carriage and ribbon control and the operating mechanisms therefor; Fig. 6 is a vertical section taken along the line 6—6 Fig. 61, and illustrates a detail of the line spacing mechanism of the platen; Fig. 7 is a transverse vertical section taken along the line 7—7 of Fig. 4, illustrating a portion of one totalizer and the details of the carrying mechanism; Fig. 8 is a vertical section taken along the line 8—8 of Fig. 7, and likewise illustrates carrying mechanism and also the details of the totalizer control, whereby the totalizer is made active or inactive; Fig. 8ᵃ is a section taken along the line 8ᵃ—8ᵃ of Fig. 8 and shows the details of the clutch coöperating with the totalizer control for making one of the number bearing members of said totalizer active when so desired; Fig. 9 is a horizontal section taken along the line 9—9 of Fig. 11 and illustrates the lock for the motor bar and error key to lock one from operation during the operation of the other, and vice versa; Fig. 10 is a side elevation thereof; Fig. 11 is a vertical section taken along the line 11—11 of Fig. 2 and illustrates the locks of the selective slides operated by the keys, the keyboard, the motor bar, the error key and the printing mechanism control operated by the selective slides; Fig. 12 is a horizontal section taken along the line 12—12 of Fig. 2, showing the driving mechanism for the totalizers whereby varied movement is imparted thereto, and the motor bar clutch; Fig. 13 is a section taken along the line 13—13 of Fig. 4, illustrating the shaft arrangement under the totalizers for operating the carrying mechanisms, etc., thereof; Fig. 14 is a vertical section taken along the line 14—14 of Fig. 12, illustrating the clutches coöperating with the motor bar and error key and also illustrating the repeat and the repeat release keys; Fig. 15 is a vertical section taken longitudinally of the machine along the line 15—15 of Fig. 13 and illustrates the mechanism whereby the units error occurring in the algebraic registers or totalizers of the present machine is accomplished; Fig. 16 is a vertical transverse section taken along the line 16—16 of Fig. 2 and illustrates the selective slide coöperating with each denominational series of keys, the operating mechanism coöperating with said keys for the locks of said slides, and the repeat release key and its coöperating clutch; Fig. 17 is a similar view taken along the line 17—17 of Fig. 2 and illustrates the motor bar and its coöperating clutch; Fig. 18 is a vertical section taken along the line 18—18 of Fig. 4 and illustrates in detail the carrying mechanism for one totalizer, the trip operated by the shutter of said totalizer for the correction of the units error, and the mechanism for making the totalizer active or inactive; Fig. 19 is a fragmentary elevation of the trip coöperating with the mechanism for releasing the carrying clutch of the number bearing members of the units order of the totalizer during the correction of the units error; Fig. 20 is a transverse section taken along the line 20—20 of Fig. 4 and illustrates in detail the mechanism for reversing the direction of rotation of the totalizers and also the train of carrying gears; Fig. 21 illustrates the mechanism for controlling the activity of the totalizers; Fig. 22 is a vertical transverse section taken along the line 22—22 of Fig. 5 and illustrates the ribbon feed and reverse, the printing mechanism and portions of the carriage control; Fig. 23 is a vertical section taken along the line 23—23 of Fig. 22 and illustrates in detail the printing mechanism and portions of the carriage control; Fig. 24 is a horizontal section taken along the line 24—24 of Fig. 5 and illustrates details of the printing mechanism, the ribbon feed and reverse and the carriage control; Fig. 25 is a vertical section taken along line 25—25 of Fig. 22 and illustrates in detail portions of the carriage return and escapement and also of the ribbon feeding mechanism; Fig. 26 is a horizontal section taken along the line 26—26 of Fig. 5 and illustrates details of the carriage escapement and automatic return; Fig. 27 is a vertical section taken along line 27—27 of Fig. 26, illustrating the details of the carriage return; Fig. 28 is a similar view taken along the line 28—28 of Fig. 26, and illustrates further details of the carriage return and the coöperation of the returning mechanism with the carriage; Fig. 29 is a vertical section taken along the line 29—29 of Fig. 16, illustrating the repeat and repeat release keys; Fig. 30 is a view illustrating the details of the bell crank coöperating with the repeat and repeat release keys, the same being a horizontal section taken along the line 30—30 of Fig. 16; Fig. 31 is a top plan view of the motor bar clutch whereby power is intermittently taken from a constantly rotating shaft and imparted to the totalizer drive shafts; Fig. 32 is a sectional elevation thereof; Fig. 33 is a perspective view of the slide coöperating with the repeat key for rendering the return of the returning mechanism for the selective slides inoperative, and also coöperates with the shutters or shields of the totalizers; Fig. 34 is a plan view partly in section of one of the shutters coöperating with each totalizer, and illustrates in detail the mechanism for the correction of the units error; Fig. 35 is a perspective view of the slide which operates the clutches for controlling the activity of the totalizers; Fig. 36 is a perspective view of one of the trips coöperating with the carrying clutches; Fig. 37 is a similar view of the trip dog coöperating with the clutch through the medium of which the totalizer drive shafts coöperate for the correction of the units error; Fig. 38 is likewise a perspective view of an extension of the slide illustrated in Fig. 33 which coöperates with the shutters of all of the totalizers, as illustrated in Fig. 34, for the operation of the correction of the units error clutch and also for controlling the activity of the mechanism for the correction of the units error; Fig. 39 is a perspective view of the yokes coöperating with the number bearing members of the totalizers for throwing the carrying clutches into operation; Fig. 40 is a perspective view of the trip illustrated in Fig. 19, which releases the carrying clutch of the number bearing members of the units order during the correction of the units error; Fig 41 is a perspective view of one of the crank arms, through the medium of which the activity of the totalizers is controlled; Fig. 42 is a vertical section taken along the line 42—42 of Fig. 23 and illustrates the ribbon frisket and its associated elements; Fig. 43 is a horizontal section taken along the line 43—43 of Fig. 5 and illustrates the line-spacing mechanism of the platen; Fig. 44 is a vertical section taken along the line 44—44 of Fig. 5 and also illustrates details of the line spacing mechanism of the platen; Fig. 45 is an elevation partly in section of the mechanism for controlling the movement of the ribbon frisket for multi-color printing; Fig. 46 is a vertical section taken along the line 46—46 of Fig. 22 and illustrates a detail of the carriage controlling mechanism; Fig. 47 is a vertical section taken along the line 47—47 of Fig. 45 and illustrates a detail of the mechanism for controlling the throw of the ribbon frisket; Fig. 48 is a longitudinal section taken along lines 48—48 of Figs. 12 and 13 and illustrates the mechanism for reversing the direction of rotation of the totalizers and also for controlling the throw of the ribbon frisket from such adjustment of the totalizers; Fig. 49 is a detail perspective view of the yoke through the medium of which the activity of each totalizer is controlled; Fig. 50 is a vertical section taken along the line 50—50 of Fig. 21 and illustrates in detail the mechanism for rendering each totalizer active or inactive, as desired; Fig. 51 is a vertical section taken along the line 51—51 of Fig. 4 and illustrates the truing mechanism for coöperating with each totalizer; Fig. 52 is a vertical section taken along the line 52—52 of Fig. 48 and illustrates in detail a lock for preventing a change of the direction of rotation of the totalizers during the operation of the machine; Fig. 53 is a perspective view of the lever controlling the escapement of the carriage; Fig. 54 is a vertical section taken along the line 54—54 of Fig. 7 and illustrates a number bearing member and its associated gears; Fig. 55 is a perspective view of the lever for coöperating with the platen for line-spacing purposes; Fig. 56 is a perspective view of a yoke coöperating with the key for manually escaping the carriage; Fig. 57 is a vertical section taken along the line 57—57 of Fig. 44, and illustrates a detail of the line-spacing mechanism; Fig. 58 is an elevation, partly in section, and illustrates the cam for shifting the levers coöperating with the escapement of the carriage; Fig. 59 is a perspective view of the cams illustrated in Fig. 58, and is a detail of the escapement mechanism; Fig. 60 is a front elevation of the carriage and platen; Fig. 61 is a top plan view thereof; Fig. 62 is a detail elevation of the terminal of one of the setting bars for the printing mechanism, which is operated from one of the selective slides; Fig. 63 is a fragmentary detail elevation of the terminal of the trip dog for the clutch of the motor bar.

Referring more particularly to the drawings, and in the present exemplification of this invention the registers, any number of which may be provided, each comprises a series of rotatable number bearing members or wheels 65 having two sets of figures arranged around their peripheries which figures progress successively from zero and in opposite directions. In the present exemplification of the invention six of these registers are shown and for the convenience of construction there is provided a tubular member 66 (see particularly Fig. 54) which extends into the member 65 from one end thereof to form a hub and terminates short of the other end. A gear wheel 67 is formed as part of the tubular member 66 and a one-toothed gear 68 is also formed as part of the tubular member and serves in a capacity to be hereinafter set forth. Each of the registers comprises nine of these number bearing members 65 and a series of shafts 69, which for the sake of convenience will be hereinafter designated as the register shafts, are provided, one for each of the number bearing members. These shafts 69 are mounted in any fixed support and extend longitudinally of the machine and are of a length to accommodate the respective number bearing members of all of the registers, the respective members of the registers being mounted loosely upon one of these shafts. The hub 66 of each of the members 65 preferably projects for some distance beyond the portion 68 as shown more clearly in Figs. 4 and 8, and abut an upright 70 so as to hold the number bearing members from longitudinal displacement on the shafts 69. A tubular member 71 is also provided for each of the members 65 and integral therewith is a star or toothed wheel 72 which also abuts another upright 73 with the toothed wheel preferably in close proximity to one face of the upright. The other end of the tubular portion 71 projects into the member 65 and terminates in close proximity to the end of the tubular member 66. These members 66, 71, are provided respectively with a projecting portion 74 and a recessed portion 75 adapted to receive the projecting portion so that the toothed wheel 72 will be connected with the member 65 for rotation therewith.

In order to lock the number bearing members 65 against overthrow or against rotary motion due to vibration of the parts when the number bearing members are released or unlocked with respect to the driving mechanism, a pawl 76 which may be of any well known construction is provided and is pivotally mounted upon the uprights 73 to coöperate with the toothed wheel 72.

The tubular member 66, the gear 67 and the one-toothed portion 68 are connected with the member 65 for rotation therewith and a rotary motion is imparted to the members 65 from a shaft 77. As the construction and operation of each of the number bearing members of the registers is the same, the specific description of one of the members and its operating parts will apply equally as well to them all.

Loosely mounted upon the shaft 77 is a gear 78 (reference being now had more particularly to Figs. 4, 7 and 8) which meshes with the gear 67 of the member 65.

The shaft 77 is journaled in the uprights 79, 80, (see Figs. 2 and 4), and one of these shafts is provided for each of the shafts 69, the shafts 77 being arranged parallel with and below the respective shafts 69. The forward end of the shaft 77 preferably projects beyond the upright 70. This shaft is adapted to be rotated forwardly and backwardly at the will of the operator and in order to accomplish this gears 81, 82, are loosely mounted upon the shaft and spaced from each other. A clutch 83 is disposed between the gears and is splined or otherwise fastened to the shaft 77 for longitudinal adjustment thereon and is adapted to be moved with respect to the gears 81, 82, to lock either gear to the shaft according to the direction of rotation it is desired to give to the shaft. Motion is imparted to this shaft 77 from another shaft 84 upon which is arranged gears 85, 86, which are secured to the shaft for rotation therewith. The gear 85 meshes directly with the gear 81 on the shaft 77 and the gear 86 meshes with the gear 82 through the medium of an intermediate gear 87. The shaft 84 is adapted to be given a variable degree of motion and for this purpose there is provided on each of the shafts 84 a traveling gear 88 which is adapted to mesh with a series of mutilated gears 89 secured to a shaft 90 which latter is journaled in suitable bearings preferably the upright 79 and an upright 91 and is arranged below the shaft 84. The gears 89 are so positioned that the traveling gear 88 may be shifted longitudinally on the shaft 84 so as to position the gear 88 so as to mesh with any one of the gears 89 with the result that the shaft 84 will be given a degree of rotation corresponding with the number of teeth on the gear 89 with which the gear 88 meshes.

A star wheel 92 is provided on the shaft 84 with which a dog 93 of any desired construction coöperates to lock the shaft 84 against overthrow and against rotary motion due to vibration of the parts when the gear 88 is in a position that it will not mesh with any of the gears 89. This dog 93 is controlled by a cam 94 arranged on the shaft 90.

It will thus be manifest that by shifting the gear 88 on its shaft its degree of rotation will be controlled by the gear 89 with which it meshes and by shifting the clutch 83 (see Fig. 4) so as to lock either of the gears 81, 82, to the shaft 77 the direction of rotation of the number bearing members 65 may be controlled, and the degree of rotation imparted to the shaft 84 through the gears 89, 88, will be likewise imparted to the number bearing members 65. This traveling gear 88 is controlled by a series of keys 95, one of which is provided for each of the gears 89, and these keys 95 are adapted to control a slide 96 (see also Figs. 16 and 17) which is connected by means of an arm 97 with the traveling gear 88. The slide 96 is provided with a series of apertures or openings 98 therethrough, said apertures or openings being of varied lengths, through which the lower extremities 99 of the stem of the keys pass (see also Fig. 3) and the degree of movement of the slide 96 is controlled by the position of the respective keys 95, that is to say, when the key representing the unit 1 is depressed, the slide 96, when released, will assume a position to move the gear 88 so that it will mesh with the gear of the series 89 which is provided with one tooth, thereby causing the shaft 84 to move one step of rotation when the shaft 90 is rotated. The key 95 which is depressed or actuated is held in its depressed position by means of the slide 96, a portion of which passes over a shoulder on the extremity 99 of the key stem when the key is depressed and the slide is released. At the same time a portion of the slide 96 will assume a position with respect to the extremities of all of the other keys of the series 95 which have not been depressed and will therefore lock these keys against actuation.

When the slide 96 is released, it is shifted longitudinally to position the gear 88, by means of an elastic member 100 (see Fig. 2), which elastic member is connected with an arm 101 and this arm is in turn connected with a pin 102 on a depending portion 103 of the slide. The slide is locked against actuation and for the purpose of holding the gear 88 out of mesh with the gears 89 by means of a rock shaft 104 which is provided with an arm 105 adapted to be moved into the path of movement of the end of the slide 96 when all of the keys 95 are elevated. Therefore in order to release the slide 96 it is necessary to rock the shaft 104 to move the arm 105 out of the path of movement of the end of the slide 96. This is accomplished by means of the keys themselves. A yoke 105$^a$ is provided for each of the keys 95 and these yokes are loosely mounted upon the shaft 104 and are each provided with an arm 106 to coöperate with a shouldered portion 107 on the stem of the respective keys. This yoke is also provided with a shoulder 108 adapted to coöperate with a pin 109 on the shaft 104. An elastic member 110 is provided which acts upon the yoke 105$^a$ in a manner to cause the arm 106 to engage the shoulder 107 to thereby raise the key 95 and normally hold the key raised. When the key is depressed the shoulder 107 will engage the arm 106 to rock the yoke 105$^a$ and thereby move its shoulder 108 into engagement with the pin 109 on the shaft 104 to rock the latter. This rocking movement of the shaft 104 will rock the arm 105 and thereby release the slide 96 to permit the elastic member 100 to act upon the arm 101 to shift the slide 96 and consequently the gear 88. The position of the gear 88 with respect to the gears 89 will be determined by the key of the series 95 which has been actuated.

Inasmuch as the registers or number bearing members thereof are normally disconnected from the power mechanism, that is to say, are loosely mounted with respect thereto, it is necessary for the operator when he desires to register on any one or more of the registers, to lock the number bearing members of the respective registers so that they will be operated. This is accomplished by means of a clutch member 111 (see particularly Figs. 4 and 8) one of which is provided for each of the number bearing members 65 and are respectively connected with the shafts 77 for rotation therewith and for longitudinal adjustment with respect thereto. These clutch members 111 are preferably loosely mounted upon a sleeve 112 which in turn is fastened to the shaft 77 for rotation therewith. One end of the sleeve preferably terminates adjacent one face of the gear 78 to hold the latter against longitudinal displacement on the shaft 77 in one direction. A similar sleeve 113 is fast to the shaft 77 on the opposite side of the gear 78 and this sleeve serves as a means for holding the gear 78 against displacement longitudinally on the shaft 77 in the other direction.

The clutch member 111 is connected with the sleeve 112 for longitudinal adjustment with respect thereto preferably by means of a key 114 and the clutch member is provided with laterally projecting pins 115 adapted to enter apertures 116 in the gear 78 and when the pins project into these apertures 116 the gear 78 will be locked for rotation with the shaft 77. In order to simultaneously shift the clutch members 111 of the number bearing members of each register, the clutch member is provided with a plurality of spaced ribs 116ª extending therearound and a rock shaft 117 having a series of spaced ribs 118 (see also Fig. 18) is mounted to extend transversely of the shaft 77 adjacent each series of clutch members 111 and the shaft 117 is journaled in any suitable fixed support.

When the shaft 117 is rocked, the clutch members 111 will be accordingly shifted. This rocking movement of the shafts 117 is accomplished through the medium of a series of keys 119, one of which is provided for controlling each of the shafts 117, and are located in a convenient position for the operator, preferably adjacent the apertures 120 in the top of the machine casing through which the numbers on the number bearing members 65 are exposed (see also Figs. 1 and 18).

Each of the shafts 117 is normally inactive but is rendered active by means of mechanism which will now be described and which mechanism is controlled by the key 119 (reference being had now more particularly to Figs. 18, 21, 41, 49 and 50). Mounted upon the shaft 117, preferably one end thereof, so as to be shifted longitudinally on the shaft is a crank arm 121 which is connected to the shaft to rock therewith in any suitable manner, preferably by means of a collar 122 which is keyed to the shaft and which collar is provided with a series of laterally projecting pins 123. These pins project through apertured portions in the crank arm 121 so as to permit the latter to be shifted longitudinally on the shaft and at the same time will connect the crank arm with the shaft so that when the crank arm is rocked the shaft will be correspondingly rocked. This crank arm 121 is shifted longitudinally on the shaft preferably by means of a yoke 124 which is pivotally mounted upon a fixed support 125 extending transversely of the series of shafts 117. The arms of this yoke 124 are provided with projecting pins 126 which project into a circumferential groove 127 in the crank arm 121 and the yoke is connected to the stem of the key 119 by means of an arm 128 on the yoke with which the end of the stem has pivotal connection. Thus when the key 119 is depressed from the position shown in Fig. 18, the yoke 124 will be rocked and the crank arm will be shifted longitudinally on the shaft 117. Projecting laterally from the end of the crank arm 121 is a pin or projection 129 which is adapted, when the crank arm is thus shifted, to be projected into the path of movement of one of the lugs or extensions 130 on a bar or rod 131 (see also Fig. 35). This bar or rod 131 is arranged to extend transversely of the shafts 117, preferably below the same, and is mounted to be shifted longitudinally preferably upon swinging supports comprising spaced arms 132 which are pivotally connected by their extremities to the bar or rod 131 and are also pivotally mounted as at 133 (see particularly Fig. 21). One of these projections 130 is provided for the pin 129 on each of the crank arms 121 so that when the respective keys 119 is depressed, and the crank arm 121 of any one or more of the registers shifted so that the registers will be rendered active, the respective shafts 117 will be rocked when the bar or rod 131 is shifted in a manner which will be presently described, and will be returned by an elastic member 117ª. An elastic member 134 (see particularly Fig. 18) is provided which tends to hold the crank arm 121 in a position that the pin 129 thereon will stand within the path of movement of the projection 130 on the bar or rod 131, and a catch 135 (see particularly Fig. 50) which is pivotally mounted as at 136ª is provided for holding the crank arm 121 in a position that the pin 129 will not project into the path of movement of the projection 130 of the bar 131, and against the tension of the elastic member 134. This catch 135 is adapted to engage over a pin or projection 136 on the yoke 124 and an elastic member 137 is provided for controlling the catch. This elastic member 137 is of such a tension that it will hold the crank arm in its adjusted position but will yield when pressure is exerted thereon by the crank arm when the key 119 is depressed.

After the crank arm has been thus adjusted and in order to return the crank arm to its normal or operative position to render the shaft 117 inactive and consequently the respective register, a controller key or bar 137 is provided (see also Figs. 1 and 21) which latter is preferably in the form of a bar and is arranged adjacent the keys 119. This bar or key 137 is connected to a yoke 138 which extends transversely to all of the shafts 117 and is pivotally supported by means of the support 125 and the stems 139 of the bar 137 are pivotally connected by their extremities as at 140 to the yoke 138. Each of the yokes 124 is provided with an arm 141 which extends below the yoke 138 and is normally spaced therefrom. Thus it will be manifest that when any one or more of the keys 119 is actuated to rock the respective yokes 124, the respective arms 141 will be moved toward the yoke 138 (see particularly Fig. 18). When now it is desired to return the crank arms 121 which have been shifted by the respective keys 119, so as to release or unlock the registers, all that is necessary is to actuate the key or bar 137. This will swing the yoke 138 about its point of pivotal support to cause the yoke to engage the arms 141 of the yokes 124, which latter were shifted to connect or render active the respective registers. When the yoke 138 engages the arms 141, a further movement of the key or bar 137 in the same direction will shift the crank arms 121 against the tension of the elastic member 134 to render inactive the shafts 117, and to permit the catches 135 to lock the crank arms in their operative positions.

The bar 131 is shifted or swung about its points of pivotal support 133 by means of a cam 142 (see Figs. 13, 20 and 21) which engages an anti-friction roller 143 carried by one of the members 132 so that when the cam 142 is rotated, the bar 131 will be moved toward the left from the position shown in Fig. 21 and when thus shifted all of the shafts 117 whose crank arms 121 have been shifted to position the pins 129 in the path of movement of the projections 130 of the bar 131 will be rocked and the clutch members 111 of the respective registers will be correspondingly shifted and those registers will be rendered active. If the crank arm 121 on any one or more of the shafts 117 has not been shifted in the manner just described, the respective pins 129 will not project into the path of movement of the projections 130 on the member 131, and the movement of the latter will not affect the respective shafts 117. After the high portion of the cam 142 has passed out of engagement with the anti-friction roller 143, an elastic member 144 on which tension has been created by the shifting of the member 131 by the cam 142, will return the member 131 and will rock the shafts 117 in the opposite direction and thereby shift the clutch members 111 to release the number bearing members 65 or their respective registers.

Motion is imparted to the cam 142 from the shaft 145 which is provided with a bevel gear 146 meshing with a gear 147 on the cam shaft 148. The shaft 145 in turn receives its motion from a shaft 149 (see particularly Figs. 2 and 12) which latter is provided with a gear 150 meshing with the gear 151 on the shaft 145. The shaft 149 receives its motion from the power shaft in a manner as will be hereinafter described and a series of gears 152 on the shaft 149 respectively mesh with gears 153 on the respective shafts 90. Thus it will be manifest that after the desired number of keys 119 have been actuated to render active one or more of the registers, and the keys 95 actuated to position the gears 88 with respect to the gears 89, and motion is imparted to the shaft 149 from the power shaft in the manner as will be described, the rotation of this shaft 149 will rotate the shafts 90 and consequently the respective number bearing members 65 of the series of registers. The rotation of this shaft 149 will also impart rotation to the shaft 145 and this shaft will in turn rotate the shaft 148 and the cam 142 (see Figs. 12 and 21). When the cam 142 operates upon the anti-friction roller 143 it will shift the bar or member 131 to rock the shafts 117 of the registers which have been set. The cam 142 is so set with respect to the gears 89 on the shaft 90 that at the commencement of the rotation of the shaft 149 the cam 142 will shift the respective clutch members 111 of the number bearing members to render the respective registers active prior to the meshing of the gears 88 with the teeth of the predetermined mutilated gears 89. This setting of the clutch member 111 takes place before the commencement of the calculating operation. Immediately after the clutch member 111 is set, the gears 89 will begin to act upon the gears 88 to impart a variable rotation to the shafts 84 and consequently the number bearing members of the registers. At the completion of the calculation, the high portion of the cam 142 will pass out of engagement with the anti-friction roller 143 to permit the spring 144 to act upon the member 131 and thereby disconnect the number bearing members of the register to render them inactive. The key or bar 137 may then be actuated and the crank member 121 which has been set will be returned to its normal position. In the event that it is desired to register additional amounts on the registers which have once been rendered active, the crank members 121 which have been set may be allowed to remain in their set positions and even though the clutch members 111 will be returned to their normal positions to disconnect the gears 78 from the shafts 77, these gears will be again locked to the shafts 77 upon the next cycle of movement of the machine.

The carrying from one of the number bearing members 65 to the next adjacent number bearing member is effected at the completion of the calculation and from the shafts 90, on which latter shafts are arranged a series of one-toothed gears 153 (see particularly Figs. 4 and 20) which coöperate with gears 154 on the shafts 84, said gears 153 coöperating successively with their adjacent and respective gears 154. After the completion of the calculation operation the shafts 84 are given one step of rotation by the gears 153 on the shafts 90 and inasmuch as these shafts 84 are connected with the shafts 77 through the medium of the gears 85 and 81, and 86, 87 and 82, these shafts will also be given one step of rotation. In order to effect the carrying operation it is necessary that this additional one step of rotation of the shaft 77 be communicated to the respective number bearing members 65 upon which the digit is to be added. As has already been stated at the completion of the calculation operation the clutch 111 is shifted automatically so as to unlock the gears 78 with respect to the shaft 77 (see particularly Figs. 4, 8 and 18). It is therefore necessary to relock the gear 78 of the number bearing member 65 to which the amount is to be added, to the shaft 77. This may be accomplished in the manner which will now be described.

Mounted upon the sleeve 113 on the side of the gear 78 opposite to that on which the clutch member 111 is arranged is another clutch member 155 which is keyed to the sleeve to rotate therewith and so as to be adjustable longitudinally thereon. This clutch member 155 is provided with pins or projections 156 similar to the pins 115 on the clutch 111 and are adapted to enter the apertures 116 in the gears 78. These clutch members 155 are provided with a peripheral groove 157 in which laterally projecting pins 158 of the shifting member 159 (see also Fig. 39) project. This member 159 is pivotally mounted upon the support 160 and an elastic member 161 is anchored by one end to the member 159 and by its other end to a suitable fixed support and tends normally to shift the clutch member 155 in a direction to lock the gear 78 for rotation with the shaft 77. The clutch member and the shifting member 159 are held against such action of the yielding member 161 by means of a locking dog designated generally by the reference numeral 162 in Fig. 36. This dog 162 is provided with an arm 163 which is adapted to project into the circumferential groove 157 of the clutch member (see Figs. 4, 7, 8 and 18) so as to stand in front of a shoulder 164 which is formed by the groove. This arm 163 of the dog is so arranged that it will hold the clutch member 155 in the position shown in Fig. 8 and an elastic member 165 is anchored by one extremity to a fixed support and is secured by its other extremity to an arm 166 of the dog and tends normally to move the arm 163 in a direction to engage the shoulder 164 and to project the arm into the groove 157 of the member 155. These dogs 162 are pivotally mounted on the supports 162ª, there being one support arranged between each pair of number bearing members 65. Each dog 162 is provided with a laterally-projecting member 167 in the form of an anti-friction roller, which is carried by an offset arm 167ª oppositely arranged to the arm 163 of said dog. This anti-friction roller 167 at predetermined intervals engages the single toothed portion 68 of the number bearing member 65 of the next lower ordinal to that coöperating with the clutch 155, which is retained by the arm 163 of the same dog; that is, when any particular number bearing member 65 is making its tenth step of revolution or completing its cycle in passing from 9 to the zero position, this one-toothed member 68 contacts with the anti-friction roller 167 of the respective dog 162 and raises the arm 163 thereof from engagement with the clutch 155 coöperating with the number bearing member 65 of the next higher ordinal, that is, moves so that the 9 will be moved from the reading position and the zero into a reading position, this one-toothed portion 68 will trip the dog 162 against the tension of the elastic member 165 to release the respective clutch members 155 coöperating with the number wheel of the next higher ordinal. Thus released, the elastic member 161 will act upon the shifting member 159 to move the latter about its point of pivotal support 160. This movement will shift the clutch member 155 to move the pins 156 into the apertures 116 in the gear 78 and thereby lock this gear for rotation with the shaft 77. As this clutch member 155 is only locked to the gear 78 after the completion of the calculation, it will only serve as a means for imparting one step of rotation to the number bearing member through the medium of the gears 153, 154 (see Fig. 4). It is only after the clutch member 111 has been shifted to unlock the gear 78 that the gears 153, 154, will impart this one step of rotation to the shaft 77.

Obviously the clutch members 155 of all of the number bearing members to which the number is to be added will be shifted when the number bearing member of the next lowest denomination is making its tenth step of revolution, and the one-toothed gears 153 are preferably so arranged upon the shafts 90 with respect to each other that they will successively act upon the respective gears 154.

After the carrying operation has been completed and before the completion of the cycle of movement of the shafts, a series of cams 168 which are connected with a shaft 169 (see particularly Figs. 7, 8 and 18) there being one shaft 169 for each series of number bearing members 65, that is, for each register, will be moved into position to engage an arm or extension 170 on the respective shifting members 159. These arms 170 are so arranged that when the cams 68 engage them the shifting member 159 will be moved to return the clutch member 155 to the position shown in Fig. 8 against the tension of the elastic member 161 and into a position to permit the elastic member 165 to move the arm 163 of the dog 162 into the circumferential groove 157 of the clutch 155 and in front of the shoulder 164 and thereby lock the clutch member in an inoperative position.

The cams 168 are arranged in a staggered relation with respect to each other on the shaft 169, that is to say, in such positions that they will successively shift the clutch members 155 to unlock the gears 78 thereby reducing to a minimum the strain which will be occasioned upon the parts in the event that all of the clutch members 155 were simultaneously acted upon to simultaneously withdraw all of the clutch members 155. One of these shafts 169 is provided for each of the registers and these shafts 169 receive their motion from the shaft 145 (see particularly Figs. 13 and 18) through the medium of gears 171 on the shaft 145 which respectively mesh with gears 172 on the shafts 169. The units number bearing member 65 (see Fig. 18) of each series of number bearing members 65, that is each register, is also provided with a clutch member 155 adapted to be shifted to lock the respective gear 78 to the shaft 77 so as to add a digit to the units number bearing member under certain conditions and when it is necessary to add a digit to the amount registered to correct an error of one cent which will occur thereon as will be hereinafter described. This clutch member 155 of the units number bearing member is controlled by a dog 173 pivotally mounted as at 174, the arm of which dog serves to lock the clutch member 155 in an operative position, and an elastic member 175 is connected with an arm 176 of the dog 173 and tends normally to move the dog to lock the clutch member in the manner similar to that in which the other clutch members are locked.

Stops 177 may be provided for limiting the movement of the dogs 162 under the influence of the elastic members 165.

Motion is imparted to the shaft 149 from a horizontal power shaft 178 (see Figs. 17, 25 and 26) which in turn receives its motion from a vertical shaft 179 driven by any suitable motor and the shaft 179 is connected with the shaft 178 through the medium of intermeshing gears 180, 181.

The shaft 178 is a continuously running shaft and has connection with another shaft 182 (see Figs. 12, 13 and 17) through the medium of meshing gears 183, which is secured to the shaft 182 for rotation therewith, and 184 which is mounted loosely upon the shaft 178. This gear 184 is connected with a disk 185 which is mounted loosely upon the shaft 178 and upon which disk is pivotally supported a dog 186 which coöperates with a star or toothed wheel 187 secured to the shaft 178 for rotation therewith and in close proximity to one face of the disk 185. An elastic member 188 is provided which coöperates with the dog 186 and tends normally to move this dog into engagement with the star or toothed wheel 187 to lock the gear 184 to the shaft 178 for rotation therewith.

In order to cause the shaft 182 to make one complete revolution and then stop, mechanism is provided for controlling the dog 186 so as to shift the latter to disconnect the gear 184 from the shaft 178 and also for releasing the dog to lock the gear 184 to said shaft. This mechanism preferably comprises a dog 189 which is secured to a rock shaft 190 to move therewith, this shaft being mounted in suitable supports or bearings.

Loosely supported by the shaft 190 for movement therewith and independently with respect thereto is a member designated generally by the reference numeral 191 preferably in the form of a yoke, the arms of which are provided with suitable apertures through which the shaft passes. This yoke is preferably of a length substantially equal to the length of a motor bar or key 192 (see also Fig. 1) and is connected with the latter preferably by means of links or stems 193 which latter are pivotally connected to the member 191 and extend upwardly through the top 194 of the casing. One of the arms of the yoke is located adjacent an extension 195 of the dog 189 which latter is provided with a shoulder 196 for a purpose to be set forth. The other end of the dog 189 is provided with a shoulder 197 which coöperates with a shoulder 198 on the dog 186 and the shoulder 197 is adapted to engage the shoulder 198 of the dog 186 to move the latter about its point of pivotal support against the tension of the elastic member 188 and thereby disconnect the gear 184 from the shaft 178. When the dog 189 is tripped the dog 186 will be released and the elastic member 188 will shift the latter so that it will engage the star or toothed wheel 186 to again lock the gear 184 to the shaft 178.

An elastic member 199 which is connected with a projection of the dog 189 tends normally to hold the shoulder 197 in the path of movement of the shoulder 198 of the dog 186 to trip the latter, and the dog 189 is rocked against the tension of the elastic member 199 by the actuation of the motor bar or key 192, through the medium of a split dog 200 which coöperates with the shoulder 196 of the dog 189 and this dog 200 is pivotally supported by the yoke or member 191. An elastic member 201 tends normally to hold the dog 200 within the path of movement of the shoulder 196 of the dog 189 so that when the controller bar or key 192 is actuated, the yoke or member 191 will be rocked about the shaft 190 and with it the dog 200. Inasmuch as this dog 200 has engagement with the shoulder 196 of the dog 189 the latter will also be rocked so as to move the shoulder 197 out of engagement with the shoulder 198 to allow the elastic member 188 to act upon the dog 186 which will lock the gear 184 to the shaft 178. After this operation, the mechanism heretofore described will be set into operation by the running shaft 178 and unless mechanism is provided for automatically releasing the dog 189 to permit it to assume a position to unlock or trip the dog 186, after the shaft 182 has made one complete revolution, the shafts will continue to rotate so long as the motor bar or key 192 is held in its actuated position. In order to overcome this deficiency, that is release the shafts after they have completed one revolution irrespective of the position of the motor bar 192, the split dog 200 is provided. Pivotally mounted upon a shaft 222 adjacent the shaft 190 is a tripping member designated generally by the reference numeral 203 which is preferably in the form of a yoke having an arm or extension 204 projecting in a direction toward the shaft 178. This arm 204 is adapted to be engaged by a pin or projection 205 (see Fig. 12) carried by a cam 206, which latter is provided for a purpose to be set forth, and which is secured for rotation with the gear 184 so as to rock the member 203 against the tension of the elastic member 207 (see Fig. 17) and thereby move a pin or projection 208, which is carried by the member 203 (see Fig. 12) and operates between the legs of the split dog 200 to move the latter out of engagement with the shoulder 196 on the dog 189, and against the tension of the elastic member 201. When the dog 189 is thus released the elastic member 199 will move the shoulder 197 into the path of movement of the shoulder 198 of the dog 186 to trip the latter just at the completion of the revolution of the shaft 178 and thereby unlock the gear 184 in the manner as already described. When the dog 189 has been thus released and the motor bar or key 192 is released, the member 191 will be returned to its normal position by means of an elastic member 209 and as the dog 200 passes the extremity of the dog 189 on which the shoulder 196 is located, the dog 200 will yield with the tension of the elastic member 201 so as to pass the shoulder 196. After passing this shoulder the dog 200 will return to its normal or active position, that is, to a position that when the motor bar or key 192 is again actuated, the dog will strike the shoulder 196 and again trip the latter. The movement of the dog 200 so as to position the latter with respect to the shoulder 196 will be limited by means of a suitable stop 210 provided for this purpose.

In order to prevent injury to the elements of the mechanism heretofore described which might occur by pressing one of the keys 95 after the motor bar 192 has been pressed to actuate the mechanism, and before the completion of the cycle of movement of the elements, it is advisable to lock all of the keys 95, that is not only the remaining keys of the particular series in which one key 95 has been pressed, (as heretofore described) but also all of the keys of all of the remaining series in which no one key may have been pressed. Referring to Figs. 2, 10, 11 and 12, the mechanism designed for this purpose is as follows: A member 211 is mounted for sliding movement upon a support 212 arranged adjacent the front of the machine and is of a length to extend transversely with respect to the forward ends of the shafts 104 and below the same. This member is provided with a plurality of spaced projecting portions 213, one for each of the members 96. These projecting portions are of a length and are so located that they will not interfere with the free movement of the extremities of the arms 105 of the shafts 104, and an elastic member 214 is provided which tends normally to move the member 211 to cause the projecting portions 213 to extend into the path of movement of a lug or projection 215 carried by each of the slides 96 and thereby lock these slides against movement under the tension of the elastic members 100, as shown more clearly in Fig. 2. In this position it will be manifest that although the keys 95 may be actuated, the slides 96 which control the movement of the gears 88 will be locked against actuation.

The member 211 is itself held against actuation under the influence of the elastic member 214 and normally in the position shown in Fig. 11, so that the slides 96 will be normally unlocked and thereby permit the slides 96 to be properly adjusted to position the gear 88 when one of the keys 95 of the respective series is actuated. After the proper key in the various series has been actuated, motion is imparted to the shafts 90 in the manner already set forth by the actuation of the motor bar or key 192. After compressing the motor bar or key 192 and after the proper keys 95 have been actuated, it is desirable to lock the keys of the remaining series or the series in which no key has been pressed, against actuation. In order to accomplpish this a mechanism is provided which is operated by the motor bar or key to release the member 211. Mechanism especially adapted for this purpose comprises a dog 216 (see also Fig. 12) one arm of which is adapted to be projected into the path of movement of a lug 217 carried by the member 211 and an elastic member 218 is provided which tends normally to move the end of the dog 216 into the position shown in Fig. 11. The other arm 219 of the dog projects into the path of movement of an arm 220 carried by the shaft 190 so that when the shaft 190 is rocked in the manner already described by the controller bar or key 192, the arm 220 will move the arm 219 to move the dog 216 out of the path of movement of the projection 217 and when thus released the member 211 will be shifted by the elastic member 214 for the purpose just set forth.

After the completion of the calculation and before another calculation can be made, it is necessary to return the slides 96 of the series in which a key 95 has been actuated to release the said keys. This is accomplished by means of the arms 101, but before this arm can return the slides it is necessary that the member 211 be shifted or returned to its normal position against the tension of the elastic member 214, so as to move the extensions 213 on the member 211 out of the path of the return movement of the projections 215 on the slides 96. This is accomplished by means of a crank or arm 221 (see particularly Figs. 11 and 12) secured to a rock shaft 222, which latter is adapted to be given a rocking movement in a manner to be presently described. This crank or arm 221 is adapted to engage the extremity 223 of the member 211 and shift the latter to its normal position against the tension of the elastic member 214. After the pin or projection 217 passes the dog 216 on its return movement, the elastic member 218 will move the dog into the path of the return movement of the pin 217 and thereby lock the member 211 in the position shown in Fig. 11. This locking of the keys should be accomplished before the dog 186 is released to lock the gear 184 to the shaft 178, or before the shafts 90 are rendered active; and in order to accomplish this the dog 216 which stands within the path of movement of the projection 217 on the member 211 should be so proportioned with respect to that portion of the dog 189 which engages the shoulder 198 of the dog 186 (see Figs. 11 and 32), that the dog 216 will move out of the path of movement of the pin or projection 217 before the dog 189 moves out of engagement with the shoulder 198 on the dog 186.

The arms 101, one of which is provided for each of the slides 96, (reference being had now more particularly to Figs. 2, 11 and 12) are loosely mounted upon a rock shaft 224 which latter is journaled in suitable bearings and extends parallel with the shaft 149 and transversely with respect to the slides 96 and below the same. Each of the arms 101 is centrally secured to a shaft 224 by means of a yoke 225 formed medially on each arm, the terminals of said yokes forming bearings upon the shaft 224. The upper terminal 101$^a$ of each bar 101 is offset outwardly to aline the upper terminal thereof with its respective slide 96 and is connected to said slide by a pin and slot connection 226, 227. The upper terminal 101$^a$ of each bar 101 is formed on the outer side of its respective yoke 225, while the lower terminal 101$^b$ is formed on the opposite arm of said yoke 225, these lower terminals 101$^b$ of the arms 101 being offset inwardly form the vertically parallel and grouped terminals 101$^c$ illustrated in Fig. 11. In their normal position as shown in Fig. 2, that is when the machine is inactive, the yokes 225 of the arms 101 are spaced from a series of pins or studs which radiate from the shaft 224, one pin being provided for each yoke 225, the positioning being such that when the slides 96 are unlocked from engagement with the arms 105 the elastic members 100 will act upon the arms 101, thereby shifting the respective slides 96 through the instrumentality of the pin and slot connections 226, 227, and said movement of the arms 101 will be uninterfered with by the pin and yoke 228 and 225 respectively. Thus when the arms 101 have been rocked to set the slides 96 a portion of the slides 96 or all of said slides, the yokes of said arms will contact with their respective pins 228. Therefore, in order to return the slides 96 to their inoperative and inactive positions through the instrumentality of the arms 101, the shaft 224 is oscillated in the proper direction to cause the pins to engage the yokes 225 of the arms 101, thereby returning the arms to the positions shown in Fig. 2.

When the shaft 224 is released, it will be returned by means of an elastic member 229 (see Figs. 11, 12) provided for that purpose. When the shaft 222 is rocked to return the member 211, this rocking movement will be imparted to the shaft 224 to move the arms 101, and this movement of the shaft 224 is accomplished by means of an arm or a cam 230 (see Figs. 11, 12 and 14) secured to the shaft 222 and which arm engages an arm 231 pivotally mounted (see particularly Figs. 11, 12 and 14) to a fixed support 232 and connected with this arm 231 is a gear or segment 233. Connected with the shaft 224 for rotation therewith is another gear or segment 234 with which the gear or segment 233 meshes. It will thus be apparent that when the shaft 222 is rocked, the arm 230 will engage the arm 231 to raise the latter, and as the same is raised the gear or segment 233 will be rocked to impart a similar motion to the segment 234 and consequently the shaft 224. The arms 101 will then be moved to their original positions and the shaft 224 will itself be returned by the elastic member 229, which movement of the shaft will cause the pins or projections 228 to disengage the yoke 225 of the arms 101 so that when the slides 96 are released, the arms and the slides may be adjusted by the elastic members 100.

In order to maintain the dog 189 in an elevated and inoperative position during the calculation and to prevent it from returning to a position in which it would trip the dog 186 before the completion of the calculation, a cam 206 is provided on the shaft 178 (see particularly Figs. 12, 17, 31 and 32) which coöperates with an arm 235 connected with the shaft 190 for movement therewith, and the cam and arm are so arranged with respect to each other that when the motor bar or key 192 is actuated, the dog 186 released and the member 211 shifted, the high portion of the cam will coöperate with the extremity of the arm to prevent the shaft 190 from having any return oscillation, thereby retaining the arm 220 in a raised position and likewise securing the dog 216 from movement for engagement with the pin 217, thus allowing the spring 244 to act freely on the slide or member 211.

Motion is given the shaft 222 to impart the required movements to the arms 230 and 231 by means of a cam 236, (see particularly Figs. 12, 14 and 29) secured to and for rotation with the shaft 182 (see also Fig. 16) and above which the shaft 22 is parallelly located. A crank arm 237 is secured to and depends from the shaft 222 in a position to be engaged by the cam 236 and rocked thereby to impart a rocking movement to the shaft 222, and an anti-friction roller 238 may be provided to reduce friction. The cam 236 is so located on the shaft 182 with respect to the arm 237 that just at the completion of a cycle of movement of the running shaft 178, after the calculation has been completed, its high portion will contact with the arm 237 to rock the shaft 222 and consequently the shaft 224 to shift the slides 96 and the gears 88 to their normal positions, thereby releasing or restoring all of the actuated mechanisms to their original position. When the high portion of the cam 236 passes out of engagement with the arm 237, the shaft 222 and the shaft 224 will be moved in the opposite direction or be returned to their normal positions by means of the elastic member 229. As the shaft 224 is returned, the arm 231 will engage the arm 230 and thereby move the shaft 222 to its normal position. The crank arm 237 is secured to the shaft 222 so as to be longitudinally adjusted thereon to be moved into a position to be engaged by the cam 236 and also to be moved into a position so that it will not be engaged by the cam 236 for a purpose which will be hereinafter set forth.

The above described operations may be repeated as often as desired, and during such operations, and at the proper time, the carrying mechanisms embodying the clutch members 155 will be released and shifted into operating positions in a manner as has already been described and at the completion of the carrying operation, the cams 168 on the shaft 169 will successively act upon the arms 170 of the respective shifting members 159 to successively withdraw the clutch members 155 as has already been described.

It is thought that the operation of the portion of the mechanism just described will be fully understood from the above description but briefly stated, it is as follows, reference being had particularly to Figs. 2, 4, 11, 17 and 18, assuming the parts to be in the position shown in these figures. It is necessary to first render active the desired registers, or series of number bearing members 65, which is accomplished by actuating the respective keys 119 which positions the crank arms 121 for engagement with the projections 130 of the slide 131, so that when the shaft 145 is rotated substantially instantaneously with the actuation of the motor bar 192 the shaft 117 will be rocked, throwing the clutches 111 into engagement with the gears 78 of the respective series of registers prior to any calculation whatsoever. This will shift the respective clutch members 111 to lock the gears 78 for rotation with the shafts 77. In this position the machine is ready to be actuated. The operator then depresses or actuates the desired key 95 of the respective series so as to set the gears 88 with respect to the gears 89. The moment one of the keys of any of the series is actuated, the shaft 104 will be rocked and the arm 105 shifted to release the respective slides 96. Thus released, the slides will be moved under the influence of the elastic member 100 and arm 101 until its motion is arrested by the stem of the key actuated. This will position the gear 88 to impart to the shaft 84 a number of steps of rotation corresponding to the key which is actuated and the number of teeth on the respective gear 89. Previously to this, however, it is necessary to shift the clutch 83 (see Fig. 4) so as to control the direction of rotation of the number bearing members 65 of the registers. When the slide 96 is thus shifted, the key which has been actuated will be locked in its actuated position and the remaining keys of the series will likewise be locked against movement. The mechanism being thus set, the operator then depresses or actuates the motor bar or key 192 (see Fig. 17), the actuation of which will rock the shaft 190 and consequently the dog 189. This will release the dog 186 to permit it to lock the gear 184 to the shaft 178, which latter it will be understood is a continuously running shaft. When thus locked to the shaft 178 the gear 184 which meshes with the gear 183 on the shaft 182 will impart the rotation of this shaft to the shaft 182, which in turn will be imparted to the shaft 149 through the medium of a gear 239 (see particularly Fig. 12) on the shaft 182 which meshes with a gear 240 on the shaft 149.

The rotation of the shaft 149 will be imparted to the shafts 90 and these will in turn rotate the shafts 84, the gears 88 of which have been positioned with respect to the gears 89 to convey motion to the shaft 77 and from this shaft to the respective number bearing members 65 of the registers. When the key 119 is actuated previous to pressing motor bar 192, the crank arm 121 (see particularly Figs. 18 and 50) will be shifted so that the pin 129 thereon will be projected into the path of movement of the projection 130 on the member 131, (see also Fig. 21). When the shaft 149 is rotated, this motion will be imparted to the shaft 145 through the gears 150, 151, and the cam 142 which is connected with the shaft 145 will operate to shift the member 131. This will rock the crank arms 121 which have been adjusted in the manner just described and consequently the shafts 117 to shift the clutch members 111 and thereby lock the number bearing members of the respective registers for operation. This shifting of the clutch member 111 is, however, effected before the gears 89 commence to operate on the gears 88, that is before the teeth of the gears 89 mesh with the teeth of the gears 88, but all of said shafts 90 and the shaft 145 are rotated simultaneously (see Fig. 2). At the completion of the calculation, the member 131 will be returned to its normal position by the elastic member 144 (see Fig. 21) which will shift the clutch members 111 to an inoperative position and thereby unlock the gears 78. The carrying from one number bearing member to another is effected by the carrying mechanism embodying the clutch members 155. As the number bearing members are moving their tenth step of rotation, the dogs 162 will be tripped by the members 68 and the respective clutch members 155 will be moved by the elastic member 161 and the shifting member 159 so that the gear 78 will again be locked to the shaft 77 and as the one-toothed gears 153 are arranged to operate upon the gears 154, (see Fig. 4) after the calculation and before the carrying operation takes place, an additional step of rotation will be imparted to the shaft 77 and this additional step of rotation will be imparted to the gears 78 which have been thus locked to the shaft 77 to impart an additional step of rotation to the respective number bearing members 65 of the register. Immediately after this carrying operation has been effected, the cams 168 on the shaft 169 will act successively upon the arms 170 of the shifting members 159 to shift the latter and thereby move the clutch members 155 into an inoperative position to disconnect the gears 78 and into a position to permit the arm of the dog 163 to be moved under the influence of the elastic member 165 into a position to lock the clutch member 155 out of operating position.

After the keys 95 have been actuated and when the motor bar or key 192 is depressed to set the mechanism in motion, the dog 216 will be rocked (see Fig. 11) to release the member 211 and the latter will be moved under the influence of the elastic member 214 to lock against actuation the keys 95 of all of the series in which no key has been pressed. After the completion of the calculating and the carrying operations and before the shaft 182 has made a complete revolution, the cam 236 on the shaft 182 will be moved into engagement with the arm 237 on the shaft 222 (see particularly Figs. 12, 16 and 29) so that a rocking movement will be imparted to the shaft 222. The rocking movement of this shaft 222 will operate to first shift the member 211 back to its normal position against the tension of the elastic member 214 (see Fig. 11) through the medium of the arm 221 engaging the extremity 223 of the member 211. This will release or unlock all of the keys of the series in which no key has been actuated. A further rocking movement of this shaft 222 will cause the arm 230 (see Figs. 12 and 14) to engage the arm 231 and through the medium of the meshing segment members 233, 234 will impart a rocking movement to the shaft 224. This will cause the pins 228 (see Figs. 2 and 12) to move into engagement with the yokes 225 of the arms 101 to rock the latter and thereby move the slides 96 and the gears 88 back to their normal positions and against the tension of the elastic members 100. The keys of the series, then, in which one key has been actuated, will be released, and the elastic members 110 will return the actuated keys to their normal positions. At the same time the shaft 104 will be rocked to its normal position to move the arms 105 into the path of movement of the slides 96 and lock the associated parts in their normal positions. After the cam 236 passes out of engagement with the arm 237, the elastic member 229 (see particularly Fig. 12) will move the shaft 224 to its normal position or in the opposite direction so as to move the pins 228 (see Fig. 2) away from the yokes 225 of the arms 101. This return movement of the shaft 224 will be imparted to the shaft 222 through the medium of the meshing segments 233, 234, (see Fig. 14) and will cause the arm 231 to engage the arm 230 to move the shaft 222 in the opposite direction.

After the motor bar 192 has been pressed, the cam 206 (see Fig. 17) will operate upon the arm 235 to hold the dog 189 in an inoperative position. At the completion of the cycle of movement of the parts, and when the high portion of the cam 206 passes out of engagement with the arm 235 the dog 189 will be automatically moved into a position so that its shouldered portion 197 will engage the shoulder 198 of the dog 196 and trip the said dog 196 to unlock the gear 184 from the running shaft 178.

As has been before stated the direction of rotation of the number bearing members of the registers is controlled by the clutch members 83, one set of which is provided for all of the registers. These clutch members are shifted by a shaft 241 (see Fig. 4) similar to the shafts 117 and secured to one extremity of the shaft 241 is a segment or pinion 242 (see Fig. 48). A rack bar 243 is mounted for movement upon a fixed portion of the frame work and coöperates with the pinion 242 and this bar is adapted to be moved backwardly and forwardly by means of two keys 244, 245, (see also Fig. 1) which are located in a convenient position for the operator. One of these keys designates credits and the other designates debits and for the sake of convenience will be hereinafter so designated. In Fig. 48 the debit key is shown as being actuated and these keys are adapted to slide the bar 243 through the medium of a bell crank 246, which is pivotally mounted on the support 247 and is provided with an extension 248 having a pin and slot connection 249, 250 with the bar 243. When one of the keys is depressed the bar will be moved in one direction and the other key will be elevated and vice versa. In order to hold the clutch members 83 in their adjusted positions, the pinion or segment 242 is provided with spaced notches 251, 252, with which a spring controlled dog 253 coöperates. This dog is of sufficient tension to hold the parts when adjusted and against accidental displacement but will yield when pressure is brought to bear by the actuation of either the debit or credit key. To lock the debit and credit keys against actuation after the parts have been set and the controller bar or key 192 has been actuated, a locking dog 254 is provided and is adapted to enter notches 255 in the slide bar 243. This dog is pivotally mounted upon any fixed support and is moved in one direction by means of a cam 256 which is secured to one of the shafts 90 for rotation therewith. An elastic member 257 is also provided which tends to move the dog 254 in the opposite direction to release the slide 243 (see particularly Fig. 52).

It sometimes happens that one or more of the keys 95 is actuated by mistake and unless returned or restored to their positions after being actuated, the result of the calculation indicated on the number bearing members of the registers will not be correct. Mechanism is therefore provided for restoring the parts which have been actuated by mistake and comprises what might be termed an error key 258 (see particularly Figs. 1, 11 and 12) which is located in a convenient position for the operator. This error key is adapted to also control the operation of the shaft 222 inasmuch as the shaft must be actuated to rock the shaft 224 to return the slides 96 which have been adjusted by the actuation of the wrong key and inasmuch as the shaft is rocked through the medium of the cam 236 which receives its motion from the shaft 178, when the motor bar or key 192 is actuated, it is apparent that if such movement is derived by the actuation of the motor bar or key 192 the entire mechanism will be actuated and the improper amount will be registered on the number bearing members 65. Therefore in order to overcome this objection and to provide means whereby the shaft 222 may be actuated from the running shaft 178 without actuating the mutilated gears 89, a separate and normally inactive connection is provided between the shaft 178 and the shaft 222 and comprises a cam 259 (shown more clearly in Figs. 12, 14 and 29) which is mounted loosely upon the shaft 182. Secured to the cam 259 and for rotation therewith and also loosely mounted upon the shaft 182 is a gear 260 which meshes with a gear 261 mounted loosely on the running shaft 182 (see also Fig. 16).

A normally inactive coupling, similar to the coupling between the gear 184 and the shaft 178 is provided between the gear 261 and the shaft 178 and comprises a disk 262 on which is pivotally mounted a dog 263. This dog coöperates with a star or toothed wheel 264 secured to the shaft 178 for rotation therewith. A yoke-shaped member 265 is pivotally supported upon a suitable support preferably the shaft 190. One arm of the yoke is shaped to form a dog 266 (see particularly Fig. 16) which is adapted to coöperate with the dog 263 to move and hold the latter out of engagement with the star or toothed wheel 264 and thereby render the gear 261 inactive. The other arm of the yoke-shaped member is formed to project in a direction opposite to that in which the dog 266 projects and to this projecting portion 267 the stem of the error key 258 is pivotally connected so that when the latter is actuated or depressed the yoke-shaped member will be rocked against the tension of an elastic member 268 to release the dog 263 and thereby lock the gear 261 to the shaft 178. When thus locked, the gear 260 and the cam 259 will rotate and the cam will engage the anti-friction roller 238 on the arm 237 to rock the shaft 222 to cause the arm 230 to engage the arm 231 and rock the shaft 224, the rocking movement of which latter will move the slides 96 to their normal positions to release the actuated keys 95 in the manner set forth. Thus it will be seen that the key which has been actuated by mistake may be returned without imparting motion to the shafts 90. In order to block the motor bar 192 when the error key 258 is depressed (see particularly Figs. 12, 14 and 16) a cam 269 is provided on the shaft 178 and is secured to the gear 261 to rotate with said gear when the latter is locked to the shaft 178. The cam 269 coöperates with an arm 270, which projects laterally from the dog 266 and is rigidly carried thereby, in such a manner that the high portion of the cam is adapted to engage said arm 270 when the clutch mechanism comprising the dog 263, the star wheel 264, and the disk 262 is actuated to retain said dog 266 in an elevated position, thus preventing the shaft 190 from being rotated or oscillated should the motor bar 192 be depressed. It will thus be seen that the yoke 265 through the medium of the cam 269 and arm 270 will be retained in a fixed position after the error key 258 has been pressed and will prevent the error key from returning to its normal position prior to the return of the slides 96 to their normal positions. The locking of the error key against depression during the actuation of the motor bar and the locking of the motor bar against depression while the error key is being actuated will be hereinafter more fully set forth. After the keys have been restored to their normal positions, the high portion of the cam 269 will be disengaged from the arm 270 and the elastic member 268 will move the yoke in the opposite direction in order that the dog 266 may engage the dog 263 and raise the same out of engagement with the star wheel 264. Furthermore, this movement of the yoke member will also elevate the error key 258 to its normal position.

After the keys 95 have been restored to their normal positions all the parts will be at rest except the running shaft 178 and then the proper key 95 may be actuated to adjust the gears 88.

The gear 261 may be locked against overthrow by means of a spring controlled dog 271 which is adapted to enter a suitable notch in the periphery of the disk 262.

It has already been explained that the number bearing members 65 contain two series of figures progressing successively in opposite directions and that the number bearing members are adapted to be rotated in opposite directions according to the nature of the work to be performed. These series of numbers are differentiated from each other preferably by color, one color designating debits and the other credits, the direction of rotation of the number bearing members controlling the nature of the work to be performed. These numbers on the number bearing members are exposed through suitable openings 120 in the casing and these openings are preferably provided with transparent closures, as shown more clearly in Figs. 7 and 8.

In order to indicate or direct the attention of the operator to the series of numbers which is to be read, a shiftable shield or indicator 272 (see particularly Figs. 4, 18 and 34) is provided for each of the series of number bearing members 65, and this indicator or shield is itself provided with two series of apertures or openings 273, 274, one in each series for each of the number bearing members, and these openings are preferably arranged in staggered relation with respect to each other. The indicator or shield is mounted to slide longitudinally and is adapted to be automatically shifted so as to conceal or expose one or the other of the series of the numbers, by the number bearing member 65 of the highest ordinal of the respective series when the latter reverses rotation and passes through zero, and for this purpose this number bearing member is provided with a tooth 275 (see particularly Figs. 4 and 8) and which tooth coöperates with pivotally mounted spaced dogs 276, 277, on the indicator, each of which is adapted to yield when the projection 275 engages the same during the rotation of the number bearing member in one direction and to form an abutment or rigid projection in the path of movement of the projection 275 in the opposite direction, so that when the shaft is rotated in one direction to shift the indicator or shield in that direction, the projection 275 will pass one of the dogs 276, 277, (see also Fig. 18) and engage the extremity of the other to shift the indicator. When the number bearing member is rotated in the opposite direction the projection 275 will engage the other dog and move the indicator in the opposite direction.

In registers of the type described having two sets of numbers on the number bearing members it has been found that when a larger number is subtracted from a smaller number, that is when the number wheel of the highest ordinal reverses its direction of rotation and passes through zero, an error of one digit will appear in the units column; therefore, it will be seen that as the shield 273 is shifted an error of one digit will occur in the units column. In order, therefore to overcome this error and show a correct total on the number bearing members, it is necessary to supply this additional digit to the units wheel, and mechanism for automatically accomplishing this result when the indicator or shield is shifted will now be described, reference being had particularly to Figs. 13, 18 and 34. This additional digit is supplied to the units number bearing member 65 of the respective registers, and for this purpose the gear 78 and the corresponding clutch member 155 (see Fig. 4) is arranged on the shaft 69 of the units number bearing member and the dog 173 is provided to lock the clutch 155 in inoperative position in the same manner as the remaining clutch members. The indicator or shield 272 is provided with a projection 278 with which the nose or extremity 279 (see particularly Fig. 34) of a pivotally supported bell crank 280 coöperates, and this bell crank is provided with an arm 281, and an elastic member 282 is provided therefor and tends normally to hold the extremity 279 in the path of movement of the projection 278 on the shield or indicator.

The dog 173 of the units number bearing member 65 is adapted to be tripped by means of an arm 283 (see Figs. 18 and 40) of a pivotally supported member 284 loosely mounted upon a rock shaft 285, journaled in suitable supports, and which shaft is adapted to be rocked by means of an arm 286 of the member 284 and with which arm 286 a cam 287 on the shaft 178 coöperates. The shaft 285 is provided with a pin or projection 288 against which the body portion of the member 284 bears when the arm 286 is raised by the cam 287 so that when the member 284 is rocked, it will engage the pin 288 and thereby rock the shaft 285. The cam 287 is loosely mounted on the shaft 178 and is carried by a disk 289, which latter supports a pivoted dog 290. A star or toothed wheel 291 is secured to the shaft 178 and with it the dog 290 coöperates so that when the dog 290 is released it will lock the disk 289 and consequently the cam 287 for rotation with the shaft 178. The operation of this cam will rock the arm 286, the member 284, and will move the arm 283. Inasmuch as the arm 283 has engagement with the dog 173 (see particularly Fig. 18) the movement of this arm will trip the dog 173 and the clutch 155 of the units number bearing member will then be set to effect the addition of one unit thereto.

The dog 290 is provided with a shoulder 292 with which a dog 293 coöperates for moving the dog 290 out of engagement with the star or toothed wheel 291. This dog 293 is loosely mounted on the shaft 285 and is provided with an arm 294 which is inclined and projects for some distance beyond the shaft 285, and an elastic member 295 is connected with the projection of the dog 293 and tends normally to move the dog 293 into a position to engage the shoulder 292 of the dog 290 to move the latter out of engagement with the toothed wheel 291 and thereby unlock the disk 289 and cam 287 with respect to the shaft 178. A retaining dog 296 controlled by an elastic member 296ª is provided and this dog coöperates with a notch in the periphery of the disk 289 to lock the latter against overthrow. A slide 297 (see particularly Figs. 12, 13 and 38) is mounted for reciprocation on a fixed support and extends across the entire series of registers or number bearing members 65, and is provided with a plurality of projecting portions 298 which have their terminals bent downwardly and spaced from each other longitudinally of said slide, and one of these projections 298 is provided for each of the shields or indicators 272. A member 299 is pivotally connected intermediate of its ends adjacent to the downwardly turned terminals of each projection 298. One extremity of this member extends beyond and contacts with the downwardly extending arm 300 carried by the arm 281 of the bell crank 280 and the inclined arm 294 of the dog 293, and an elastic member 301 is connected with the opposite extremity of the member 299 and holds the same in position. This member 299 projects through an elongated opening or slot in the adjacent supports. Thus it will be seen that when the parts are in the position as shown in Figs. 18 and 34, when the shield or indicator 272 is shifted, the bell crank 280 will be rocked about its point of pivotal support by the projection 278 on the shield or indicator and this will move the arm 300 to oscillate the member 299 to rock the dog 293 about the shaft 285 against the tension of the elastic member 295. When the dog 293 is thus rocked it will be moved out of engagement with the shoulder 292 of the dog 290 to release the latter and when the cam 287 is thus locked to the shaft 178 the arm 283 will be moved through the medium of the arm 286 to elevate the arm and release the dog 173 to permit the gear 78 of the units number bearing member to be engaged by the one-toothed gear 153 on the shaft 90 to impart one step of rotation to the units number bearing member when the machine is set in operation. After the dog 293 has been thus rocked, the extremity 297 of the bell crank 280 will pass on the other side of the projection 278 of the shield to permit the member 299 to move away from the inclined arm 294 of the dog 293 so as to position the dog 293 so that it will trip the dog 290 and thereby release the disk 289 and cam 287 with respect to the shaft 178.

In order to impart the necessary rotation to the number bearing members 65 for the correction of the units error after the clutch 155 of the units order has been adjusted in its operative position, the shaft 182, through the medium of which power is transmitted to the totalizer drive shafts 90, must be rotated. To accomplish this, it is necessary to trip or operate the clutch, which is normally inactive, between the running shaft 178 and the shaft 182, said clutch embodying the meshing gears 183, 184, the disk 185, the dog 186 and the star or toothed wheel 187 (see Fig. 17). This operation may be accomplished by actuating the motor bar or key 192 after the parts have been adjusted, as just described, but in order to automatically render this coupling or connection active suitable mechanism is provided whereby the dog 186 will be released by the actuation of the shaft 285. For this purpose there is provided on the shaft 285 an arm 302 (see particularly Figs. 12, 14, 17, 31 and 32) which is provided with a laterally projecting pin 303 which projects beneath a pin or extension 304 on the shaft 190 so that when the motor bar or key 192 is actuated to set the mechanism in motion, the pin or projection 303 on the arm 302 will not interfere with the movement of the pin or projection 304, but when the shaft 285 is rocked by the cam 287 (see Fig. 18) the pin or projection 303 on the arm 302 will engage the projection 304 on the shaft 190 to rock the latter and consequently the dog 189 and thereby release the dog 186 to couple the gear 184 with the shaft 178 without actuating the controlling bar or key 192. This automatic tripping of the dog 186 by the arm 302 will be effected just after the arm 283 of the member 284 has tripped the dog 173 (see Fig. 18) which controls the clutch member 155 beneath the units number bearing member 65. After a complete cycle of movement of the parts, the dog 186 will be automatically tripped again to uncouple the gear 184 with respect to the shaft 178 and the shaft 285 with the arm 302 will be returned to their normal positions by the tension of the elastic member 175 which latter returns the dog 173 of the units number bearing member clutch and which elastic member acts on the shaft 285 through the medium of the member 284 and the pin 288.

It will thus be seen that when the indicator or shield is shifted in either direction the units number bearing member of the register will be automatically rotated one step to add the desired digit thereto and thereby correct the error of one digit and indicate the proper total on the number bearing members.

Inasmuch as one of the sets of mechanisms is provided for each of the registers, one digit may be added to any of the registers and without affecting the others and inasmuch as the shaft 285 is controlled by all of the indicators, only one tripping mechanism constituting the slide 297 and elements 302, 303 and 304 is necessary for the entire series of registers.

In order to avoid damage to the machine, mechanism is provided for locking the motor bar or key 192 when the error key 258 is being actuated, and likewise locking the error key when the motor bar or key is being actuated, which mechanism will now be described, reference being had more particularly to Figs. 9, 10, 11, 14 and 15. Slidably mounted so as to extend transversely across the shaft 190, and preferably across the entire machine, is a sliding plate 305 which is arranged in any convenient position, preferably adjacent the front of the machine and the error key 258. This plate 305 is mounted for sliding movement in any suitable manner, preferably by means of fastening devices 306 which pass through suitable elongated apertures 307 in the plate 305 and into a fixed portion of the machine, preferably the top thereof. This plate 305 is provided with an ear 308 with which a pin 309 on the shaft 190 coöperates. The plate 305 is provided with a portion 310 which extends over the shaft 190 and preferably some distance beyond a deflected ear 308 and terminates adjacent the stem of the error key 258 which latter is provided with a reduced portion 311 to form a shoulder 312. When the key 258 is actuated the shouldered portion 312 will pass into the path of movement of the extension 310 on the plate 305 and will lock the latter against movement. Should now the motor bar or key 192 be actuated, its tendency will be to rock the shaft 190 toward the right in Fig. 10 and inasmuch as the ear 308 of the plate 305 stands within the path of movement of the pin 309 and the plate 305 is locked against movement it will be manifest that the pin 309 will strike the ear 308 and will hold the shaft 190 against rocking movement, consequently the motor bar or key cannot be actuated.

Should it be attempted to actuate the error key 258 after the motor bar or key 192 is actuated, this operation will be prevented by means of the extremity of the extension 310 on the plate 305 which passes beneath the shoulder 312 on the stem of the error key 258. When the motor bar or key 192 is actuated and the shaft 190 rocked, the pin 309 thereon will engage the ear 308 of the plate 305 and shift the latter to move its extremity under the shoulder 312. In this position the error key will be locked against actuation. When either of the keys is released, the parts will be restored to their normal positions in the manner as has already been set forth.

In the present invention the operation of multiplication is effected by repeated addition of the amounts to be registered and the operation of division is effected by the repeated subtraction.

As has already been described, when the keys 95 have been actuated to register a specified amount and the machine is set into operation by the actuation of the motor bar or key 192, the shafts which impart a variable movement or rotation to the number bearing members 65 will make one complete revolution and then all of the parts will be automatically released and restored to their normal positions. In order, therefore, to add a similar amount to the number bearing members of the totalizer under these conditions, it would be necessary for the operator to again actuate the same keys and repeat this operation until the amount had been registered the desired number of times to complete the multiplication and to add or subtract a plurality of the same sums. In order, therefore, to prevent the parts or mechanisms which impart the variable movements to the respective number bearing members 65 from being restored to their normal positions after the amount has once been registered and to maintain these parts in this position to repeatedly add or subtract the same amount to the number bearing members, suitable mechanism must be provided for preventing the parts from being shifted or returned to their normal positions after the completion of one cycle of movement of the operating shafts. The arm 237 (see particularly Figs. 12, 14, 16 and 29) is mounted for adjustment longitudinally on the shaft 222 and in its operation previously described, it is positioned within the path of movement of the cam 236 which is fastened for rotation with the shaft 182. Upon every revolution of the shaft the cam will engage the arm 237 to rock the shaft 222 and thereby restore all of the keys 95, which have been actuated, to their normal positions in the manner already set forth. In order, therefore, to prevent this cam 236 from engaging the arm 237 during the multiplication operation or repeated addition or subtraction, the arm 237 must be shifted longitudinally on the shaft 222 out of the path of movement of the cam 236 and in this latter position it will be apparent that the shaft 182 may rotate any desired number of times without restoring the keys 95 so long as the arm 237 is maintained in this latter position.

The arm 237 is shifted longitudinally of the shaft 222 through the medium of the slide member 297 and which member is provided with a depending arm or projection 313 having a laterally projecting pin or lug 314 extending into a circumferential groove 315 in a portion of the arm 237. When this member 297 is shifted so as to slide in one direction or the other, it will be apparent that the arm 237 and the anti-friction roller 238 will likewise be adjusted longitudinally on the shaft 222, and can therefore be moved into or out of the path of movement of the cam 236. This sliding movement of the arm 237 and the member 297 is accomplished preferably by means of a key 316, which for the sake of convenience will hereinafter be designated as a "repeat key" (see Fig. 1) indicating that it is to be operated when it is desired to repeat the addition or subtraction without throwing the mechanism out of position. This key is located in any convenient position for the operator and is connected in any suitable manner to one end of a lever 317 pivotally mounted as at 318 to any fixed support. The lever 317 is provided with a depending bifurcated portion 319 which latter is adapted to stand astride of a laterally projecting pin 320 on a depending portion 321 of the slide 297 and an elastic member 322 is provided which is connected to one extremity of the lever 317 and tends normally to move the slide 297 in a direction to shift the anti-friction roller 238 into the path of movement of the cam 236. Therefore when the key 316 is actuated the lever 317 will be rocked about its pivot against the tension of the elastic member 322 to swing between the portion 319 in a direction to shift the slide 297 and thereby move the arm 237 longitudinally on the shaft 222 and out of the path of movement of the cam 236. These parts are held in their adjusted positions either with the arm standing in or out of the path of movement of the cam 236 by means of the elastic member 322 which is connected to the lever 317 in such a manner that when the latter is shifted its point of connection with the elastic member will pass above the point of pivotal support or over the center and thus hold the parts in position. When the lever is rocked in the opposite direction the point of connection of the elastic member with the lever will pass to the other side of the point of pivotal support to retain the parts in this position. In order to return the member 297 and the arm 237 to a position that the latter will be engaged by the cam 236, an additional key 323 (see also Fig. 1) is provided, preferably adjacent the key 316, and is provided with a pin or projection 324 adapted to engage the other extremity of the lever 317 and rock it in the opposite direction. The anti-friction roller 238 is of such a length that a portion thereof will always stand within the path of movement of the cam 259 which latter is loosely mounted on the shaft 182 so that after the arm 237 has been adjusted by the "repeat key" 316 the mechanism may be set into operation by the actuation of the motor bar or key 192, the actuation of which will cause the gear 184 to be locked to the shaft 178 and consequently the mechanism controlled by this gear. The shafts 90 may be caused to repeat their rotation any desired number of times at the will of the operator and may be effected when the parts are adjusted as just described by a repeated depression or actuation of the motor bar or key 192 until the amount has been registered the desired number of times. This repeated actuation of the motor bar or key is necessary owing to the fact that the dog 200 (see Figs. 17 and 32) must return to a position above the shoulder 196 on the dog 187 before the latter can be actuated again to trip the dog 186.

It will be apparent that it is also necessary to prevent the actuation of the dog 293 (see particularly Figs. 12, 13 and 18) by the shifting of the indicator or shield 292 during the operation of multiplication or the repeated addition of amounts to the number bearing members 65, as it is not desired under these conditions to add the additional digit which is effected in the manner already set forth by the shifting of a shield or indicator 292. Inasmuch as this dog 293 will be operated by the shifting of this indicator or shield as has already been described, it is necessary to withdraw the member 299 to a position where it will not be engaged by the portion 300 of the dog 280 which engagement would force the member 299 against the inclined portion 294 of the dog 293. For this reason, therefore, the members 299 are supported by the projections 297 of the slide 298 as shown more clearly in Fig. 13 so that when the latter is shifted by the "repeat key" 316, to shift the arm 237 out of the path of movement of the cam 236, the member 299 will be withdrawn to a position that it cannot be forced into engagement with the inclined arm 294. After this operation is completed the mechanisms are returned to their normal positions and this may be effected by the actuation of the repeat release key 323 in the manner just set forth. The operation of this repeat release key will set some of the parts so that they will be returned to some of their normal positions, but the keys in the series 95 which have been actuated will not be returned to their normal positions, and it is necessary that motion be imparted to the shaft 222. If this motion should at this time be imparted to the shaft 222 by the actuation of the motor bar or key 192, the number bearing members 65 would be actuated and the amounts indicated by the actuated keys 95 would be again registered. In order, therefore, to return the keys 95 and the slides 96 without actuating the number bearing members 65, the shaft 222 may be set in motion by the repeat release key 323, which latter actuates the coupling or connection between the running shaft 178 and the cam 259 (see particularly Figs. 12 and 16). In order to accomplish this the yoke 265 is provided with an arm 325 (see also Fig. 29) which extends toward the stem of the key 323 and this arm 325 is provided with a laterally projecting pin 326 which extends beneath the extremity of the key 323 so that when the latter is actuated the stem will engage the projection 326 on the arm 325 connected with the dog 266 and actuate the latter to release the dog 263, thereby coupling the gear 261 with the shaft 178, and when thus coupled the gear 260 which is connected for rotation with the cam 259 will impart the desired motion to the latter to rock the shaft 222. This rocking movement of the shaft will raise the arm 237 and cause the latter to rock the arm 231 (see Figs. 12 and 14) which in turn will rock the shaft 224 to move the pins 228 on the shaft into engagement with the yokes 225 of the arms 101 to shift the slides 96 and thereby release the keys 95 in the manner as has already been fully explained. The motor bar or key 192 will be held in its elevated position by the elastic member 209 (see particularly Figs. 17 and 32).

Mechanism is also provided whereby a record may be obtained of the amounts registered on the registers and this recording mechanism consists primarily of a paper or record sheet support which is adapted to be intermittently advanced and to be returned to its normal position and printing mechanism whereby the amounts may be printed upon the sheets. This printing mechanism is adapted to be operated in unison with the registering mechanism and is also adapted to be operated independently with respect to the number bearing members 65 of the registers. Suitable means whereby these operations may be performed will now be described, reference being had more particularly to Figs. 5, 22, 26, 27, 28, 60 and 61.

Adjacent the rear of the machine and mounted to move in suitable guideways 327 is a carriage designated generally by the reference numeral 328 and upon which carriage is mounted a platen 329 (see Fig. 23) which serves as a support for the record sheets. This carriage is preferably arranged in a plane above the number bearing members 65 so that the record sheets are always visible. The carriage is provided with the usual rack teeth 330 and the platen is provided with the usual handles or knobs 331 by means of which it may be readily rotated. Mounted upon any suitable fixed support, preferably upon a portion of the framework of the machine, is a spring drum 332 of any ordinary and well known construction around the periphery of which a flexible member 333 is adapted to be wound. The free end of this flexible member is connected in any suitable manner with the carriage 328 and the drum is so arranged with relation to the movement of the carriage that it tends normally to advance the carriage in the usual manner. After the carriage has been thus advanced, and has reached the limit of its advancing movement, it may be returned to its original or starting position, and may also be returned to its original or starting position from any point to which it has been advanced in a manner as will be presently described. Meshing with the rack 330 is a gear 334 secured to a shaft 335, which latter is preferably arranged in a horizontal plane and the rack bar 330 on the carriage is preferably arranged in an upright plane transversely thereto. Loosely mounted upon the shaft 335 is a ratchet member 336 which is connected to the shaft 335 for rotation therewith through the medium of yielding pawls 337 carried by the gear 334 and which pawls cooperate with the shoulders of the ratchet member 336. This ratchet member 336 is provided with lateral projections 338 with which an escapement dog 339 cooperates. This dog is provided with a shouldered portion 340 adapted to be projected into the path of movement of the projections 338 on the member 336 and to be moved out of the path of movement of such projection. An elastic member 341 is provided which tends normally to move the escapement dog 339 in one direction. When the gear 334 is rotated in the direction of the arrow in Fig. 27 and under the influence of the spring drum 332, the escapement member 336 will be locked for rotation with the gear 334 and thereby permit the gear to be intermittently rotated so that the dog 339 will be rocked in a manner to be hereinafter described to permit the gear to make one step of rotation. This movement is accomplished by moving the shouldered portion 340 of the dog out of the path of movement of the adjacent projection 338 on the member 336 which movement of the dog will move another shouldered portion 342 into the path of movement of the advancing projection 338 which has just passed the shoulder 340 of the dog and this shoulder 342 serves as a stop for limiting the advancing movement of the gear 334. A yielding retaining dog 343 is provided which cooperates with shouldered portions 344 on a disk 345 for locking the member 336 against retrograde movement, the disk 345, the ratchet 336, and brackets 338 carried by the disk 345 being one integral element.

When the shaft 335 is rotated in one direction or the direction indicated by the arrow in Fig. 27, the escapement mechanism will control the rotation of the shaft inasmuch as the shouldered member 336 will be locked to the shaft. When, however, the shaft 335 is rotated in the opposite direction to return the paper support or carriage, in a manner to be hereinafter set forth, the shouldered member 336 will be held against retrograde movement by the dog 343 and disk 345 while the gear 335 will rotate and this will cause the dogs 337 to yield and ride over the periphery of the member 336.

The escapement dog 339 is adapted to be automatically rocked about its point of pivotal support 345 by means of an arm or lever 346 (see Figs. 5, 22, 24, 12, 26 and 53) which is pivotally mounted intermediate its ends as at 347. One end of this lever 346 is connected by means of a link 348 with a projection 349 on the dog 339 and the other extremity is provided with an anti-friction roller 350 with which a cam 351 cooperates. This cam is secured to a shaft 352 (see particularly Fig. 26) and the shaft is in turn rotated by means of gear connections 353, 354, on the shafts 352 and 145. The cam 351 is adapted to be shifted longitudinally on the shaft 352 or laterally with respect to the end of the lever 346 in a manner to be hereinafter described, but when the cam 351 is in a position to engage the anti-friction roller 350 on the lever 346 and the shaft 352 is rotated, the lever 346 will be rocked and this will in turn rock the dog 339 to release the member 336 and thereby permit the platen or paper support to advance one step longitudinally. This escapement of the carriage may also be accomplished manually and for this purpose there is provided a key 353 (see also Figs. 1, 5 and 56) which latter is arranged in a convenient position for the operator. This key is connected to an arm 354 of a oscillatory yoke 355 and the latter is pivotally supported in any suitable manner and is provided with another arm 356. This arm 356 projects beneath an extension 357 on the lever 346 so that when the key 353 is actuated, the lever 346 will be rocked and the paper carriage released to permit the latter to make one step of advancing movement.

The paper carriage may be returned to its original or starting position from any point to which it has been advanced either automatically or manually, and the mechanism for manually returning the carriage will first be described, reference being had to Figs. 12, 25, 26, 27 and 28.

Loosely mounted upon a shaft 358 is a gear 359 which meshes with a gear 360 keyed to the shaft 335 on which the gear 334 is mounted, and mounted to rotate with this gear 359 is a collar 361 having a shoulder 362. Loosely mounted upon the shaft 358 is a disk 363 which carries a pivotally mounted pawl 364 that cooperates with the shoulder 362 of the collar 361. This disk 363 is provided with a shoulder 365 having a notch 366 in its periphery with which operates a dog 367 controlled by a spring 368 to lock the disk and pawl 364 against rotation with the shaft 358. Pivotally carried by the disk 363 to rotate therewith is a dog 369 which cooperates with a star or toothed wheel 370 keyed to the shaft 358 and an elastic member 371 is provided for the dog 369 to throw the same into engagement with the star wheel 370 to lock the disk 363 and dog 369 for rotation with the shaft. The dog 369 is provided with a shoulder 373 with which a dog 374 cooperates. This latter dog is pivotally mounted upon a fixed support 375 and is adapted to engage the shoulder 373 to move the dog 369 out of engagement with the toothed wheel 370. An elastic member 376 is provided which tends normally to move the dog 374 in a direction to engage the shoulder 373 of the dog 369 to trip the latter. The shaft 358 is continuously rotated from a shaft 377 on which is a gear 377ᵃ (see particularly Fig. 26) which meshes with the gear 180 on the shaft 179 and through the medium of a gear 378 on the shaft 377 which meshes with a gear 379 secured for rotation with the shaft 358. As the escapement is operated to permit the advancement of the carriage, the gear 360 will rotate the gear 359 and with it the member 361 to move the shoulder 362 on the member 361 away from the extremity of the dog 364 and in the direction indicated by the arrow in Fig. 27. After the carriage has been advanced the desired number of steps and in order to return the carriage all that is necessary is to rock the dog 374 (see Fig. 28) to release the dog 369 and this will lock the disk 363 and the dog 364 for rotation with the shaft 358. Thus locked to the shaft the motion imparted to the shaft 377 by the motor shaft 179 will be imparted to the shaft 358 and inasmuch as the disk 363 is locked for rotation with the shaft 358, the dog 364 will engage the shoulder 362 on the member 361 to rotate the latter and consequently the gear 359. The rotation of this gear 359 will be imparted to the gear 334 through the medium of the gear 360 and the rotation of the gear 334 will through the medium of the rack 330 move the carriage or paper support back to its original or starting position.

Just before the dog 364 reaches the limit of its return movement and at the point where the shoulder 362 of the member 361 reaches the limit of its return movement, the dog 364 will be tripped by means of an arm or projection 380 (Fig. 27) arranged in the path of movement of one end of the dog. After the dog 364 is tripped to disconnect the disk 363 from the shaft 358, the momentum of the parts will cause the dog 364 to assume the position with respect to the shoulder 362 as shown in Fig. 27. The manual means for tripping the dog 369 embodies a key 381 which is arranged in a convenient position for the operator and is preferably pivotally connected at one extremity to a link 382 which latter is in turn connected by one end as at 383 to a fixed support. This link 382 projects over an arm 384 connected with the dog 374 (as shown more clearly in Fig. 28) so that when the key 381 is depressed the dog 374 will be rocked and the dog 369 released. Thus it will be manifest that the carriage or paper support may be returned from any position to which it has been advanced, at the will of the operator by simply actuating the key 381.

The means for automatically returning the carriage to its original starting position from any point to which it has advanced or from the limit of its advancing movement, is accomplished by means of a bell crank lever designated generally by the reference numeral 385 (see particularly Figs 25, 26, 27, 28 and 60), one arm 386 of which extends beneath a projection 387 on the dog 374 to trip the latter when the bell crank lever is rocked against the tension of the elastic member 388. The other arm 389 of the bell crank lever extends upwardly so as to be engaged by one of a series of pins or projections 390 on a shaft 391 mounted upon the paper support or carriage. This shaft 390 is rotatably supported by the carriage and is adapted to be rotated by means of a handle or button 392 (see particularly Fig. 60) and the pins or projections 390 are spirally or staggeredly disposed with respect to each other and around the shaft 391. The shaft is adapted to be rotated in its bearings so that any one of the projections 390 will be positioned to engage the arm 389 of the bell crank lever 385, so that the dog 374 will be automatically tripped when the carriage reaches a predetermined point. Obviously this shaft may be adjusted so that the carriage will be returned either at the limit of its advancing movement or from any intermediate position, at the will of the operator. An indicator 393 (Fig. 60) may be provided for indicating the adjustment of the shaft 391 and the pin or projection 390 which has been adjusted to trip the dog 387. After the dog 369 has been tripped, either manually or automatically, the dog 374 will assume a position to again trip the dog 369 at the proper time.

The platen is adapted to be rotatably spaced by means of a pawl 394 (see particularly Fig. 5) pivotally mounted upon a slide 395 and which pawl coöperates with a ratchet 396 connected with the pawl and tends normally to move it in a direction to engage the ratchet 396. The slide 395 is moved in one direction by means of an elastic member 398 connected thereto and is adapted to be moved in the opposite direction by means of an arm 399 which engages a projection 400 on the slide to move the latter against the tension of the elastic member 398 when the arm 399 is rocked (see also Fig. 57). This arm 399 is connected with a rock shaft 401 mounted in suitable bearings and keyed to the shaft 401, in order that the shaft may move longitudinally therethrough, is an arm 402. This arm 402 is held against longitudinal displacement with respect to the shaft 401 by means of spaced uprights 403 between which a portion of the arm 402 is located. Pivotally connected to the free end of the arm 402 is a link 404, the other extremity of which link is pivotally connected to an arm or lever 405 (see also Fig. 55) similar to the lever 153. This lever 405 is pivoted intermediate its ends as at 406 and on the free end of the arm is arranged an anti-friction roller 407 with which a cam 408 on the shaft 352 coöperates (see also Fig. 26).

The two cams 351 and 408 (see particularly Figs. 26 and 59) are connected by means of a sleeve 409 provided with a peripheral groove 410 and the sleeve is mounted upon the shaft 352 for rotation therewith and for adjustment longitudinally on the shaft, for a purpose which will hereinafter be set forth. This cam 408 is adapted to be shifted longitudinally on the shaft 352 similar to the cam 351 and laterally with respect to the lever 405 so that it may be moved into or out of a position to engage the anti-friction roller 407 on the lever 405. When the cam 408 is in the position shown in Fig. 26, that is, so that it will engage the anti-friction roller on the lever 405 it will rock the lever and this will cause the arm 399 to move the slide 395 and thereby impart one step of rotary adjustment to the platen.

The cams 351, 408 are so arranged with respect to each other that when one is in an operating position with relation to the respective levers 346, 405, the other cam will be out of operating position, that is to say, the mechanism may be so set that either the platen 329 will be spaced rotatably or the carriage allowed to escape. In other words, when a plurality of columns is being totalized and printed upon the work sheet the cam 351 coöperates with the arm 346 to operate the escapement mechanism of the carriage, but should only a single vertical column be printed and totalized the cam 408 will contact with the arm 405, axially spacing the platen, the escapement of the carriage being inactive. The shifting of these cams 408, 351, is controlled by means of a key 411 (see particularly to Figs. 1, 6, 22 and 26) which is arranged in a convenient position for the operator. The stem of this key is connected loosely with one arm of a bell crank lever 412 pivotally mounted upon any suitable fixed support, preferably adjacent the base of the machine. The other arm of the lever is provided with a vertical projection 413 which extends into the peripheral groove 410 of the sleeve 409 and an elastic member 414 is provided which tends normally to rock the bell crank lever 412 in a direction to position the cam 408 to operate upon the anti-friction roller 407 of the lever 405 and to move the cam 351 out of position with respect to the anti-friction roller 350 of the lever 346. In this position or the position shown in Fig. 22 the mechanism will be set so that the platen will be automatically spaced one step rotatably. As long as the parts remain in this position this automatic spacing of the platen will be effected. If, however, it is desired to return the carriage or the platen automatically from the limit of its advancing movement or from any intermediate point, to its original or starting position, then the cam 351 must be shifted so that it will engage the anti-friction roller 350 on the lever 346 and inasmuch as the cams 408, 351 are so arranged with relation to each other that when one is in operating position, the other will be out of operating position, this shifting movement of the cam 351 will displace the cam 408 with respect to the lever 405 and the parts will be adjusted against the tension of the elastic member 414 by the depression of the key 411. They may be held in this adjusted position in any suitable manner, preferably by means of a shoulder 415 on the stem of the key 411 (see Fig. 22) which passes under a suitable projection or shoulder on the frame and an elastic member 416 is provided which tends normally to move this shoulder 415 into a position to lock the parts when thus adjusted. When it is desired to automatically space the platen rotatably, this cam 351 must be again shifted with relation to the lever 346. This is accomplished by shifting the key 411 slightly laterally to disengage the shoulder 415 from its holding means and when thus released the elastic member 414 will move these parts to the position shown in Fig. 22.

When an additional digit is added to the number bearing members 65 of the registers and assuming the parts to be in the position shown in Fig. 22, that is, so that the platen will be automatically spaced rotatably, it is not advisable to automatically rotate the platen by the addition of this digit and unless this cam 408 is shifted to an inoperative position, the platen will be thus spaced. If the key 411 is actuated, the cam will be thus displaced but the cam 351 will be rendered active and this is not desirable under these conditions. Therefore it is necessary to provide means for shifting the sleeve 409 together with the cams 351, 408, to such an extent that both of the cams 408 will be rendred inactive. In order, therefore, to accomplish this, mechanism is provided whereby the shifting of this sleeve 409 may be accomplished when the shaft 285 is rocked, (see particularly Figs. 22 and 26). It has already been set forth in full how this shaft 285 is rocked by the addition of this additional digit and in order to utilize this rocking movement of the shaft 285 for the purpose just described an arm 417 is provided on the shaft having a lateral projection 418 adapted to engage the end of a slide 419. This slide is provided with an arm 420 which terminates adjacent the bell crank lever 412 and is provided with a projection 421 adapted to engage one arm of the bell crank lever to rock the latter and thereby shift the sleeve 409, the pin and slot connection between the stem of the key 411 and the bell crank lever 412 will permit such movement. The slide 419 and the arm 420 thereof together with the arm 417 are so arranged and proportioned that when the shaft 285 is rocked in the manner already set forth, the arm 417 will shift the slide 419 against the tension of an elastic member 422 and this will cause the projection 421 on the arm 420 to engage the arm of the bell crank lever to shift the sleeve 409 to such a position that the cams 408, 351, will be displaced with relation to the respective arms or levers 405, 346, so that when the shaft 352 is then rotated the cams will not act upon the levers. As soon as the shaft 285 is returned to its normal position the elastic member 422 will return the slide 419 and the elastic member 414 will return the bell crank lever 412 and consequently the sleeve 409 to its normal position. In order to hold the cams 408, 351 in their adjusted and inoperative positions, a pivotally supported arm 423 is provided (see particularly Figs. 6, 22, 26 and 46) which is adapted to move behind a shouldered portion 424 on the arm 420 under the influence of an elastic member 425 which is connected to the arm 423. Just as soon as the slide 419 is adjusted by the arm 417 in the manner set forth, the elastic member 425 will act upon the arm 423 to move it behind the shoulder 424 and the parts will remain in this locked position until the arm 423 is tripped. The tripping movement of this arm is effected preferably by means of a cam 426 on the shaft 352 which is adapted to engage an extension 427 on the arm 423 after the completion of the addition of the additional digit which will rock the arm 423 against the tension of the elastic member 425 to move it from behind the shoulder 424 of the slide 419 thereby releasing the latter to permit it to return to its normal position as well as the sleeve 409, under the influence of the elastic member 422 and the elastic member 414. Thus it will be manifest that the mechanism may be set to automatically space the platen rotatably or to automatically return the carriage longitudinally at the will of the operator and these automatic spacing mechanisms may be rendered inactive automatically to permit the addition of an additional digit to the number bearing members of the registers under certain conditions and without imparting movement either rotatably to the platen or longitudinally of the carriage.

When the cam for spacing the platen rotatably is in operating position, the carriage will not be spaced longitudinally but will remain in one position. However, in order to return the carriage to the original or starting position it is necessary to do so by hand.

When the cam for spacing the carriage longitudinally is in operating position, the carriage will be advanced automatically and the platen will not be spaced rotatably, therefore, in order to impart one step of rotation to the platen automatically under these conditions, that is, just prior to returning the carriage to its original position, there is provided an arm 426 (see particularly Figs. 43 and 61), which is pivotally mounted as at 427 to a fixed portion of the carriage so as to move therewith. This arm coöperates with an anti-friction roller 428 on the slide 395 and also with an arm or projection 429 arranged on a fixed portion of the mechanism and within the path of the advancing movement of the arm 426. This arm 429 is so located that the arm 426 will engage it to be rocked thereby when the paper support or platen reaches the limit of its advancing movement. When the arm 426 is rocked in this manner, it will move the slide 395 to move the dog 394 into engagement with the ratchet 396 of the platen (see also Fig. 5). When the slide 395 is shifted to move the dog 394 into engagement with the ratchet 396 (see Fig. 5) a portion of the dog will engage the stop 430 which will positively rock the dog about its point of pivotal support.

The arm 429 is so located that after the platen or paper support has reached the last step of its advancing movement, it is necessary as in all machines of this character, to advance the carriage slightly beyond this last step and it is during this additional advancing movement that the arm 426 will be rocked by the arm 429. When the carriage is returned to its original starting position by hand, when the machine is set so that the platen will be spaced rotatably, its movement may be arrested at the end of its advancing movement and just before this portion of an additional step is imparted to the platen so that the platen will not be spaced again under these conditions. If, however, the operator should return the carriage with his hand to such a position that the arm 426 will engage the arm 429, an additional step of rotation will be imparted to the platen but this is not objectionable under these conditions.

In order to obtain a record upon the record sheets, recording mechanism is provided and consists of a series of printing elements or type segments 431 (see particularly Fig. 23) which are arranged preferably in advance of the platen. Referring to the keyboard illustrated in Fig. 1 one type segment 431 is provided for each vertical column of keys 95, and each type segment is with the ordinals zero to 9, the zero type being always approximately in position to print upon the work sheet should the segment remain substantially stationary. These type segments are all pivotally mounted on the studs 432 carried by the arms 433 and these arms are in turn pivotally mounted upon a shaft 434 which extends transversely with respect to the elements 431 and the arms are adapted to be rocked about their points of pivotal support to move the type members toward and away from the platen 329. The type members are each provided with a face upon which are arranged printing characters and elastic members 435 are provided and arranged so that their normal tendency will be to move the type members 431 away from the platen. A valuation bar 436 is provided for each of the type members 431 and is mounted for sliding movement transversely with respect to the pivots 432 of the type members. As the specific construction of the controlling and operating mechanism for each of these type members is the same, the description of one will apply equally as well to them all. The valuation bar is provided with a horizontal portion 437 which has a pin and slot connection 438, 439, with its respective segment and an elastic member 440 is connected with the valuation bar and tends normally to move the latter vertically in a direction to rock the segment 431 about its pivot to move one of the printing characters in a printing position with respect to the record sheet. The degree of movement of the type member 431 and consequently the position of the characters is controlled by the degree of movement of the valuation bar 436 and inasmuch as it is desirable to print or record the same character upon the the record sheet which is registered by the respective number bearing member 65, valuation stops 441 are provided which are controlled automatically by the actuation of the respective keys of the series 95, (see particularly Figs. 2 and 23). Each of these valuation stops 441 is provided with an enlarged portion 442 which is mounted for sliding movement beneath and with respect to the extremity 443 of the valuation bar 436 and projects toward and terminates adjacent the shaft 224. The forward end of each stop is connected by means of a pin and slot connection 444, 445, with the lower terminals 101ᶜ of the adjacent arm 101 and in order to properly and compactly arrange the type segments 431 and the valuation stops 441, the terminals 101ᶜ are offset or deflected toward the center of the machine, as shown more clearly in Fig. 11.

As has already been explained, the degree of movement of the slides 96 is controlled by the keys 95 and as the characters on the type members 431 are arranged to correspond with the respective keys 95, it will be manifest that the type member 431 will be proportionately adjusted by the actuation of the slide 96 that when the gear 88 is in the position to mesh with the respective gears 89, the character of the type member 431 corresponding with the key which is actuated will be positioned with respect to the sheet so as to be impressed thereon. This adjustment is accomplished by means of the steps 446 of the valuation stops 441. One of these steps 446 is provided for each ordinal represented in a vertical column of the keys 95 so that when the respective keys are actuated, the valuation stop 441 will be adjusted, and the corresponding stepped portion 446 will be positioned beneath the extremity 443 of the valuation bar 436 and when the latter is released the elastic member 440 will actuate it and thereby adjust the segment 431. The movement of the valuation bar will be arrested by one of the steps 446 which is moved within the path of movement of the extremity 443 and when this extremity engages the shouldered portion the type member 431 will be properly positioned. If no key of one of the series 95 is actuated, the shoulder 447 of the valuation stop which is normally within the path of movement of the extremity 443 of the valuation bar 436, will remain in this position, and when this extremity engages the shoulder 447 the movement of the valuation bar will be arrested. This shoulder 447 is so arranged that when the extremity 443 of the valuation bar 436 is in engagement therewith the zero character of the type segment will be presented in printing position. The valuation stops 441, after the printing operation has been completed, are returned to their normal positions by the movement of the slides or members 96 when the latter are returned in the manner as has already been described. After the type segments 431 have been adjusted about their pivots 432, it is necessary to impart a bodily movement thereto so as to move the character which is in printing position to effect the printing operation. This is preferably accomplished by means of a hammer 448 pivotally supported as at 449 intermediate its ends, the head of which is adapted to strike the face 450 of the type segment 431 when the hammer is released. The striking action of the hammer is effected by means of an elastic member 451 and is so arranged that when the hammer is in an inoperative position, the elastic member will be placed under tension, but when the hammer is released the tension will move the latter about its point of pivotal support to throw the head thereof into engagement with the face 450 of the type member. When thus struck, the type segment will be bodily moved about its point of pivotal support 434 and into engagement with the record sheet, the pin and slot connection 438, 439 between the type segment 431 and the valuation bar 436 permitting such bodily movement. When the hammer is moved into an inoperative position, the type segment 431 will drop or move into such a position that none of the characters will be in printing position.

The hammers 448 are moved into an inoperative position by means of the shaft 352 (see also Fig. 26) to which the cams 408, 351 are keyed and which is rotated from the shaft 145. The shaft 352 is provided with a pair of cams 452 and these cams are adapted to engage and rock a yoke designated generally by the reference numeral 453 (see also Fig. 22), the sides of which are shaped to form arms 454, 455. If desired, anti-friction rollers 456 may be provided with which the cams 452 engage. The arms 454 are connected by means of a rod 457 while the arms 455 are connected by a rod 458 and the connecting bar 458 coöperates with a shoulder 459 on the valuation bar 436 so as to engage this shoulder and return the bar against the tension of the elastic member 440 when the member 453 is rocked about its point of pivotal support by the cams 452. This bar 458 extends across all of the valuation bars 436 to coöperate with all of the shoulders 459. The other rod 457 engages an extension 460 of each hammer 448 to move the latter to their inoperative positions against the tension of the elastic member 451 and into the position shown in Fig. 23. When the hammers have been returned to this position it is necessary to maintain them in such position against the tension of the elastic members 451 and this is accomplished by means of a pivotally supported locking member having a portion 461 supported by arms 462 and which arms are pivotally supported as at 463. The locking member is arranged in such a position that the portion 461 may be moved into or out of the path of movement of the extension 460 of the hammers. When this member extends within the path of movement of the extension 460 of the hammer, the latter will be locked against actuation but when moved out of the path of movement of such extension the elastic member 451 will actuate the hammer in the manner already described. The locking member is rocked in one direction about its point of pivotal support 463 by means of a cam 464 on the shaft 352 which engages an anti-friction roller 465 on an arm 466 connected with the locking member preferably by means of an extension 467 engaging a cross bar 468. The cam 464 is so arranged with respect to the cams 452 that by the time the latter have moved the hammers 448 to their inoperative positions and the valuation bars 436 back to their normal positions, the tension of the elastic member 469 will be exerted upon the arm 466 to cause the extremity to follow the low portion of the cam 464 and to move the portion 461 of the locking member into the path of movement of the extensions 460 of the hammers.

Inasmuch as the member 461 extends within the path of movement of all of the extensions 460 of the hammers, it will be apparent that when moved out of engagement with these extremities all of the hammers will be operated by the respective elastic members 451 and in the event that some of the series of keys 95 are not employed it is not advisable to release the hammers 448 corresponding to the series in which no key has been actuated and the movement of these hammers should therefore be arrested to prevent them striking the faces 450 of the respective type members 431. This is preferably accomplished by means of a pivotally supported member 470 which is provided with a shouldered portion 471 adapted to coöperate with a shoulder 472 on the valuation bar 436. An elastic member 473 tends normally to move the shoulder 471 of the member 470 in a direction to engage the shoulder 472 of the valuation bar but the shoulder 471 is held out of engagement with the shoulder 472 and against the tension of the elastic member 473 by means of the portion 474 of the hammer 448 which portion engages the extremity 475 of the member 470 when the hammer is rocked about its point of pivotal support 449 by the arm 454. The extremity 475 of the member 470 is also provided with a shoulder 476 adapted to coöperate with a shoulder 477 on the hammer 448. When the parts are in the position shown in Fig. 23 and after the completion of the revolution of the shaft 352, the low portion of the cams 452 will be in such positions as to permit the arms 454, 455 to move the bars or rods 457, 458 respectively away from the extensions 460 of the hammers and the shoulders 459 of the valuation bars 436. It has already been described how the adjustment of the type members will permit the valuation bars to move under the influence of the elastic members 440. When the valuation bar 436 moves under the influence of the elastic member 440 the shoulder 472 will be lowered with respect to the shoulder 471 of the member 470 and will cause the face or portion 478 of the valuation bar to move into such a position with respect to the shouldered extremity 471 of the member 470 as to prevent the latter from rocking about its point of pivotal support when the hammer 448 is moved by the elastic member 451 and this hammer will therefore be freed when the member 461 is moved away from the extension 460, as described. In the event that the movement of the valuation bar 436 under the tension of the elastic member 440 is prevented by means of the shoulder 447 on the valuation stop 441 by placing the shoulder under the extremity 443 of the valuation bar, it will be apparent that the hammer 448 will nevertheless be released when the member 461 is moved and the hammer thus released will strike the type segment 431. This, however, is prevented by means of the member 470 as the latter will move under the influence of the elastic member 473 and at the same time the member will be moved about its point of pivotal support to cause the extremity 475 to follow the portion 474 of the hammer and to move the shoulder 476 into engagement with the shoulder 477 on the hammer, which will arrest the movement of the hammer before it strikes the type segment 431. This movement of the member 470 will also cause the shoulder 471 to pass beneath the shoulder 472 on the valuation bar 436 and will likewise lock the latter against downward movement.

After the printing operation and when the hammers 448 are returned to their initial position in the manner already described, that is, by means of the arms 454, the portion 474 of the hammer engaging the extremity 475 of the member 470 will rock the latter about its point of pivotal support to move the shoulder 471 out of engagement with the shoulder 472 and thereby release the valuation member 436.

After the printing operation and when the hammers 448 are returned to their initial position in the manner already described, that is, by means of the arms 454, the portion 474 of the hammer engaging the extremity 475 of the member 470 will rock the latter about its point of pivotal support to move the shoulder 471 out of engagement with the shoulder 472 and thereby release the valuation member 436.

Inasmuch as the zero characters will all be moved to assume printing positions when the valuation bars 436 are released and in order to permit the zeros on the right of the amount to be recorded, it is necessary to prevent the actuation of the respective members 470 from locking the respective hammers 352 against actuation. To accomplish this so that the zeros on the right may be printed, each of the members 470 is provided with a laterally projecting lip or extension 479 (see also Fig. 22) and these extensions project to the left of the members and over a laterally projecting lug 480 of the next adjacent member 470 and which lugs project from the side of the member opposite to the side beyond which the extension 479 projects. Thus it will be manifest that, assuming for instance it is desired to record the amount of 67,000 the "6" key in the series representing tens-thousands and the "7" key in the series representing thousands must be actuated while no key will be actuated in the series representing tens and hundreds. Unless the hammers 448 are released and permitted to strike the respective type segments 431 in the last three mentioned columns no amount will be recorded but by the provision of the lips or extensions 479 and the extensions 480, the hammers to the right of the amount to be recorded will be held released by means of the extension 480 engaging the projection 479 on the next adjacent member 470 to the right, which will hold the respective members 470 against movement under the tension of elastic members 473 and also the shoulders 476 on the respective members 470 against movement into engagement with the shoulders 477 on the respective hammers 448. The specific construction, however, of this recording or printing mechanism just described forms no part of the present invention.

An impression is obtained from the printing characters of the type members by means of a ribbon 481 preferably of the multi-color type, which is arranged between the platen 329 and the type segments 431 and is supported by a frame or support designated generally by the reference character 482 (see particularly Figs. 22, 23 and 42) and which frame or support is provided with guides 483 within which the ribbon travels. Arranged on opposite sides of the machine are spools 484, 485, (see particularly Figs. 1 and 22) upon which the ribbon is wound and motion is imparted to the spools for intermittently winding the ribbon from one spool to another and for re-winding the ribbon upon the other spool and comprises vertical shafts 486, 487, which are journaled in suitable supports and connected respectively to these shafts for rotation therewith are gears 488, 489. Mounted in suitable bearings is a shaft 490 to extend transversely with respect to the shafts 486, 487, and connected with this shaft are gears 491, 492. The shaft 490 is of a length less than the distance between the gears 488, 489, and the shaft is adapted to be shifted longitudinally in its bearings so that when one of the gears 491, 492 is in mesh with the respective gears 488, 489, the other gears will be out of mesh. This shaft 490 is adapted to be intermittently rotated by means of a ratchet gear 493 which is connected to the shaft 490 for rotation therewith and so that the shaft may be adjusted longitudinally with respect to the ratchet. A yielding dog or pawl 494 (see also Figs. 23 and 24) is provided which at all times coöperates with the ratchet 493 to actuate the latter to impart one step of rotation to the ratchet and a similar rotation to the shaft 490 which motion will be imparted to one or the other of the spools 484, 485, according to which one is connected with the shaft 490 for rotation thereby. The dog 494 is actuated by means of a cam 495 carried by the shaft 352 and this ratchet 493 is held against retrograde movement by means of the usual retaining pawl. The shaft 490 is adapted to be automatically shifted longitudinally in its bearings by means of the variation in the diameter of the spools 484, 485, caused by the winding of the ribbon upon the respective spools through the medium of oppositely disposed clutch elements 496, 497, which are fixed upon the shaft 490. Slidable clutch elements 498, 499, are also provided on the shaft 490 and coöperate respectively with the clutch elements 496, 497, and elastic members 500 are provided between the respective clutch elements which tend normally to hold them separated. The clutch element 498 is provided with a cam face 501 (see particularly Fig. 24) and the clutch element 499 is provided with a cam face 502 for a purpose to be set forth. A pair of vertical shafts 503, 504, is provided adjacent each of the spools 484, 485, and connected with these shafts are arms 505, 506, which respectively coöperate with the spools. Secured to the lower extremity of the shaft 503 is a crank arm 507 provided with a pin or projection 508 which coöperates with the clutch element 498 and the cam face 501 thereon. Secured to the lower extremity of the shaft 504 is a crank arm 509 similar to the crank arm 507 and is provided with a pin or projection 510 which coöperates with the clutch element 499 and the cam face 502 thereon. Assuming the parts to be in the position shown in Fig. 22, which is the position they will assume when all of the ribbon has been wound on the spool 485, the operation of winding or feeding of the ribbon to the spool 484 will be as follows: As the diameter of the spool 484 increases by the ribbon being wound thereon, the arm 505 will be moved to rock the shaft 503 and during this movement of the shaft 503 the pin 508 on the crank arm 507 will shift the clutch element 498 on the shaft 490 toward the clutch element 496 and against the tension of the elastic member 500. By the time the clutch elements are brought into engagement the cam face 501 on the element 498 will start to rotate with the shaft 490 and a further rotation of the clutch element 498 when locked with the clutch element 496 will cause the cam face 501 to ride against the pin 508 and thereby shift the shaft 490 longitudinally so as to move the gear 491 out of mesh with the gear 488 and the gear 492 into mesh with the gear 489. This longitudinal movement of the shaft 490 will move the clutch element 496 away from the clutch element 498 and the elastic member 500 will also tend to move the clutch element 498 away from the clutch element 496 to separate the two. The longitudinal movement of the shaft 490 will cause it to slide through the ratchet 493. After all of the ribbon has been wound upon the spool 485, the operation will be reversed, that is, the arm 506 will rock the shaft 504 to cause the clutch elements 499, 497, to operate in a similar manner to shift the shaft 490 so that the gear 491 will mesh with the gear 488. The parts are shown in Fig. 22 in the position they will assume after the shaft 490 has been shifted by the ribbon on the spool 485. The shaft 490 is preferably mounted in brackets 511 (shown particularly in Figs. 2 and 24).

In order to maintain the shaft 490 in either of its adjusted positions, a disk 512 having a double beveled face is provided which is secured to the shaft and a spring-controlled dog 513 coöperates with the disk to engage one of the beveled faces when the gears 488, 491 are in mesh and engages the other face when the gears 489, 492 are in mesh. The tension of the dog is such that normally it will hold the shaft 490 against adjustment but when pressure is brought to bear upon the disk 512 by shifting the shaft 490 longitudinally the dog will yield to permit the shaft to be shifted. Thus it will be seen that the ribbon will be automatically fed from one spool to another and after it has been completely wound upon one spool, the ribbon feeding mechanism will be reversed automatically, and the ribbon will be wound from the full spool to the empty one.

As before stated, the ribbon is of the multi-color type and it is adapted to be shifted automatically to change from one color to the other so that the characters may be printed upon the record sheets in the color according to the nature of the amount recorded and also corresponding to the series of figures on the number bearing members 65 in which the amount is indicated. The ribbon frame or support 482 is mounted for sliding movement upon any fixed support and is adapted to be shifted to move the ribbon. The shifting of this frame is accomplished in the following manner, reference being had particularly to Figs. 5, 22, 23, 24, 26, 42, 45, 47 and 48: Mounted for free movement upon a suitable support is a slide 513$^a$ upon which latter is mounted a supplemental slide 514 and this latter slide is provided with a shoulder 515 and a reduced portion to form a second shoulder 516. An elastic member 517 is provided which tends normally to project the shoulder 515 of the supplemental slide into the path of movement of a shoulder 518 on the ribbon supporting frame 482 and elastic members 519 are provided which tend normally to shift the ribbon supporting frame in a direction to move the shoulder 518 toward the shoulder 515 of the supplemental slide 514. This will cause the ribbon supporting frame to be shifted to such an extent and to such a position that the black portion of the ribbon 481 will be in a position to be engaged by the printing surfaces of the type segments 431. But when the supplemental slide 514 is shifted to move the shoulder 515 out of the path of movement of the shoulder 518 of the ribbon supporting frame 482, and to move the shoulder 516 of the slide into a position to be engaged by the shoulder 518, then the ribbon will be shifted to such an extent that the red portion of the ribbon will be in position to be engaged by the printing surfaces of the type segments. The movement of the slide 513ª is controlled by the credit and debit keys 244, 245, (see particularly Fig. 48). When the debit key is depressed as in Fig. 48, the slide bar 243 will be shifted and this will in turn move the slide 513ª and consequently the supplemental slide 514, through the medium of a lever 520 (see also Fig. 24) which latter is pivoted intermediate its ends as at 521 to a fixed support. One end of the lever is pivotally connected as at 522 to the slide bar 243 and is pivotally connected as at 523 to an extension 524 on the slide 513ª. A stop 525 is provided which coöperates with shoulders 526 on the slide 513ª for limiting the movement of the slide. Inasmuch as the credit key 244 is connected with the debit key 245 through the medium of the rock arm 246, it will be apparent that when the credit key is depressed to return the slide 243 and consequently the key 245 to shift the clutch 83 (see Fig. 4) to control the direction of rotation of the number bearing members 65, the slide 513ª will also be shifted and with it the supplemental slide 514 to move the shoulder 515 out of the path of movement of the shoulder 518 on the ribbon supporting frame 482 and thereby position the shoulder 516 within the path of movement of the shoulder 518, to permit the ribbon supporting frame to move under the influence of the elastic members 519 to position the red portion of the ribbon 481 in a printing position.

Should it be desired to print the result or total of the amounts registered on the registers, in a different color from the color of the series on the number bearing members 65 in which the amounts are registered, that is, assuming the amounts to be registered in the black series of figures on the number bearing members, and it is desired to print the result in red, without clearing the number bearing members, a key 527 is provided. This key (see Fig. 1) is located in a convenient position for the operator and the stem 528 thereof passes through suitable guides and is provided with an inclined or beveled face 529 (see particularly Figs. 5 and 45). This inclined face 529 is so arranged that it will engage a laterally projecting extension or pin 530 carried by the supplemental slide 514, when the key 527 is depressed or actuated. This will move the inclined face 529 against the pin 530 and will withdraw the supplemental slide 514 against the tension of the elastic member 517 and into a position that the shoulder 515 will be moved out of the path of movement of the shoulder 518 on the ribbon supporting frame 482 and the shoulder 516 will be moved into the path of movement of such shoulder to be maintained in this position as long as the key 527 is held at rest. When this key is released the elastic member 517 will return the supplemental slide to move the shoulder 516 out of the path of movement of the shoulder 518 and the shoulder 515 into the path of movement of the shoulder 518, and will also return the key 528 through the medium of the pin 530 acting upon the inclined face 529 on the key stem 528.

The elastic members 519 serve the purpose of moving the ribbon supporting slide 482 in one direction and after the amounts have been recorded, and the slide 482 has been shifted, in the manner just described, it is necessary to return this slide so as to move the black portion of the ribbon into printing position. This is accomplished preferably by means of an arm 531 centrally carried by the member 453 (see particularly Figs. 23 and 42) and which arm engages a portion 532 of the ribbon supporting frame 482 to move the latter against the tension of the elastic members 519 when the member 453 is rocked by the cams 452 on the shaft 352. The ribbon supporting frame 482 will be held in this position so long as the high portion of the cams 452 is in engagement with the anti-friction roller 456 but when these cams move with the rotation of the shaft 352 to release the valuation bars 436 (see particularly Fig. 23), the arm 531 will move in a direction to permit the elastic members 519 to shift the ribbon supporting frame 482, in the manner already described.

Inasmuch as the number bearing members of the registers are normally in inoperative positions, that is, are normally disconnected from the operating mechanism, and inasmuch as the recording mechanism just described is normally connected with the same operating mechanism which imparts motion to the number bearing members 65 of the registers, it will be manifest that the recording mechanism may be operated independently with respect to the registers by neglecting or omitting to shift the clutches which are controlled by the keys 119 and which clutches control the number bearing members. When these keys 119 are actuated the respective registers will be connected with the power mechanism for operation in unison with the recording mechanism.

Should it be desired to operate only the registers without operating the recording mechanism, the latter may be thrown out or rendered inactive by means of a suitable key 533 (see particularly Figs. 1, 22, 23 and 24) which is arranged in a convenient position for the operator. The stem of this key is connected to a rock shaft 534 to which shaft is connected one or more catches 535, which catches are adapted to engage over a pin or projection 536 carried preferably by the arms 454 of the member 453. This key 533 is provided with a shouldered portion 537 (see particularly Fig. 23) adapted to engage under any fixed portion or shoulder of the machine to lock or hold the arms 535 in engagement with the projections 536, and an elastic member 538 is also provided which will hold the shoulder 537 under said portion of the framework and lock the key in its actuated position. Thus it will be manifest that the member 453 will be locked against actuation and even though the shaft 352 should rotate, the arm 455 of the member 453 cannot follow the cam and therefore the valuation bars 436, the hammers 448, and the ribbon shifting frame or support 482 will also be locked against actuation. This will permit the register portion of the mechanism to be used independently of the recording mechanism. When it is desired to register the recording mechanism into an actuating position or condition, all that is necessary is to shift the key 533 laterally to disengage the shoulder 537 and the elastic member 538 will serve to return the key which will shift the arms 535 on the shaft 534 out of engagement with the pin or projection 536 to release the member 453.

In order to prevent the actuation of the motor bar 192 until the clutch member 83 (Fig. 4) is properly set in one or the other of its positions, locking mechanism is provided (see particularly Figs. 9, 10 and 48) and comprises a lip or extension 538 which is carried by the slide 305. This lip coöperates with an extension 539 on the slide bar 243. The extension 539 is so arranged that when the clutch 83 is properly set in one of its positions, the extension will stand to one side or the other of the lip 538 of the slide 305, that is (reference being now had more particularly to Fig. 48) when the clutch member 83 is set by the debit key 245 so that the gear 82 will be locked to the shaft 77 (Fig. 4), the parts will assume the position shown in Fig. 48 so that the lip or extension 538 will move past the extension 539. If the credit key 244 is actuated and the clutch 83 is properly set to lock the gear 81 to the shaft 77, then the extension 539 of the slide bar 243 will be in a position to permit the lip 538 to pass the other side thereof when the motor bar 192 is actuated. Should, however, the clutch 83 be in an improper position, that is, in a position midway of the gears 81, 82, or in a position to only partially lock either of the gears to the shaft 77, when the body portion of the extension 539 of the slide 243 will be moved into the path of movement of the lip 538 and inasmuch as the slide 305 cannot then be actuated owing to the fact that the lip 538 will engage the face of the extension 539, the shaft 190 cannot be rocked and therefore the motor bar or key 192 cannot be actuated. This will prevent the shafts from being set into operation until the clutch member 83 is properly set and thereby avoid damage to the machine.

What is claimed as new is:

1. The combination with a plurality of totalizers each embodying a series of numeral wheels, of a drive shaft for each denominational order in common to all of the totalizers, connection between each drive shaft and the corresponding numeral wheels, and means individual to each drive shaft for imparting a varied movement thereto.

2. The combination with a plurality of totalizers each comprising a series of numeral wheels, of a totalizer shaft for each denominational order, common to the numeral wheels of all the totalizers of such order and upon which said numeral wheels are mounted for rotation, the totalizer drive shaft for each denominational order, gears common to each numeral wheel for creating a connection between the numeral wheels and the totalizer shafts, and a means for connecting said gears for operation with the drive shafts.

3. The combination with a plurality of totalizers each comprising a series of numeral wheels, of a totalizer shaft for each denominational order, common to the numeral wheels of all the totalizers of such order and upon which said numeral wheels are mounted for rotation, the totalizer drive shaft for each denominational order, normally inactive gears individual to each numeral wheel whereby said numeral wheels may be operated from the drive shafts, and means for simultaneously rendering the gears of each totalizer active for a calculation.

4. The combination with a plurality of totalizers each comprising a series of numeral wheels, of a totalizer shaft for each denominational order, common to the numeral wheels of all the totalizers of such order and upon which said numeral wheels are mounted for rotation, the totalizer drive shaft for each denominational order, normally inactive gears individual to each numeral wheel whereby said numeral wheels may be operated from the drive shafts, a connection between the gears and the drive shafts for rotating the numeral wheels upon the totalizer shafts for performing a calculation, and independent means for connecting said gears to said drive shafts for a carrying operation or transfer from one numeral wheel to another.

5. The combination with a plurality of totalizers each comprising a series of numeral wheels, of a totalizer shaft for each denominational order, common to the numeral wheels of all the totalizers of such order and upon which said numeral wheels are mounted for rotation, the totalizer drive shaft for each denominational order, normally inactive gears individual to each numeral wheel whereby said numeral wheels may be operated from the drive shafts, a connection between the gears and the drive shafts for rotating the numeral wheels upon the totalizer shafts for performing a calculation, and independent automatically operable means for connecting the gears to the drive shafts for effecting a transfer or carrying operation between the numeral wheels of a totalizer.

6. The combination with a plurality of totalizers each comprising a series of numeral wheels, of a totalizer drive shaft for each denominational order, said drive shaft being common to the corresponding numeral wheels of all the totalizers of that order, a gear connected with each numeral wheel, a coöperating and corresponding gear loosely mounted upon a coöperating drive shaft; clutches for connecting said loosely mounted gear to said drive shaft and means for simultaneously operating all of the clutches for a single totalizer.

7. The combination with a plurality of totalizers each comprising a series of numeral wheels, of a totalizer drive shaft for each denominational order, said drive shaft being common to the corresponding numeral wheels of all the totalizers of that order, a gear connected with each numeral wheel, a coöperating and corresponding gear loosely mounted upon a coöperating drive shaft, clutches keyed to drive shafts for reciprocation thereon, and means for simultaneously reciprocating the clutches of a totalizer to connect the corresponding loosely mounted gears to the drive shafts for performing a calculation.

8. The combination with a plurality of totalizers each comprising a series of numeral wheels, of a totalizer drive shaft for each denominational order, said drive shaft being common to the corresponding numeral wheels of all the totalizers of that order, a gear connected with each numeral wheel, a coöperating and corresponding gear loosely mounted upon a coöperating drive shaft, means for simultaneously connecting the loosely mounted gears of a single totalizer to the drive shafts for performing a calculation on said numeral wheel, and independent means for connecting said loosely mounted gears of a single totalizer to said drive shafts for effecting a transfer or carrying operation between the numeral wheels.

9. The combination with a plurality of totalizers each comprising a series of numeral wheels, of a totalizer drive shaft for each denominational order, said drive shaft being common to the corresponding numeral wheels of all the totalizers of that order, a gear connected with each numeral wheel, a coöperating and corresponding gear loosely mounted upon a coöperating drive shaft, means for simultaneously connecting the loosely mounted gears of a single totalizer to the drive shafts for performing a calculation on said numeral wheel, and independent means automatically operable from the numeral wheels for connecting the loosely mounted gears coöperating with a single totalizer to the drive shafts for effecting a transfer or carrying operation between the numeral wheels.

10. The combination with a plurality of totalizers each comprising a series of numeral wheels, of a totalizer drive shaft for each denominational order, said drive shaft being common to the corresponding numeral wheels of all the totalizers of that order, a gear connected with each numeral wheel, a coöperating and corresponding gear loosely mounted upon a coöperating drive shaft, means for simultaneously connecting the loosely mounted gears of a single totalizer to the drive shafts for performing a calculation on said numeral wheel, and independent means arranged to be set by the action of the numerals whereby said loosely mounted gears are connected to the drive shafts for effecting a transfer or carrying operation between the numeral wheels.

11. The combination with a plurality of totalizers each comprising a series of numeral wheels, of a totalizer drive shaft for each denominational order, said drive shaft being common to the corresponding numeral wheels of all the totalizers of that order, a gear connected with each numeral wheel, a coöperating and corresponding gear loosely mounted upon a coöperating drive shaft, means for simultaneously connecting the loosely mounted gears of a single totalizer to the drive shafts for performing a calculation on said numeral wheel, and independent means arranged to be successively set by the action of the numerals whereby said loosely mounted gears are connected to the drive shafts for effecting a transfer or carrying operation between the numeral wheels.

12. The combination with a totalizer comprising a series of numeral wheels, of a drive shaft for each numeral wheel, a driven gear connected with each numeral wheel, a drive gear loosely mounted upon each drive shaft and measuring with the corresponding driven gear, means for connecting said loosely mounted gears to said drive shafts for performing a calculation, and means successively operable from the numeral wheels for connecting said loosely mounted gears to said drive shafts for effecting a transfer or carrying operation between the numeral wheels of the totalizer.

13. The combination with a totalizer comprising a series of numeral wheels, of a drive shaft for each numeral wheel, a driven gear connected with each numeral wheel, a drive gear loosely mounted upon each drive shaft and measuring with the corresponding driven gear, clutches mounted for reciprocation on the drive shafts for connecting the loosely mounted driving gears to said drive shafts, means for simultaneously reciprocating said clutches, and independent clutches keyed to these drive shafts for reciprocation for connecting the loosely mounted driving gears to said drive shafts for effecting a carrying operation or transfer between the numeral wheels aforesaid.

14. In a machine of the class described, the combination of a register embodying a number bearing member, operating mechanism therefor, a clutch disposed between the said member and mechanism, means for shifting the clutch embodying a crank shaft, a crank adapted to be set and by means of which crank the shaft may be actuated, and means for actuating the crank when set to actuate the shaft.

15. In a machine of the class described, the combination of a register embodying a number bearing member, operating mechanism therefor, a clutch disposed between the said member and mechanism, means for shifting the clutch embodying a crank shaft, a crank adapted to be shifted with respect to the shaft to set the crank to be actuated, means for thus shifting the crank, means for actuating the crank when set to shift the clutch in one direction, and means for automatically actuating the crank when set to shift the clutch in the opposite direction.

16. In a machine of the class described, the combination of a register embodying a number bearing member, operating mechanism therefor, a clutch disposed between the said member and mechanism, means for shifting the clutch embodying a crank shaft, a crank adapted to be shifted with respect to the shaft to set the crank to be actuated, means for thus shifting the crank, means for actuating the crank when set to shift the clutch in one direction, means for automatically actuating the crank when set to shift the clutch in the opposite direction, and means for restoring the said crank to the position from which it was shifted.

17. In a machine of the class described, the combination of a register embodying a number bearing member, operating mechanism therefor, a clutch disposed between the said member and mechanism, means for shifting the clutch embodying a rock shaft, key controlled mechanism adapted to be set to rock the shaft, and means for actuating the last recited mechanism when thus set, to rock the shaft.

18. In a machine of the class described, the combination of a register embodying a number bearing member, operating mechanism therefor, a clutch disposed between the said member and mechanism, means for shifting the clutch embodying a rock shaft, key controlled mechanism adapted to be set to rock the shaft, means for actuating the last recited mechanism when thus set to rock the shaft to shift the clutch in one direction, and means for rocking the shaft in the opposite direction to shift the clutch in the opposite direction.

19. In a machine of the class described, the combination of a register embodying a number bearing member, operating mechanism therefor, a clutch disposed between the said member and mechanism, means for shifting the clutch embodying a rock shaft, key controlled mechanism adapted to be set to rock the shaft, and means operating with the said operating mechanism for actuating the key controlled mechanism when thus set.

20. In a machine of the class described, the combination of a register embodying a number bearing member, operating mechanism therefor, a clutch disposed between the said member and mechanism, means for shifting the clutch embodying a rock shaft, key controlled mechanism adapted to be set to rock the shaft, and means controlled by the said operating mechanism for actuating the said key controlled mechanism when the latter is thus set.

21. In a machine of the class described, the combination of a register embodying a number bearing member, operating mechanism therefor, a clutch disposed between the said member and mechanism, means for shifting the clutch embodying a rock shaft, key controlled mechanism adapted to be set to rock the shaft, means for actuating the last recited mechanism when thus set, to rock the shaft, and means for restoring the said key controlled mechanism.

22. In a calculating machine, the combination with a plurality of totalizers, each totalizer embodying a plurality of number-bearing members, of totalizer shafts, one shaft for each denominational order arranged to have mounted thereon the number-bearing members of the corresponding order of all the totalizers, a normally inactive drive for each number-bearing member of each totalizer, means individual to each totalizer for rendering the number-bearing members thereof simultaneously active or inactive.

23. The combination with a plurality of totalizers each embodying a series of numeral wheels, of a drive shaft for each denominational order in common to all of the totalizers, connection between each drive shaft and the corresponding numeral wheels, means for imparting rotation to said drive shafts in either direction, and means common to each drive shaft for determining the amount of movement to be imparted thereto.

24. The combination with a plurality of totalizers each embodying a series of numeral wheels, of a drive shaft for each denominational order in common to all of the totalizers, connection between each drive shaft and the corresponding numeral wheels, a shaft coöperating with each of said drive shafts for imparting a varied movement thereto, and means whereby said drive shafts may be connected to said second shafts for rotation in either direction.

25. The combination with a plurality of totalizers each embodying a series of numeral wheels, of a drive shaft for each denominational order in common to all of the totalizers, connection between each drive shaft and the corresponding numeral wheels, an operating shaft for each of said drive shafts, and connection between each of said drive shafts and its corresponding operating shaft, and means for imparting a varied movement to said operating shafts.

26. The combination with a plurality of totalizers each comprising a series of numeral wheels, of a drive shaft for each denominational order common to all of the totalizers, an operating shaft for each of said drive shafts, reversible connections between said drive shafts and said operating shafts, and means whereby said power shafts may impart a varied movement to said operating shafts.

27. The combination with a plurality of totalizers each comprising a series of numeral wheels, of a drive shaft for each denominational order common to all of the totalizers, an operating shaft for each of said drive shafts, reversible connections between said drive shafts and said operating shafts, a power shaft for each of said operating shafts, sliding gears on said operating shafts, and gears carried by the power shafts, one of which is arranged to coöperate with its corresponding sliding gear.

28. In a machine of the class described, the combination of a register embodying a plurality of number bearing members, operating mechanisms individual to the members and embodying a driven and a driving element, a normally inactive connection between the driven and driving elements of each of said mechanisms, means adapted to be set, to be actuated to connect the driven and driving elements, mechanism for imparting motion to the said means when thus set, to render the connection active, mechanism for also moving the said means when thus set, to render the connection inactive after the registering operation, and mechanism for again rendering said connection active automatically.

29. In a machine of the class described, the combination of a register embodying a plurality of number bearing members, operating mechanism individual to the members and embodying a driven and a driving element, a normally inactive connection between the driven and driving elements, of each of said mechanisms, means adapted to be set, to be actuated to connect the driven and driving elements, mechanism for imparting motion to the said means when thus set, to render the connection active, mechanism for also moving the said means when thus set, to render the connection inactive after the registering operation, and mechanism other than the said means for again rendering said connection active automatically.

30. In a machine of the class described, the combination of a register embodying a plurality of number bearing members, operating mechanism individual to the members and embodying a driven and a driving element, a normally inactive connection between the driven and driving elements of each of said mechanisms, means adapted to be set, to be actuated to connect the driven and driving elements, mechanism for imparting motion to the said means when thus set, to render the connection active, mechanism for also moving the said means when thus set, to render the connection inactive after the registering operation, and mechanism controlled by the number bearing members for again rendering the connection of the number bearing member of a higher denomination active.

31. In a machine of the class described, the combination of a register embodying a plurality of number bearing members, operating mechanism therefor embodying a driving and a driven element individual to the members, a connection between the respective driving and driven elements, means for automatically rendering said connection active, means for rendering the connection inactive, additional means for automatically connecting the driving and driven elements when the said connection is inactive, and means for rendering the last recited means inactive.

32. In a machine of the class described, the combination of a register embodying a plurality of number bearing members, operating mechanism therefor, connecting means between the operating mechanism and each of the number bearing members, means for rendering said connecting means inactive, carrying mechanism individual to the members, means for rendering the carrying mechanism active when the said connecting means of the respective members is rendered inactive, and means for successively rendering the said carrying means inactive.

33. In a machine of the class described, the combination of a register embodying a plurality of number bearing members, operating mechanism therefor, connecting means between the operating mechanism and each of the number bearing members, means for rendering said connecting means inactive, carrying mechanism individual to the members, means controlled by the number bearing members for rendering the carrying means active when the said connecting means of the respective members is rendered inactive, and means for successively rendering the said carrying means inactive.

34. In a machine of the class described, the combination of a register embodying a plurality of number bearing members, operating mechanism therefor, means for controlling said operating means, normally inactive carrying mechanism individual to the members, means tending normally to render said carrying means active, means for maintaining the carrying mechanism inactive, means for automatically releasing the said carrying mechanism, and means for rendering the carrying mechanism inactive, successively.

35. In a machine of the class described, the combination of a register embodying a plurality of number bearing members, operating mechanism therefor, means for controlling said operating means, normally inactive carrying mechanism individual to the members, means tending normally to render said carrying means active, means for maintaining the carrying mechanism inactive, means for automatically releasing the said carrying mechanism, and means operating with the said operating mechanism for rendering the carrying mechanism inactive, successively.

36. In a machine of the class described, the combination of a register embodying a plurality of number bearing members, operating mechanism therefor, means for controlling said operating means, normally inactive carrying mechanism individual to the members, means for maintaining the carrying mechanism active, means operatively related to the number bearing members for automatically releasing the said carrying mechanism, and means for rendering the carrying mechanism inactive, successively.

37. In a machine of the class described, the combination of a register embodying a plurality of number bearing members, operating mechanism therefor, means for controlling said operating mechanism, carrying mechanism individual to the members, each embodying a shiftable clutch element, means for shifting the clutch elements in one direction to render the carrying mechanism active, and means for shifting the clutch elements in the opposite direction to render the carrying mechanism inactive.

38. In a machine of the class described, the combination of a register embodying a plurality of number bearing members, operating mechanism therefor, means for controlling said operating mechanism, carrying mechanism individual to the members, each embodying a shiftable clutch element, means for shifting the clutch elements in one direction to render the carrying mechanism active, and means for shifting the clutch elements in the opposite direction successively to render the carrying mechanism inactive.

39. In a machine of the class described, the combination of a register embodying a plurality of number bearing members, operating mechanism therefor, means for controlling said operating mechanism, carrying mechanism individual to the members, each embodying a shiftable clutch element, means for shifting the clutch elements in one direction to render the carrying mechanism active, and means operating with the said operating mechanism for shifting the clutch elements in the opposite direction to render the carrying mechanism inactive.

40. In a machine of the class described, the combination of a register embodying a plurality of number bearing members, operating mechanism therefor embodying a motion imparting element and a shiftable element for rendering active and inactive the first said element, means for shifting the shiftable element, carrying mechanism individual to the said members and also embodying a shiftable element coöperating with the said motion imparting element, and means for shifting the second recited shiftable element.

41. In a machine of the class described, the combination of a register embodying a plurality of number bearing members, operating mechanism therefor embodying a motion imparting element and a shiftable element for rendering active and inactive the first said element, means for shifting the shiftable element, carrying mechanism individual to the said members and also embodying a shiftable element coöperating with the said motion imparting element, and means for shifting the second recited shiftable element to render the said motion imparting element active when the first recited shiftable element is in an inactive position.

42. In a machine of the class described, the combination of a register embodying a plurality of number bearing members, operating mechanism therefor embodying a motion imparting element individual to the members, a shiftable element individual to the motion imparting elements, means for controlling the shiftable element to render the motion imparting element active and inactive, carrying mechanism individual to the members and embodying a shiftable element coöperating with the motion imparting element, means tending normally to move the second recited shiftable element to render the motion imparting element active, means for moving the second said shiftable element into inactive position, means for maintaining it in such position, and means for automatically releasing the second recited shiftable element when the first recited shiftable element is inactive.

43. In a machine of the class described, the combination of a register embodying a plurality of number bearing members, operating mechanism therefor embodying a motion imparting element individual to the members, a shiftable element individual to the motion imparting elements, means for controlling the shiftable element to render the motion imparting element active and inactive, carrying mechanism individual to the members and embodying a shiftable element coöperating with the motion imparting element, means tending normally to move the second recited shiftable element to render the motion imparting element active, means for moving the second said shiftable element into inactive position, means for maintaining it in such position, and means controlled by the number bearing members for automatically releasing the second recited shiftable element when the first recited shiftable element is inactive.

44. In a machine of the class described, the combination of a register embodying a plurality of number bearing members, operating mechanism therefor embodying a motion imparting element individual to the members, a shiftable element individual to the motion imparting elements, means for controlling the shiftable element to render the motion imparting element active and inactive, carrying mechanism individual to the members and embodying a shiftable element coöperating with the motion imparting element, means tending normally to move the second recited shiftable element to render the motion imparting element active, means for successively moving the second said shiftable element into inactive position, means for maintaining it in such position, and means for automatically releasing the second recited shiftable element when the first recited shiftable element is inactive.

45. In a machine of the class described, the combination of a register embodying a plurality of number bearing members, operating mechanism therefor embodying a motion imparting element individual to the members, a shiftable element individual to the motion imparting elements, means for controlling the shiftable element to render the motion imparting element active and inactive, carrying mechanism individual to the members and embodying a shiftable element coöperating with the motion imparting element, means tending normally to move the second recited shiftable element to render the motion imparting element active, means operatively related to the said operating mechanism for automatically moving the second recited shiftable element into inactive position, means for maintaining it in such position, and means for automatically releasing the second recited shiftable element.

46. In a machine of the class described, the combination of a register embodying a plurality of number bearing members, operating mechanism therefor embodying a motion imparting element individual to the members, a clutch element for rendering said element active and inactive, means for controlling said clutch element, carrying mechanism individual to the members and embodying a second clutch element for also rendering the motion imparting element active and inactive, and means for automatically controlling the second said clutch element, one of said clutch elements operating to render the motion imparting element active when the other clutch element is inactive.

47. In a machine of the class described, the combination of a register embodying a plurality of number bearing members, operating mechanism therefor embodying a motion imparting element individual to the members, a clutch element for rendering said element active and inactive, means for controlling said clutch element, carrying mechanism individual to the members and embodying a second clutch element for also rendering the motion imparting element active and inactive, means for automatically controlling the second said clutch element, one of said clutch elements operating to render the motion imparting element active when the other clutch element is inactive, and means for rendering the second recited clutch elements inactive, successively.

48. In a machine of the class described, the combination of a register embodying a plurality of number bearing members, operating mechanism therefor embodying a motion imparting element individual to the members, a clutch element for rendering said element active and inactive, means for controlling said clutch element, carrying mechanism individual to the members and embodying a second clutch element for also rendering the motion imparting element active and inactive, means for automatically controlling the second said clutch element, one of said clutch elements operating to render the motion imparting element active when the other clutch element is inactive, and means operatively related to the said operating mechanism for rendering the second recited clutch elements inactive, successively directly after the carrying operation to the respective members.

49. In a machine of the class described, the combination of a register embodying a plurality of number bearing members, a driven element individual to the members for operating them, a driving element individual to the driven element, a clutch operable to connect and disconnect the driving and driven elements, means for thus operating the clutch, carrying mechanism individual to the members and embodying a clutch operable to connect and disconnect the said driving and driven elements, means for automatically actuating the second recited clutch to connect the driving and driven elements, and means for automatically actuating the second said clutch to disconnect the said elements.

50. In a machine of the class described, the combination of a register embodying a plurality of number bearing members, a driven element individual to the members for operating them, a driving element individual to the driven element, a clutch operable to connect and disconnect the driving and driven elements, means for thus operating the clutch, carrying mechanism individual to the members and embodying a clutch operable to connect and disconnect the said driving and driven elements, means for automatically actuating the second recited clutch to connect the driving and driven elements, and means for automatically actuating the second said clutch one in advance of the other to disconnect the said elements.

51. In a machine of the class described, the combination of a register embodying a plurality of number bearing members, a driven element individual to the members for operating them, a driving element individual to the driven element, a clutch operable to connect and disconnect the driving and driven elements, means for thus operating the clutch, carrying mechanism individual to the members and embodying a clutch operable to connect and disconnect the said driving and driven elements, means operating with the said driving elements for automatically actuating the second said clutch, one in advance of the other to disconnect the said elements.

52. In a machine of the class described, the combination of a register embodying a plurality of number bearing members, a driven element individual to the members for operating them, a driving element individual to the driven element, a clutch operable to connect and disconnect the driving and driven elements, means for thus operating the clutch, carrying mechanism individual to the members and embodying a clutch operable to connect and disconnect the said driving and driven elements, means for automatically actuating the second recited clutch to connect the driving and driven elements, and means for automatically actuating the second said clutch to disconnect the said elements, one of said clutches operating to disconnect the said elements when the other clutch operates to connect the elements.

53. In a machine of the class described, the combination of a register embodying a plurality of number bearing members, a driven element individual to the members for operating them, a driving element individual to the driven element, a clutch operable to connect and disconnect the driving and driven elements, means for thus operating the clutch, carrying mechanism individual to the members and embodying a clutch operable to connect and disconnect the said driving and driven elements, means for automatically actuating the second recited clutch to connect the driving and driven elements, means for automatically actuating the second said clutch to disconnect the said elements, the last said means embodying a shifting member, and a cam operating upon the shifting member.

54. In a machine of the class described, the combination of a register embodying a plurality of number bearing members, a driven element individual to the members for operating them, a driving element individual to the driven element, a clutch operable to connect and disconnect the driving and driven elements, means for thus operating the clutch, carrying mechanism individual to the members and embodying a clutch operable to connect and disconnect the said driving and driven elements, means for automatically actuating the second recited clutch to connect the driving and driven elements, means for automatically actuating the second said clutch to disconnect the said elements, the last said means embodying a shifting member individual to the second said clutch, and cams individual to the shifting members and operating successively upon the respective shifting members.

55. In a calculating machine, the combination with a plurality of totalizers, each embodying a series of number-bearing members, of a single driving mechanism for the corresponding denominational number-bearing members of said totalizers, normally disconnected from said number-bearing members, means for connecting said number-bearing mechanisms with their respective driving mechanisms for carrying from one number-bearing member to the number-bearing member of the next higher denominational order, and a series of carrying gears common to all of the totalizers and coöperative with the driving mechanisms.

56. In a machine of the class described, the combination of a plurality of number bearing members, mechanism for actuating the registers, and embodying driving shafts common to the respective members of the registers, said actuating mechanism also embodying means individual to the registers for rendering them active or inactive and carrying mechanism common to the registers, said carrying mechanisms embodying said driving shafts and means individual to the number bearing members for rendering the carrying mechanism active with relation to the respective number bearing members.

57. In a machine of the class described, the combination of a plurality of number bearing members, mechanism for actuating the registers, and embodying driving shafts common to the respective members of the registers, said actuating mechanism also embodying means individual to the registers for rendering them active or inactive and carrying mechanism common to the registers, said carrying mechanisms embodying said driving shafts and means individual to the number bearing members for rendering the carrying mechanism active with relation to the respective number bearing members, and when the number bearing members are inactive with relation to the first recited means.

58. In a machine of the class described, the combination of a plurality of number bearing members, mechanism for actuating the registers and embodying driving shafts common to the respective members of the registers, said actuating mechanism also embodying means individual to the registers for rendering them active or inactive, carrying mechanism common to the registers, said carrying mechanisms embodying said driving shafts and means individual to the number bearing members for rendering the carrying mechanism active with relation to the respective number bearing members, and means operatively related to the number bearing members for automatically rendering the said carrying mechanisms active.

59. In a machine of the class described, the combination of a plurality of number bearing members, mechanism for actuating the registers and embodying driving shafts common to the respective members of the registers, said actuating mechanism also embodying means individual to the registers for rendering them active or inactive, carrying mechanism common to the registers, said carrying mechanisms embodying said driving shafts and means individual to the number bearing members for rendering the carrying mechanism active with relation to the respective number bearing members, and means for successively rendering the last said means of the respective registers inactive.

60. In a machine of the class described, the combination of a plurality of number bearing members, mechanism for actuating the registers and embodying driving shafts common to the respective members of the registers, said actuating mechanism also embodying means individual to the registers for rendering them active or inactive, carrying mechanism common to the registers, said carrying mechanisms embodying said driving shafts and means individual to the number bearing members for rendering the carrying mechanism active with relation to the respective number bearing members, and means for automatically and successively rendering the last said means of the respective registers inactive.

61. In a machine of the class described, the combination of a plurality of movable number bearing members, a variable movement imparting means for each of said members, a uniform movement imparting means for each of said members, means for alternatively connecting each of said number bearing members with its respective variable movement imparting means or with its uniform movement imparting means, and means for successively throwing all of said members out of connection with their uniform movement imparting means automatically during each cycle of movement of said variable movement imparting means.

62. In a machine of the class described, the combination of registering mechanism embodying manual actuating means therefor; means for automatically adding a unit independently of said manual means; recording mechanism embodying spacing mechanism; and means operatively related to the second said means for throwing the spring mechanism out of operation when such second said means becomes operative to add a unit.

63. In a calculating machine, the combination with a plurality of totalizers, each embodying a series of number-bearing members, a driving mechanism for each denominational order and coöperative with the corresponding number-bearing members of all of the totalizers, and normally disconnected therefrom, means for simultaneously connecting all of the number-bearing members of a totalizer with the driving mechanisms for calculation, means set from the number-bearing members to connect the said number-bearing members with the driving mechanisms for carrying, and a train of carrying gears coöperating with the driving mechanisms and common to all of the totalizers.

64. The combination with a series of totalizers, of driving mechanism therefor normally disconnected therefrom, means individual to each totalizer for connecting the same with said driving mechanism for calculating, and means operable from the totalizer itself for connecting the same with the driving mechanism for carrying.

65. The combination with a plurality of totalizers, of a driving mechanism common to all of said totalizers, means individual to each totalizer for connecting the same to said driving mechanism for calculations, means operable automatically for connecting said totalizers to said driving mechanism for carrying, and a train of carrying gears common to all of said totalizers and coöperating with the driving mechanisms aforesaid.

66. The combination with a totalizer embodying a plurality of number-bearing members, of a driving mechanism for said number-bearing members, and clutches for connecting said number-bearing members to said driving mechanisms for calculations set by the operation of the number-bearing members for connecting said number-bearing members to the said driving mechanisms.

67. The combination of a plurality of totalizers each embodying a series of number-bearing members, of a driving mechanism common to all of said totalizers, a series of clutches for each totalizer adapted to be simultaneously set for connecting said totalizer to said driving mechanism for calculations, a series of carrying clutches adapted to be automatically set by the operation of the totalizer to connect said number-bearing members to the driving mechanism aforesaid, and a train of carrying gears common to all of said totalizers and coöperative with the driving mechanism aforesaid.

68. In a calculating machine, the combination with a plurality of totalizers, of a driving mechanism common to all of the totalizers, means individual to each totalizer for automatically connecting the number-bearing members thereof to the driving mechanism for carrying, and a carrying mechanism coöperating with the driving mechanism and common to all of the totalizers aforesaid.

69. In a device of the class described, the combination of a totalizer, operating mechanism therefor, keys, mechanism adapted to be set by the keys for controlling the totalizer operating mechanism, printing mechanism operatively related to the said operating mechanism and adapted to be set thereby, a support for the paper, means for taking an impression from the printing mechanism, means for intermittently advancing the paper support longitudinally with respect to the printing mechanism and means for automatically shifting the paper support longitudinally in the opposite direction from any of its positions.

70. The combination with a plurality of shafts, of a plurality of totalizers each comprising a series of numeral wheels, the corresponding numeral wheels for each denominational order of said totalizers being mounted upon one of the shafts aforesaid, and operating mechanism common to each denominational order, and means for transmitting variable motions to said operating means.

71. In a device of the character described, the combination of a plurality of totalizers, each comprising a series of coöperating numeral wheels, operating means for each of said numeral wheels, a common means for imparting motion to the operating means of the respective numeral wheels of the totalizers, and means whereby carrying operations from one numeral wheel to another of the same totalizer may be simultaneously effected in different totalizers and independently with respect to each other.

72. The combination with a plurality of totalizers, means common to each denominational order of all of the totalizers for operating the same, and an additional means common to all of the totalizers for controlling the direction of rotation thereof.

73. In a calculating machine, the combination of registering mechanism, printing mechanism, controlling means for the registering and the printing mechanisms, a platen for the paper, means for taking an impression from the printing mechanism, and variable means for automatically shifting the platen longitudinally to vary the position of the paper with respect to the printing mechanism.

74. The combination with a totalizer comprising a series of numeral wheels, a plurality of shafts, an operative connection between each of the numeral wheels and one of the shafts aforesaid, a keyboard arranged in denominational series, one series for each of said numeral wheels, mechanism operatively related to said shafts and arranged to be set by the keys aforesaid for controlling the movement of the numeral wheels, a continuously operating power mechanism, a universal shaft for operating the power mechanism aforesaid, a motor key, and means arranged to be set by said motor key for controlling the connection between said universal shaft and the continuously operating power mechanism.

In testimony whereof I have signed my name to this specification, in the presence of two subscribing witnesses, on this 31st day of August A. D. 1911.

SAMUEL E. CARLIN.

Witnesses:
J. H. JOCHUM, Jr.,
C. H. SEEM.

DISCLAIMER.

1,208,288.—*Samuel E. Carlin*, Chicago, Ill. CALCULATING MACHINE. Patent dated December 12, 1916. Disclaimer filed October 29, 1925, by the assignee, by mesne assignments, *John T. Underwood*.

Hereby enters his disclaimer to claims numbered 5, 6, 7, 8, 21, and 23, the right to said claims having been established by William S. Gubelmann in interference proceeding No. 43,578.

[*Official Gazette November 17, 1925.*]

DISCLAIMER.

1,208,288.—Whereas, on October 29, 1925, there was filed in this case a disclaimer to claims 40, 72, and 73, but in the notice of this disclaimer as published in the OFFICIAL GAZETTE of November 17, 1925, the numbers of the claims disclaimed were given as 5, 6, 7, 8, 21, and 23, now therefore this corrective notice of disclaimer is published.

1,208,288.—*Samuel E. Carlin*, Chicago, Ill. CALCULATING MACHINE. Patent dated December 12, 1916. Disclaimer filed October 29, 1925, by the assignee by mesne assignments, *John T. Underwood*.

Hereby enters this disclaimer to claims numbered 40, 72, and 73, the right to said claims having been established by William S. Gubelmann in interference proceeding No. 43,554.

[*Official Gazette July 17, 1928.*]